US011330934B2

(12) United States Patent
Amirault et al.

(10) Patent No.: US 11,330,934 B2
(45) Date of Patent: May 17, 2022

(54) REUSABLE CHEMICALLY HEATED CHAFING DISH

(71) Applicant: Sterno Products, LLC., Corona, CA (US)

(72) Inventors: David Amirault, Corona, CA (US); Steven L. Cox, Corona, CA (US); Andrew B. Mendenhall, Corona, CA (US); Dennis M. Turner, Corona, CA (US)

(73) Assignee: STERNO PRODUCTS, LLC

( * ) Notice: Subject to any disclaimer, the term of this patent is extended or adjusted under 35 U.S.C. 154(b) by 0 days.

(21) Appl. No.: 16/802,380

(22) Filed: Feb. 26, 2020

(65) Prior Publication Data

US 2021/0145211 A1  May 20, 2021

Related U.S. Application Data

(63) Continuation of application No. 16/402,053, filed on May 2, 2019.
(Continued)

(51) Int. Cl.
*A47J 36/24* (2006.01)
*B65D 21/02* (2006.01)

(52) U.S. Cl.
CPC ...... *A47J 36/2405* (2013.01); *B65D 21/0233* (2013.01)

(58) Field of Classification Search
CPC .................. A47J 36/2405; B65D 21/0233
(Continued)

(56) References Cited

U.S. PATENT DOCUMENTS 3,378,333 A  4/1968 Brite
3,871,357 A  3/1975 Grosso et al.
(Continued)

FOREIGN PATENT DOCUMENTS

FR  2659940 A1  9/1991
WO  2007098031 A2  8/2007
WO  2013069832 A1  5/2013

OTHER PUBLICATIONS

Amirault, David, Design U.S. Appl. No. 29/664,361 for Tray for a Chafing Pan, filed Sep. 24, 2018.
(Continued)

*Primary Examiner* — Jacob K Ackun
(74) *Attorney, Agent, or Firm* — Stetina Brunda Garred and Brucker

(57) ABSTRACT

A disposable support pan has a sidewall with a top lip that support the lips of rectangular food trays above a support surface. A disposable suspension tray inside the support pan has a flange resting on a support pan shoulder so the bottoms of two pockets in the suspension tray are between the support surface and the bottom of the food trays. Water in each pocket reacts with a calcium-oxide packet in each pocket to boils a predetermined amount of water to generate steam that heats the food trays without having the packets contact the food trays. One or two tray supports on each side of the pan may extend from the shoulder to a top support flange extending outward around a periphery of the support pan. The suspension tray has corresponding recesses to mate with the tray supports to keep steam from entering the area below the suspension tray.

11 Claims, 36 Drawing Sheets

Related U.S. Application Data

(60) Provisional application No. 62/776,882, filed on Dec. 7, 2018.

(58) Field of Classification Search
USPC .................. 99/483, 339, 340, 449; 126/9 R
See application file for complete search history.

(56) References Cited

U.S. PATENT DOCUMENTS

| | | | |
|---|---|---|---|
| 4,920,873 A * | 5/1990 | Stevens | B65D 21/0215 211/49.1 |
| 5,117,809 A | 6/1992 | Scaringe et al. | |
| 5,542,418 A | 8/1996 | James | |
| 6,289,889 B1 | 9/2001 | Bell et al. | |
| 6,440,509 B1 | 8/2002 | Littlejohn et al. | |
| 6,530,935 B2 | 3/2003 | Wensel et al. | |
| 7,025,055 B2 | 4/2006 | Scudder et al. | |
| 7,392,907 B2 | 7/2008 | Herbert et al. | |
| 9,016,511 B2 | 4/2015 | Widitora et al. | |
| 9,435,567 B2 | 9/2016 | Ra | |
| 9,731,879 B2 | 8/2017 | Sheldon et al. | |
| 9,851,125 B2 | 12/2017 | Arnold | |
| D866,241 S | 11/2019 | Amirault | |
| D873,066 S | 1/2020 | Amirault | |
| 2003/0192525 A1* | 10/2003 | Ruiseco | A47J 36/2405 126/50 |
| 2011/0017079 A1* | 1/2011 | Wall | A47J 36/26 99/449 |
| 2015/0017287 A1 | 1/2015 | Sevim | |
| 2015/0136633 A1 | 5/2015 | Sarnoff et al. | |
| 2017/0326618 A1 | 11/2017 | Sarnoff et al. | |
| 2018/0092493 A1 | 4/2018 | Hale et al. | |

OTHER PUBLICATIONS

Amirault, David, Design U.S. Appl. No. 29/715,924 for Chafing Pan, filed Dec. 3, 2019.

* cited by examiner

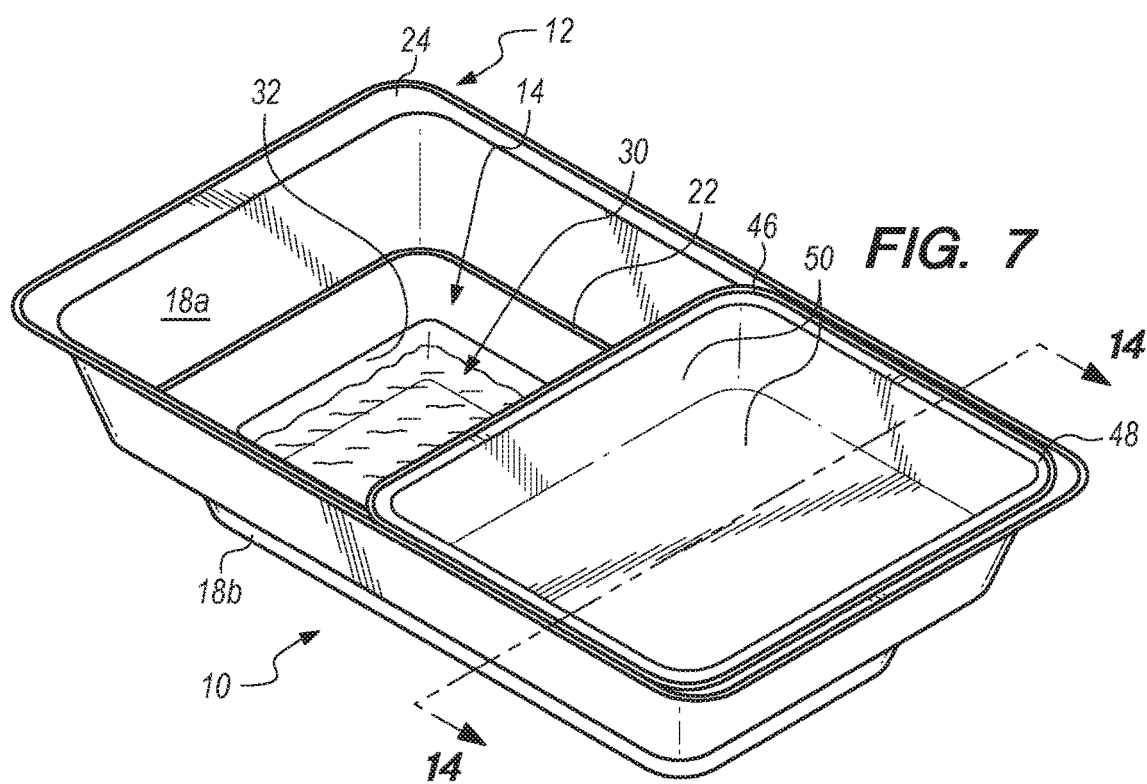
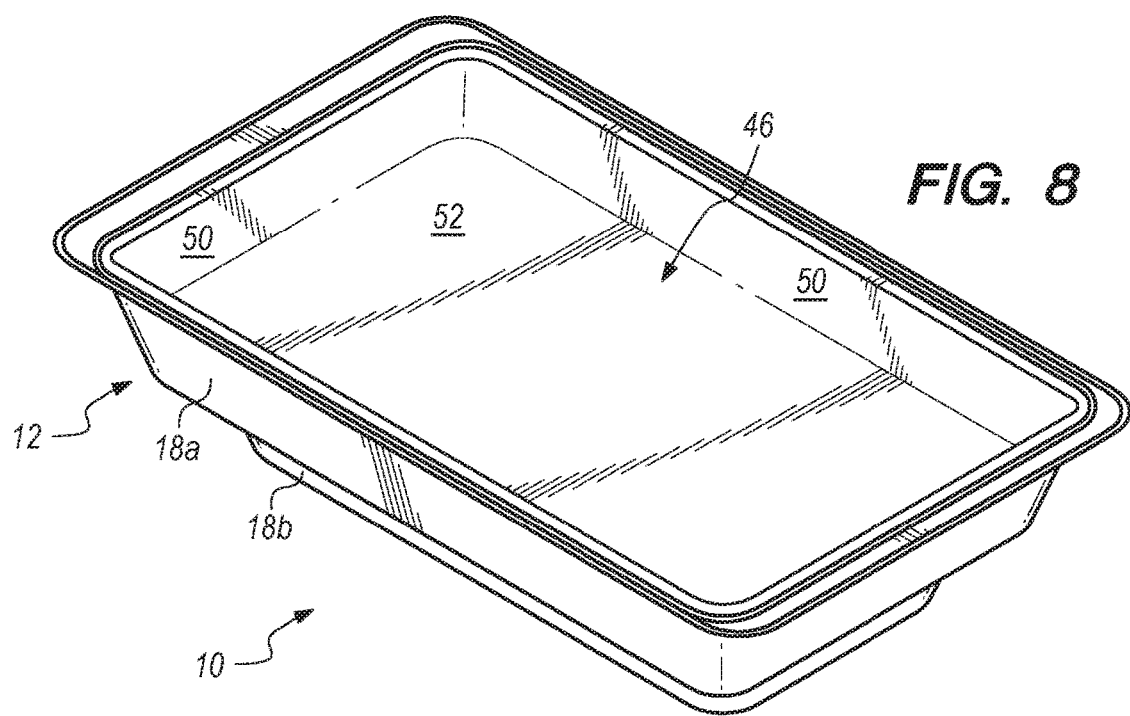

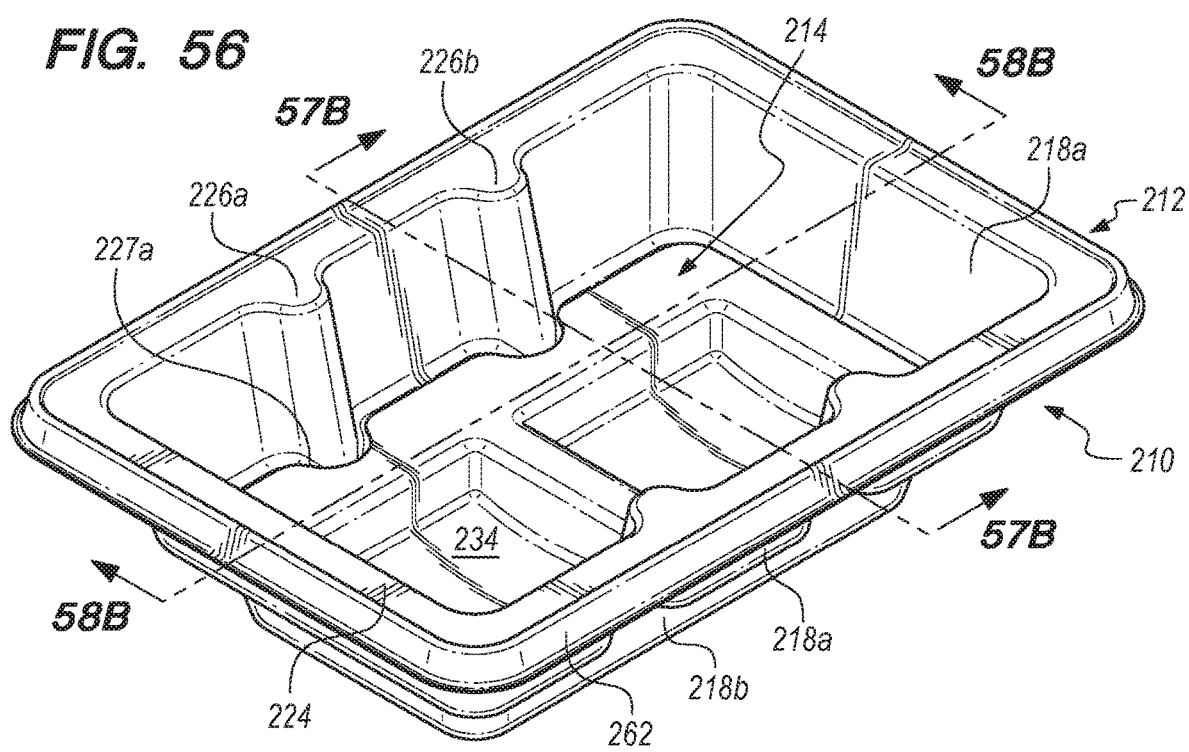

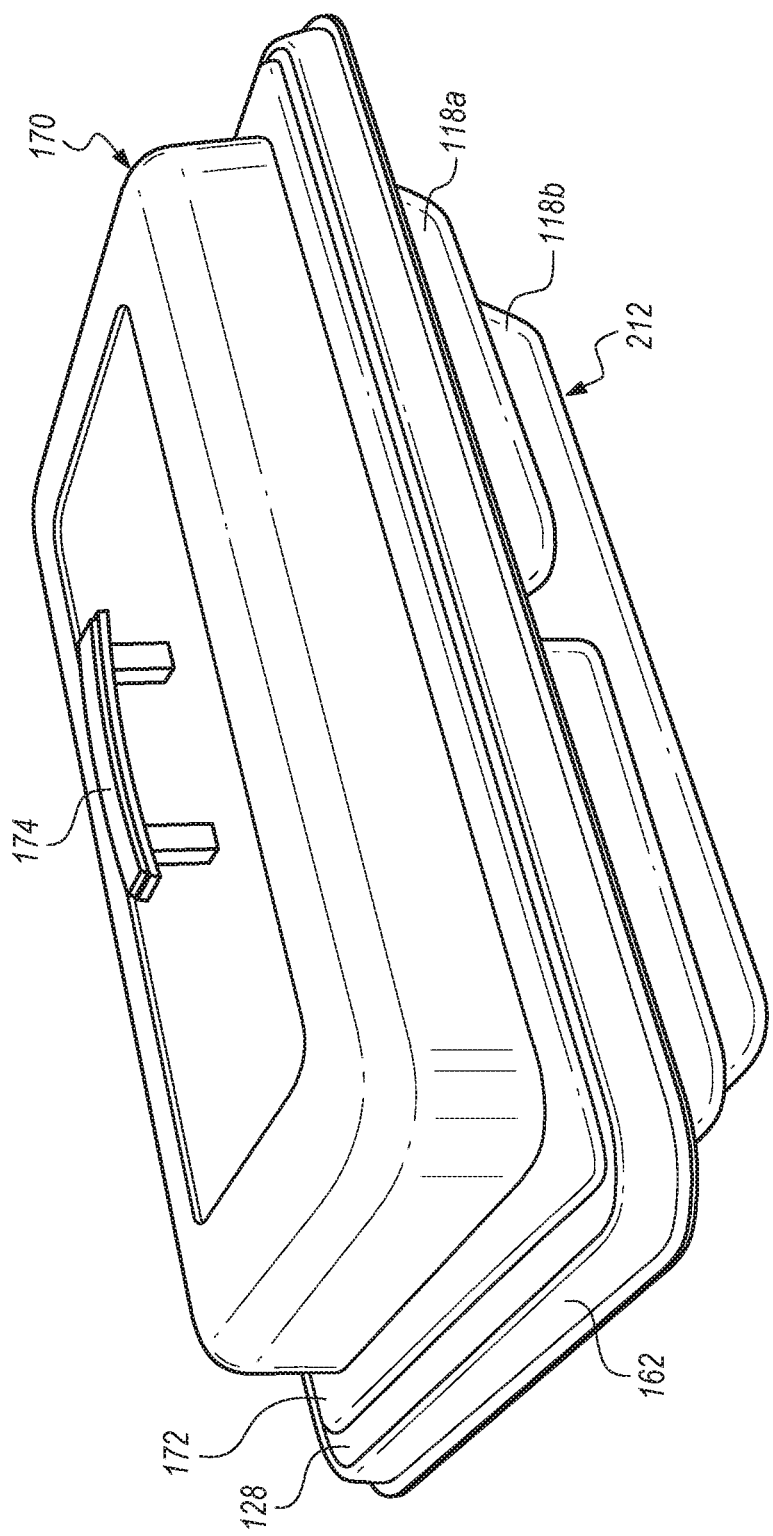

REUSABLE CHEMICALLY HEATED CHAFING DISH

CROSS-REFERENCE TO RELATED APPLICATIONS

The application is a Continuation of patent Ser. No. 16/402,053 filed on May 2, 2019 which claims the benefit under 35 U.S.C. § 119(e) to Provisional Patent Application No. 62/668,563 filed May 8, 2018, Provisional Patent Application No. 62/724,473 filed Aug. 29, 2018, Provisional Patent Application No. 62/731,695, filed Sep. 14, 2018, and Provisional Patent Application No. 62/776,882, Filed Dec. 7, 2018 the entire contents of which are incorporated herein by reference.

STATEMENT RE: FEDERALLY SPONSORED RESEARCH/DEVELOPMENT

Not Applicable

BACKGROUND

Chafing have an outer pan holding water and supporting one or more food trays inside the outer pan. A metal support frame holds the outer pan and food tray(s) and also supports at least one methanol-based or ethanol-based burner. The food trays, reusable, heavy gauge metal pans or thin walled disposable trays made of aluminum, are held by the support frames above the water level in the chafing dish. The burners heat the outer pan sufficiently to boil water inside the outer pan and to generate steam for cooking food in the food tray(s) or to maintain pre-cooked food in the food tray(s) at a suitable temperature. Depending on the heating time and desired temperature, more than one methanol burner may be used simultaneously or sequentially. The methanol fuel is used because it cannot be consumed by humans, and if ethanol-based fuel is used it is treated chemically so it is not drinkable.

But these frames and chafing dishes are bulky to store and expensive for those using them only one or two times a year. There is thus a need for more convenient and less expensive way of maintaining food at desired temperatures.

The metal support frames are often collapsible to form a less bulky assembly for storage between uses and such collapsible support frames require more expensive rotating joints, and heavy frames, leading to degradation of the rotting joints over time and storage issues. Sometimes the support frames come unassembled and multiple parts must be correctly joined to support the food trays and heated suspension tray. There is thus a need for food heating devices that avoid collapsible frames, that multi-part frames requiring assembly, and that avoid expensive frames.

In order to provide room for inserting and removing the methanol burners while avoiding scorching or burning the support table, the support frames for the water-containing chafing dish typically support the bottom of the burners away from the bottom of the support table, and having the top of the burners below the bottom of the chafing dish and have the food trays above the bottom of the water level in the chafing dish, with the result that the top of the food trays and support frames and chafing dish are high off the support table—making them unstable and wobbly if they are pushed or bumped laterally. There is thus a need for a food service system that is not so high and can place the top of the food tray closer to the support surface.

The methanol and ethanol burners provide very hot flames which can cause food in the food trays to burn if the burners are too close to the foot tray bottom or which can make the chafing dishes uncomfortably hot to handle. For example, methanol burns at 1,910° C. or about 3470° F. There is thus a need for an improved food heating system that maintains the food temperature at a more uniform temperature and avoids hot temperatures that burn the food or that make the metal pans too hot to handle.

The methanol or ethanol-based burners can heat the heating pan to very hot temperatures well above the boiling temperature of water (100° C.), especially if the burner is close to an edge of the chafing dish or if the water in the dish boils off. There is thus a need for an improved food heating system that avoids excessive temperatures of the heating pans.

The methanol burners have various mechanisms for controlling the heat and that requires access to the burners under the heating pan which increases the height of the support frame and food trays. The adjustable burners also result in burners containing unburned fuel when the food service is completed. The methanol in the burners may evaporate between uses and provides an uncertain amount of fuel for the next use, leading to the discarding of partially-used fuel burners, environmental pollution and waste. There is thus a need for an improved food heating system that is more efficient and reduces waste and pollution.

BRIEF SUMMARY

A (preferably) rectangular, support pan of disposable, thin-walled aluminum or plastic construction has a sidewall with an outwardly extending top sidewall lip that supports outward extending food tray lips of one or a few (preferably) rectangular food trays at a location above a support surface. An inner suspension tray of disposable, thin-walled aluminum or plastic construction is inside the support pan and has an outwardly extending, suspension tray flange resting on an outwardly extending shoulder of the support pan so that the bottoms of one or a few pockets in the suspension tray are between the support surface and the bottom of the food trays. Water in each pocket reacts with a calcium-oxide packet in each pocket to boil the water and generate steam that heats the food trays without having the packets contact the food trays. The pockets are deep enough to keep the expanded calcium-oxide packet from contacting the food trays and burning the food, while also containing enough water to optimally catalyze the calcium-oxide and generate the desired amount of steam.

The disposable construction allows less expensive manufacturing costs, easier cleanup than foldable support frames and heavy metal water trays. The disposable tray provides a bottom and a layer of air insulation between the chemical heat source to keep the support table cool. The chemical heating avoids wasting methanol fuel while generating a predetermined amount of steam to provide uniform steam heating of the food trays while avoiding burning of food. The calcium oxide packets and the water in the pockets are sized to maintain the temperature in the food trays for about 30 minutes, as it is believed a high percentage of uses are completed within that time. The lightweight, disposable setup provides a single-use system suitable and desirable for holiday use where limited cleanup is desired at a lower cost than conventional chafing dishes and methanol burners.

In more detail, a chafing dish assembly is provided having a rectangular support pan with a stepped sidewall formed by upper and lower, continuous sidewalls with a closed bottom joining a bottom edge of the lower sidewall to form an enclosed container with an open top opposite the closed bottom. The open top is surrounded by an upper edge of the upper sidewall of the support pan. The support pan has a ledge extending outward from an upper edge of the lower sidewall to join a lower edge of the upper sidewall and forming a shoulder on the support pan between the upper and lower sidewalls. The top of the ledge is located a distance above the support pan's bottom and that distance D is advantageously between three and five inches. The chafing dish assembly also includes a suspension tray having a rectangular top with an outer periphery that fits inside the support pan and rests on the shoulder. The suspension tray has a pocket depending from the suspension tray's rectangular top toward the support pan's bottom. The pocket has a continuous pocket sidewall joining a pocket bottom to form a watertight pocket that opens onto the suspension tray's top. the pocket bottom spaced apart from the bottom of the support pan. The support pan and suspension tray may form a kit, especially when additional parts are included such as the exothermic packs, or when the pan and tray are separated.

In further variations, the chafing dish assembly may include a lip extending outward from the upper edge of the support pan and extending around a periphery of that upper edge. The support pan may have upper and lower sidewalls that are slightly inclined outward at an angle of about 2 to 15° so the pan and tray may be formed of very thin walled material and so the pan and tray may be stacked in a nested manner for shipping. Advantageously, least one of the support pan and suspension tray is made of plastic, advantageously thin-walled, single use, disposable plastic. One or both of the pan and tray may be made of thin-walled, single use, disposable aluminum, advantageously with a wall thickness of about 0.04 to 0.06 inches. Advantageously, the pocket bottom is located a distance of 0.5 inch to 2 inches from the support pan's bottom. Preferably, there are two separate pockets in the water tray, each having a pocket bottom located about 0.5 to 2 inches from the support pan's bottom.

In still further variations, a water permeable, packet of material that reacts exothermically with water to produce steam suitable for use in heating food, is placed in each pocket. Advantageously, water is placed into the pocket before or after the packet. Further, one or more food trays may be supported on the top of the support pan, preferably supported on an outward extending lip on the upper edge of the upper sidewall. Advantageously, the pocket bottom of the first and second pockets are located so each permeable packet does not contact a food tray when the packet expands to its maximum size during use. Advantageously, the pocket bottom of the first and second pockets is located about 0.5 to 2 inches from the support pan's bottom, and the top surface of the water tray is about that same distance from the bottom of the food tray. Advantageously, the pockets have a rectangular shape, with the packets having a corresponding shape, but smaller in size so the packets do not contact the pocket sidewalls when the packets expand during use.

Each of these features of the chafing dish assembly may be included in a kit. Such a kit may include a rectangular support pan having a stepped sidewall formed by upper and lower, continuous sidewalls with a closed bottom joining a bottom edge of the lower sidewall to form an enclosed container with an open top opposite the closed bottom. The open top is surrounded by a top edge of the upper sidewall of the support pan. The support pan has a ledge extending outward from an upper portion of the lower sidewall to join a lower edge of the upper sidewall and form a shoulder on the support pan between the upper and lower sidewalls. The top of the ledge is located a distance D above the support pan's bottom. The kit includes a separable suspension tray having a generally flat, rectangular top with an outer periphery sized and configured to fit inside the support pan and rest on the shoulder during use. The suspension tray has a pocket depending from the suspension tray's rectangular top toward the support pan's bottom during use. The pocket has a continuous pocket sidewall joining a pocket bottom to form a watertight pocket that opens onto the suspension tray's top. The pocket bottom has a depth less than D, so the pocket's bottom is spaced apart from the bottom of the support pan when the suspension tray rests on the shoulder. The kit may also include a water permeable packet of material that reacts exothermically with water to produce steam suitable for use in heating food.

In further variations, the kit may include a support pan with a lip extending outward from the top edge of the upper sidewall. Advantageously, the suspension tray has a second pocket constructed like the first pocket but spaced part from the first pocket along a length of the suspension tray. Moreover, each pocket is advantageously about 0.5 to 2 inches from the bottom of the support pan when the suspension tray rests on the shoulder during use. Also, the kit may include a second water permeable packet of material that reacts exothermically with water to produce steam suitable for use in heating food. Advantageously, one or both of the support pan and suspension tray are each made of disposable, thin-walled plastic, or made of disposable, single use, thin-walled aluminum.

There is also provided a chafing dish having a support pan and a suspension tray that may fit together during use. The support pan has a continuous sidewall extending between a closed bottom and an open top that is opposite to and larger than the bottom. The sidewall is stepped outward from the bottom to form an outwardly extending shoulder on an inside of the support pan at a location spaced a distance D from the bottom of the support pan and toward the open top of the sidewall. The suspension tray is configured to removably fit inside the support pan and rest on the shoulder around a periphery of the suspension tray. The suspension tray has a first waterproof pocket depending toward the pan's bottom during use and located on the suspension tray and configured so the pocket is about 0.5 to 2 inches from the bottom of the support pan when the suspension tray rests on the shoulder during use. The pocket is also preferably at least that far from the sidewall. The support pan and suspension tray may each be made of single use, disposable, thin-walled plastic or aluminum.

In further variations, the support pan and suspension tray are rectangular in shape. The suspension tray may further include a second waterproof pocket spaced apart from the first waterproof pocket along a length of the suspension tray. Advantageously, the first and second waterproof pockets are rectangular in shape. The chafing dish assembly may include first and second water permeable packets each containing material that reacts exothermically with water to generate steam suitable for use with heating food. Each packet being placed in a different one of the waterproof pockets during use. The top edge of the support pan sidewall advantageously has an outward extending lip around the open top to help support food trays. A single, rectangular shaped food tray having an outwardly extending top flange may rest on the lip on at least two opposing sides of the support pan to support the food tray on the support pan. Advantageously, a bottom of the food tray is located about 0.5 to 2 inches from the water tray over the entire bottom of the food tray. Similarly, a half-food tray, also rectangular in shape, may have an outwardly extending top flange resting on the lip on at least two opposing sides of the support pan to support the half tray on the support pan, advantageously with the same 0.5 to 2 inch spacing between the bottom of the half food tray and the top of suspension tray. There are preferably two half-food trays supported on the lip of the support pan, and advantageously the flanges on three sides of each food tray rest on the lips extending along three sides of the rectangular support pan. The support pan and water tray are preferably each made of single use, disposable, thin-walled plastic or aluminum.

Advantageously, a shipping assembly is formed using a shipping unit that includes a support pan containing a suspension tray resting on a shoulder of the support pan, with a plurality of X such shipping units stacked in a nested manner. Advantageously the shipping assembly has about 12 shipping units, with about 24 water permeable packets of exothermic material placed inside the top support pan in the stack of nested support pans. Alternatively, a stack of a plurality of food trays suitable to cover the open top of each support pan in the stack of X such shipping units, is placed at least partially in the top support pan of the stack of shipping units, with a water permeable packet of exothermic material for each of the pockets of the suspension tray in the stack of X such shipping units placed in the top food tray in the stack of food trays. Advantageously, the support pan and suspension tray may include the above described variations, and all other variations described herein or defined in the claims submitted herewith.

Advantageously, a shipping assembly is formed using a shipping unit that includes a support pan containing a suspension tray resting on a shoulder of the support pan, and a packet of exothermal material in each pocket of the support tray, with a plurality of X such shipping units stacked in a nested manner, with each support pan and suspension tray including the variations described above and herein. Advantageously the shipping assembly has about 12 shipping units, with about 24 half food trays or 12 full food trays at least partially in the top support pan of the stack of nested shipping units. Advantageously, the support pan and suspension tray may include the above described variations, and all other variations described herein.

In further variations of each of the above embodiments described above, the support pan may include a tray support at the middle of two opposing upper sidewalls and with each tray support extending from the support shoulder support ledge to the upper support lip, each tray support extending inward and having a length with a curved cross-sectional shape extending along its length, and wherein the suspension tray has a curved recess at the middle of each of two opposing sides, the recess fitting around the tray support during use. The centrally located tray support on each upper sidewall helps support a corner of a food tray during use and to seal steam from escaping past the tray support at the top support lip of the support pan. The shape of the recesses and tray support cooperate to prevent steam from passing below the suspension tray at the location of the support and recess.

In still further variations, the support pan includes two curved tray supports equally spaced along each of two opposing upper sidewalls, each tray support extending from the shoulder to the upper lip. Each tray support also extends inward and has a length with a curved cross-sectional shape extending along its length. The suspension tray has a curved recess at the middle of each of two opposing sides so that the recess mate with and fit around the tray support during use. The shape of the recesses and tray support cooperate to prevent steam from passing below the suspension tray at the location of the support and recess.

There is also provided a chafing dish assembly that includes a support pan having a continuous sidewall extending between a closed bottom and an open top opposite to and larger than the bottom and shaped, so the support pans can nest together in a stacked configuration. The sidewall is stepped outward from the bottom to form an outwardly extending shoulder on an inside of the support pan at a location spaced a distance from the bottom of the support pan and toward the open top of the sidewall. A suspension tray is configured to fit inside the support pan and rest on the shoulder around an inner periphery of the suspension tray at the location of the shoulder. The suspension tray has a first waterproof pocket depending toward the pan's bottom during use and located on the suspension tray and configured so a bottom of the pocket is 0.5 to 2 inches from the bottom of the support pan when the suspension tray rests on the shoulder during use. The pocket is advantageously at least that far from the sidewall. The support pan and suspension tray are each made of disposable, thin-walled plastic or aluminum.

In further variations of this chafing dish assembly, the support pan and suspension tray are rectangular in shape and the suspension tray further comprises a second waterproof pocket spaced apart from the first waterproof pocket along a length of the suspension tray. The first and second waterproof pockets are rectangular in shape and the sidewall has an outward extending lip around the open top. The assembly may also include first and second water permeable packets containing material that reacts exothermically with water to generate steam, suitable for use with heating food, each packet being in a different one of the waterproof pockets. The assembly may also include at least one, rectangular shaped food tray having an outwardly extending top flange contacting the lip on at least two opposing sides of the support pan to support the food tray on the support pan, with the parts sized so that a bottom of a food tray supported on the support pan's lip is located 0.5 to 2 inches from the suspension tray over the entire bottom of the food tray.

In additional variations, the above chafing dish assembly advantageously includes a support pan and suspension tray made of plastic or aluminum, with at least one of the support pan and suspension tray having a thickness of 0.04 to 0.06 inches, especially for disposable pans and trays. The support pan and suspension tray may be of thicker plastic or aluminum, having a thickness of 0.1 to 0.13 inches for reusable pans and trays. The reusable support pans may be used with disposable suspension trays, and reusable trays may be used with disposable support pans. Advantageously, the sidewall of the support pan has upper and lower sidewalls that are slightly inclined outward at an angle of 2 to 15° so the sidewalls can nest together in a stacked configuration.

In further variations, the support pan has an outward extending top flange around the open top of the pan and a tray support extending between the shoulder and the top flange at the middle of two opposing sidewalls. The tray support has a curved cross-section extending inward toward the tray support on the opposing sidewall. The suspension tray has a curved recess on two opposing sides with the recess located and configured to engage the tray support during use.

In still further variations, the support pan has an outward extending top flange around the open top of the pan and two tray supports extend between the shoulder and the top flange on each of two opposing sidewalls. The two tray supports on each sidewall are equally spaced along the top flange of the sidewall to divide the top flange into three equal length segments, so the support pan can support three, equally sized, rectangular food trays. Each tray support has a curved cross-section extending inward toward the support on the opposing sidewall. Each suspension tray has two curved recesses on two opposing sides with the each located and configured to engage a different one of the tray supports during use. Thus, the two, curved recess on each side of the suspension tray are equally spaced along each side of the tray.

There is also provided a chafing dish for preferred use with a single, half-food tray on a top periphery of the chaffing dish when the chaffing dish rests on a support surface. The chafing dish has a pocket configured for use with a water reactive, exothermic material to heat the food tray. The chaffing dish, includes a support pan having an open top, two hollow legs with closed bottoms for resting on the support surface during use. Each of the legs opens toward the open top and extends along opposing sides of the open top with an outward facing side of each leg inclined outward and extending upward to form an opposing side of the support pan's top periphery. Each leg has an inward facing side extending inward and upward to connect to an opposing side of a pocket configured to hold the water reactive, exothermic material during use. The pocket having a depth less than a height of the inward facing sides of the legs, so a bottom of the pocket is spaced apart from the support surface during use. The support pan has a top support lip extending outward around the top periphery and connected to the outward facing sidewalls and further connected to end walls which in turn connect to the legs and pocket, so the end walls and the outward facing side of the legs cooperate to enclose the chafing dish below the top support lip so the entire support pan is formed of a continuous sheet of material. This chaffing dish has not suspension tray and is advantageously molded of plastic by an injection molding process, so the entire chafing dish is molded at the same time, or stamped or formed from a sheet of metal foil so the entire chaffing dish is formed at the same time.

In further variations of this last chaffing dish, the support pan is advantageously rectangular in shape with the legs extending along a majority of a length of two opposing sides of the support pan. The inward and outward facing sides of each leg form a cross-section having a V-shape to facilitate stacking of the chaffing dishes for shipment or storage. The support pan is advantageously made of thin plastic or thin aluminum having a thickness of 0.04 to 0.06 inches.

BRIEF DESCRIPTION OF THE DRAWINGS

These and other advantages and features of the invention will be better appreciated in view of the following drawings and descriptions in which like numbers refer to like parts throughout, and in which:

FIG. 7 is a perspective view of the pan and tray of FIG. 5 with a half food tray supported at a second end of the support pan;

FIG. 8 is a perspective view of the pan and tray of FIG. 5 with a full food tray supported by the support pan;

FIG. 56 is a top perspective view of an assembly of the support pan of FIG. 45 and the suspension tray of FIG. 51;

FIG. 69 is a perspective view of a chafing dish with a top cover.

DETAILED DESCRIPTION

As used herein, the relative directions up and down or above and below refer to relative directions along the vertical axis. The relative directions inward and outward refer to lateral directions in the horizontal plane, orthogonal to the vertical axis toward and away from an axis through the center of the chaffing dish. As used herein a chaffing dish assembly may include a chaffing dish in the form of a support pan for a food tray—with or without the food tray, or it may include the support pan and a suspension tray for a water activated, exothermic material—with or without the food tray, and it may also include the water and the water activated exothermic material in the suspension tray—when the suspension tray is present. As used herein, the term disposable refers to a support pan and suspension tray which permanently deform during normal as discussed further below, after several parts of the chafing dish are described.

Figure 1:
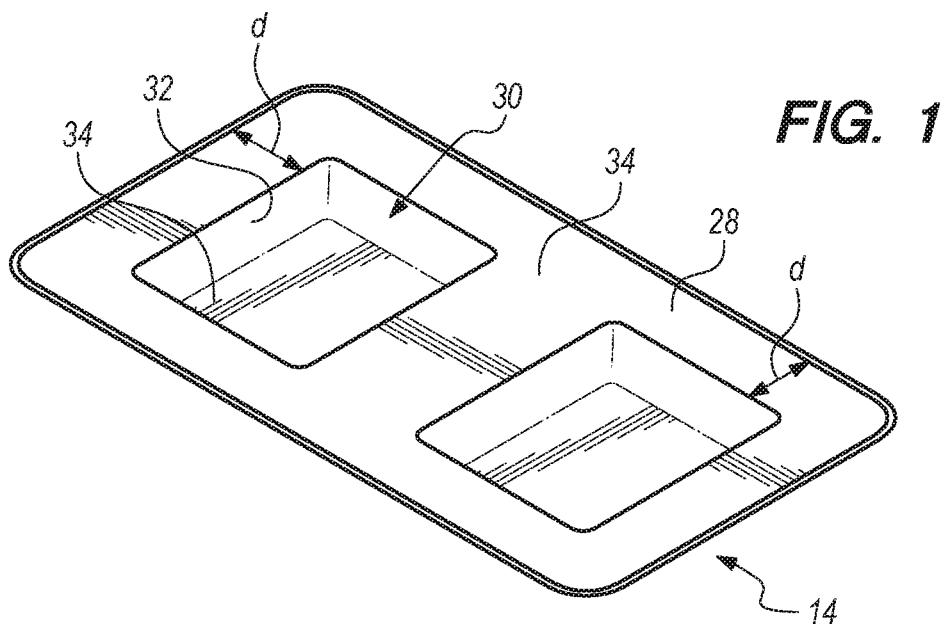
FIG. 1 is a perspective view of the top of a suspension tray.
Figure 2:
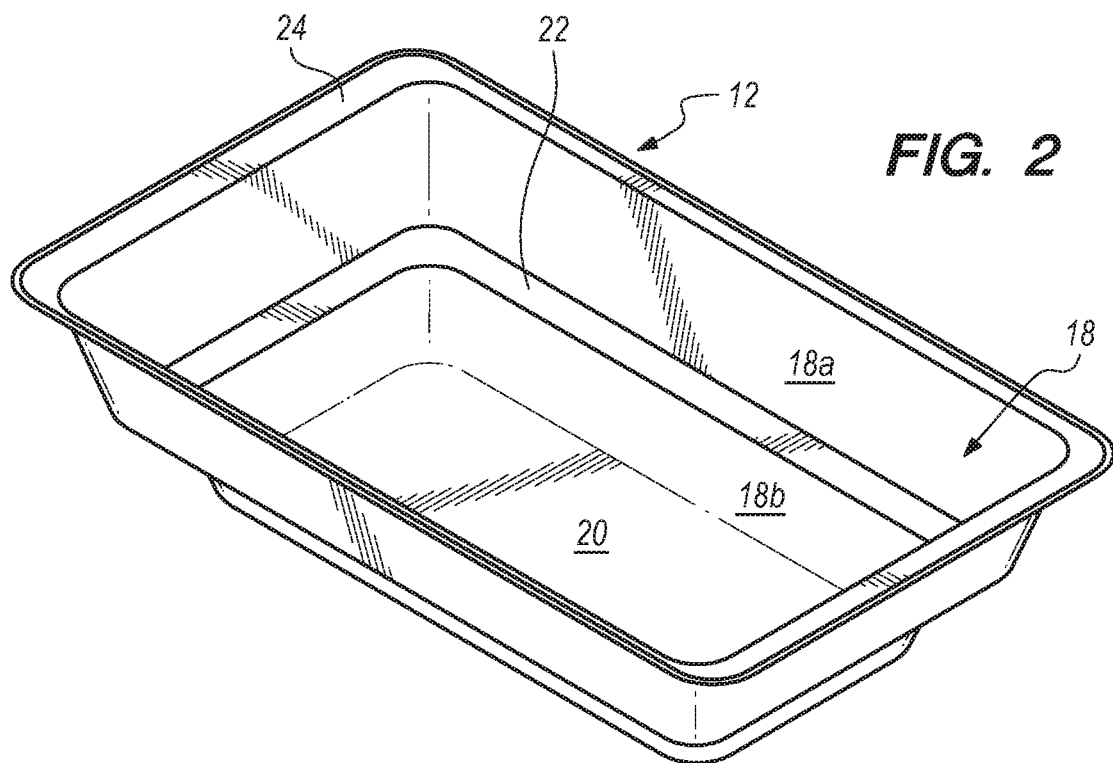
FIG. 2 is a perspective view of the top of a support pan.
Figure 3:
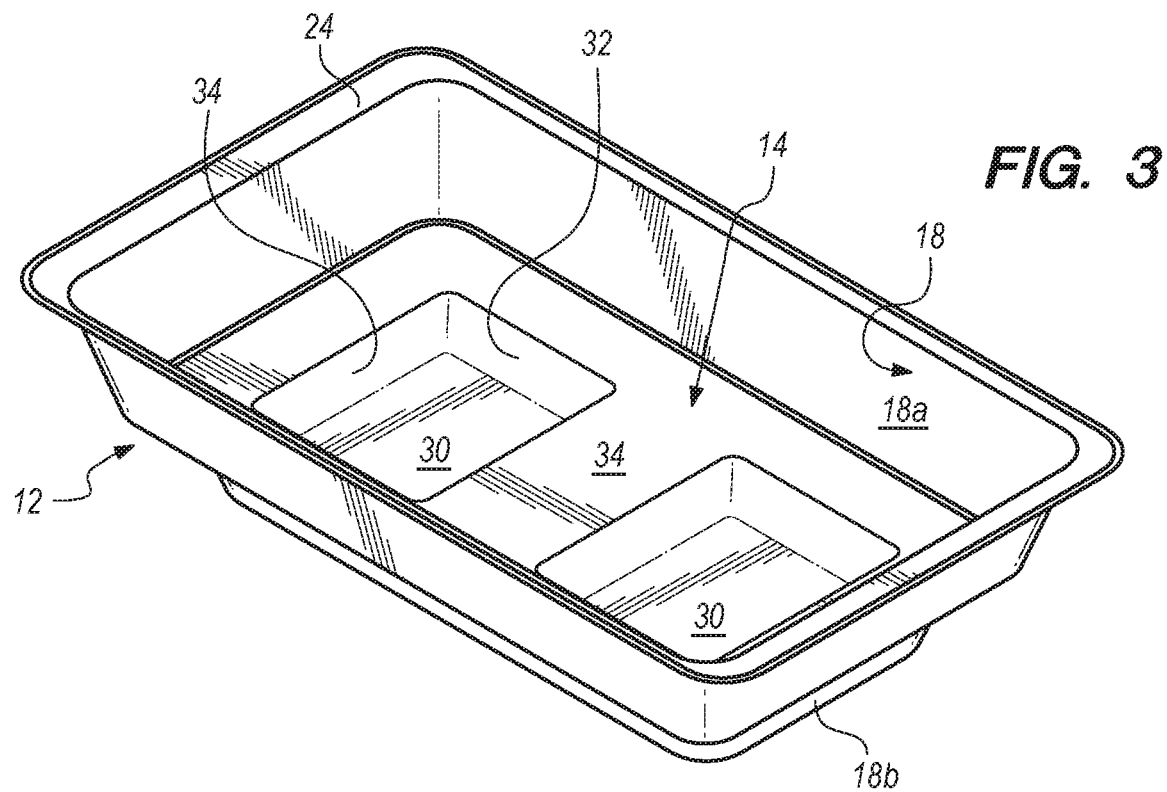
FIG. 3 is a perspective view of the top of the suspension tray of FIG. 1 in the support pan of FIG. 2.
Figure 4:
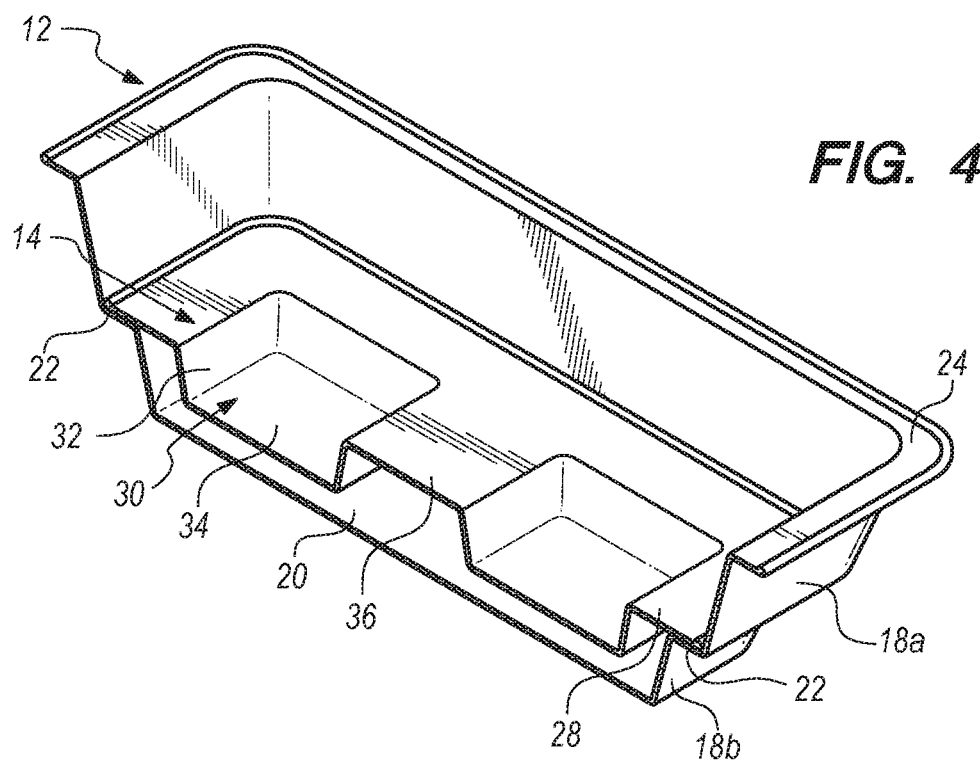
FIG. 4 is a sectional view along the longitudinal axis of FIG. 3.
Figure 5:
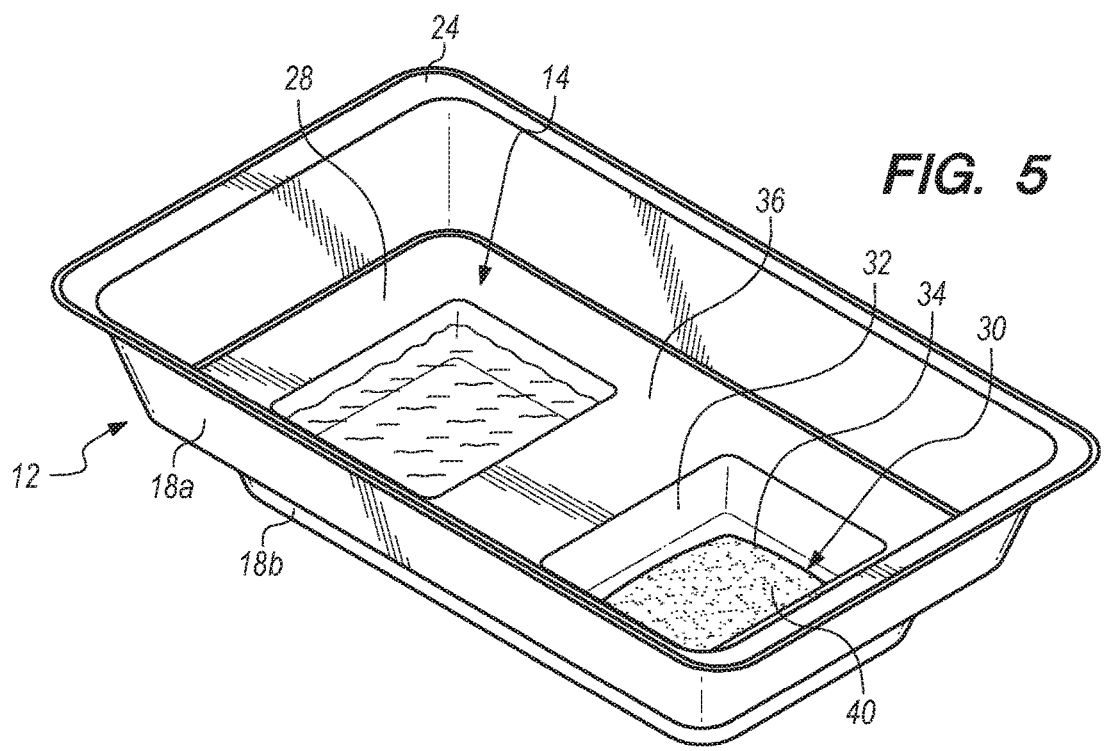
FIG. 5 is a perspective view of the support pan and suspension tray with water in a first pocket of the suspension tray and an exothermic packet in the second pocket of the suspension tray.
Figure 6:
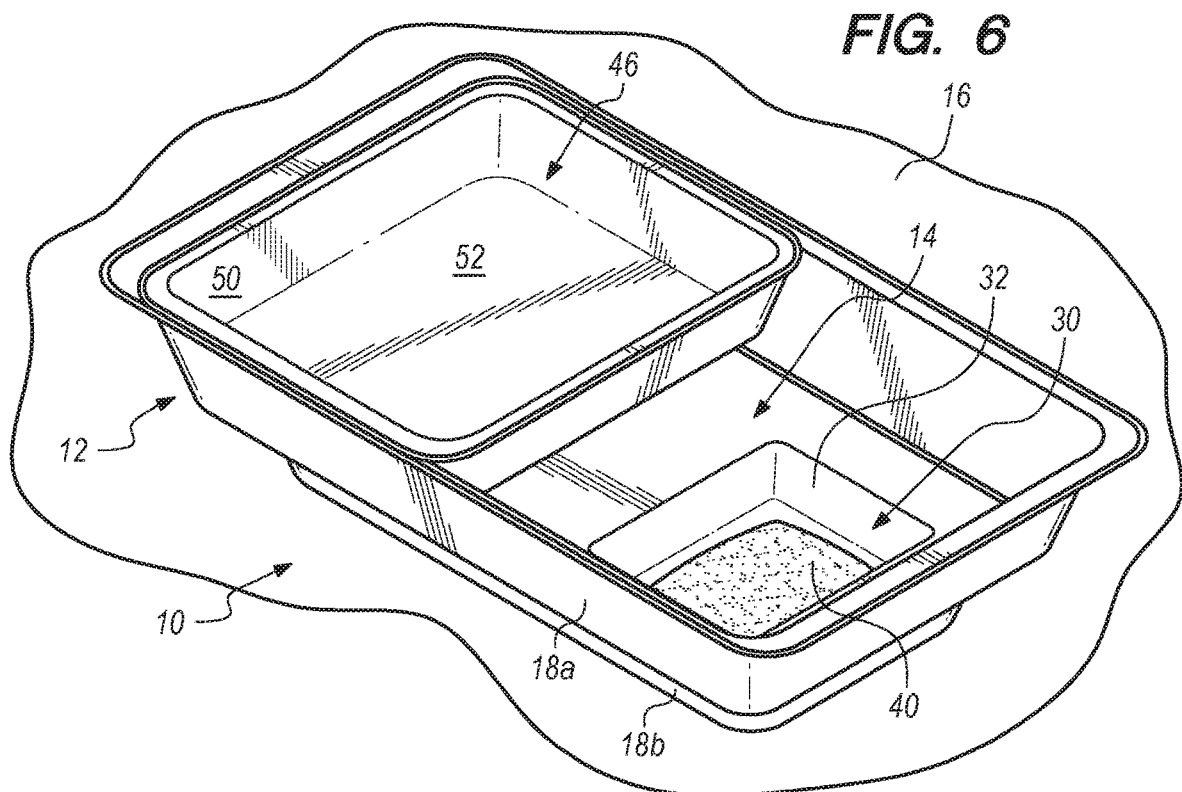
FIG. 6 is a perspective view of the pan and tray of FIG. 5 with a half food tray supported at a first end of the support pan.
Figure 9:
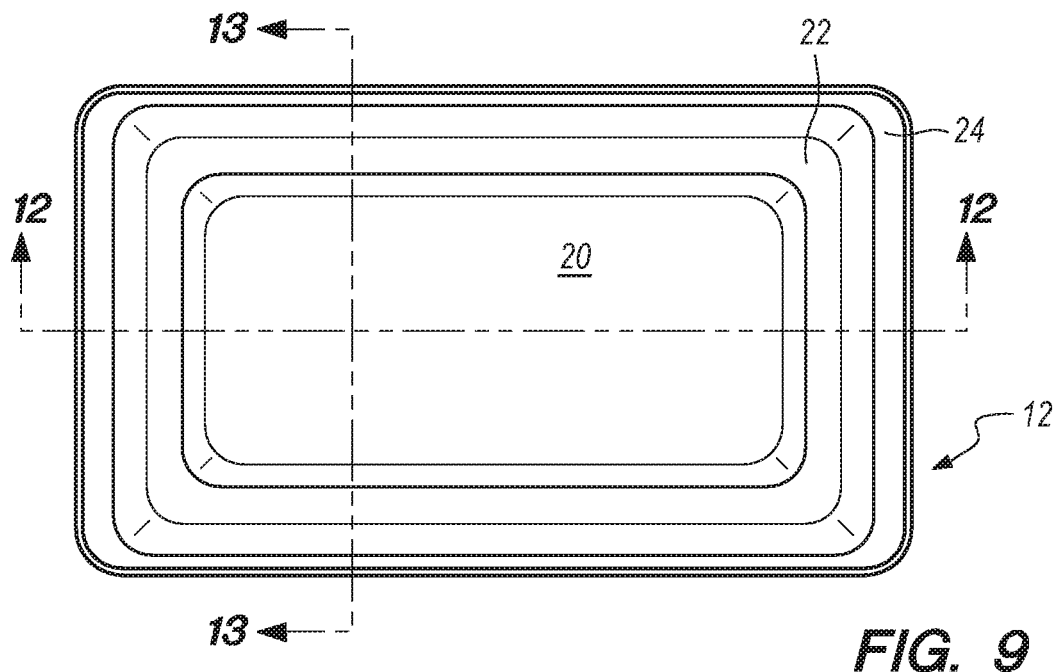
FIG. 9 is a top view of the support pan of FIG. 2.
Figure 10:
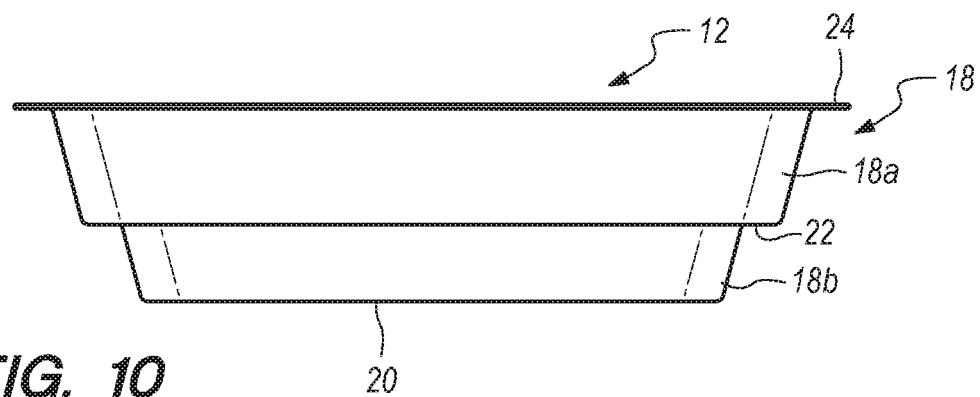
FIG. 10 is a side view of the support pan of FIG. 9, with the opposing side view being a mirror image thereof.
Figure 11:
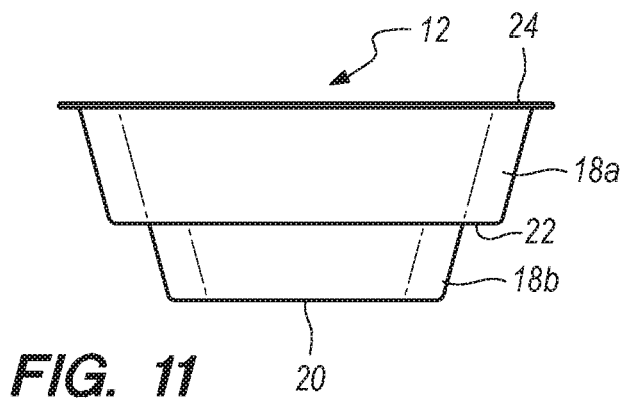
FIG. 11 is an end view of the support pan of FIG. 9, with the opposing end view being a mirror image thereof
Figure 12:
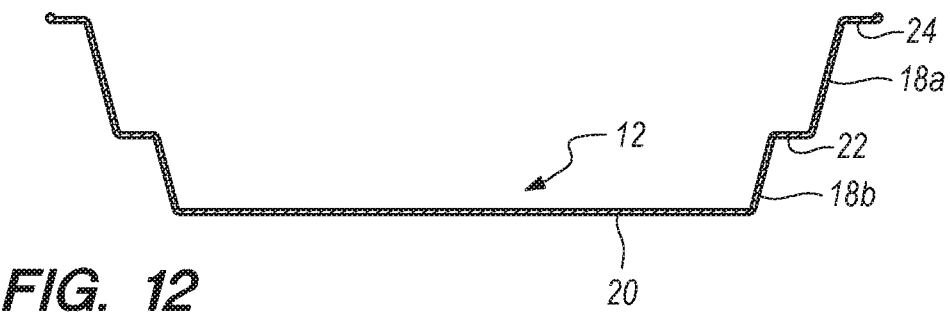
FIG. 12 is a sectional view taken along section 12-12 of FIG. 9.
Figure 13:
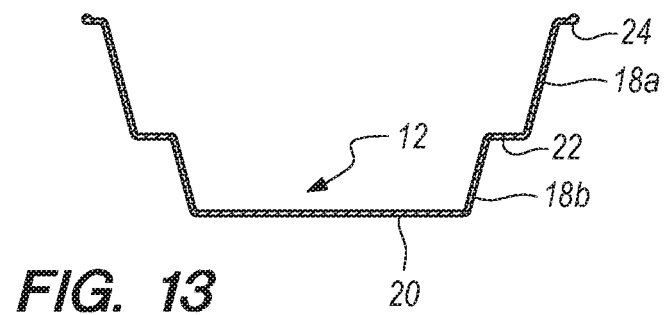
FIG. 13 is a sectional view taken along section 13-13
Figure 14:
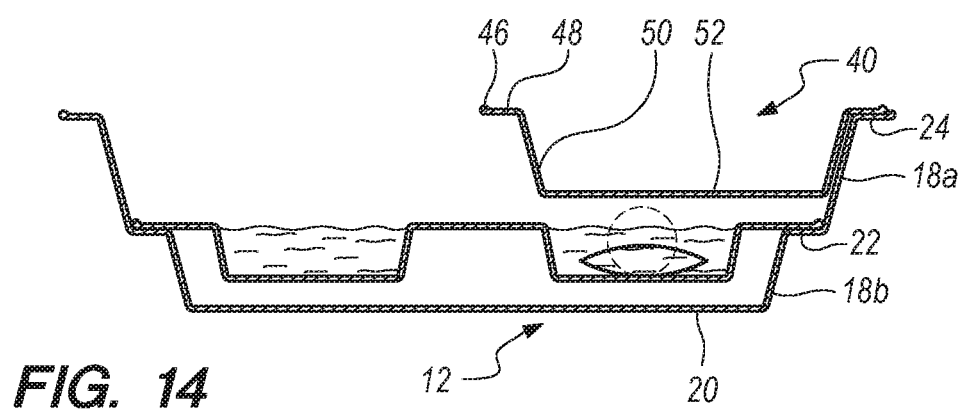
FIG. 14 is a sectional view taken along section 14-14 of FIG. 7.
Figure 15:
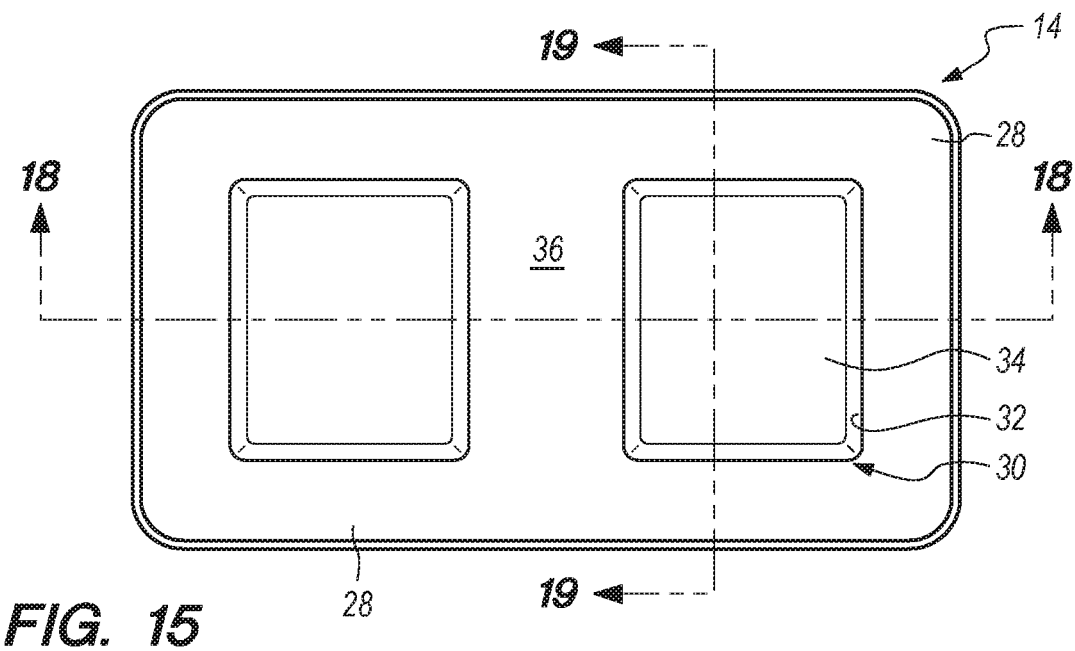
FIG. 15 is a top view of the suspension tray of FIG. 1.
Figure 16:
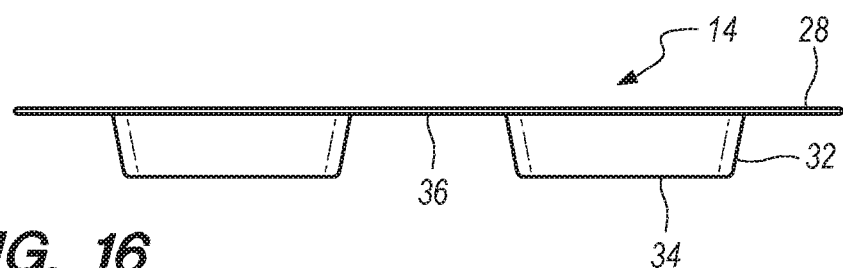
FIG. 16 is a side view of the suspension tray of FIG. 16, with the opposing side view being a mirror image thereof.
Figure 17:
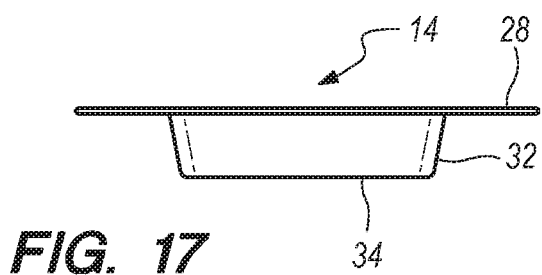
FIG. 17 is an end view of the suspension tray of FIG. 16, with the opposing end view being a mirror image thereof
Figure 18:
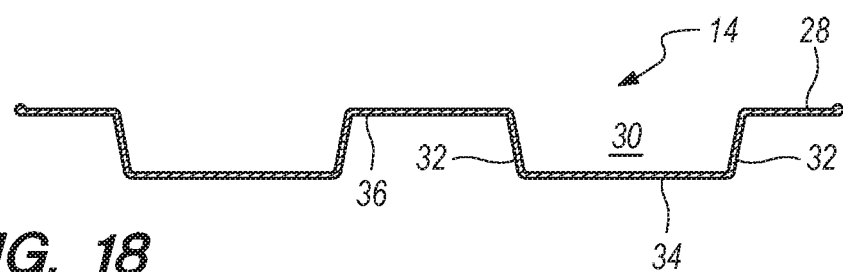
FIG. 18 is a sectional view taken along section 18-18 of FIG. 15.
Figure 19:
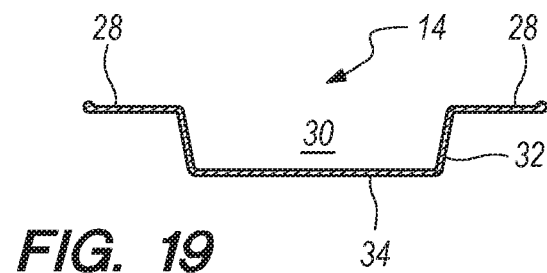
FIG. 19 is a sectional view taken along section 19-19 of FIG. 15.

Referring to FIGS. 1-19, a disposable chafing dish 10 is provided having an outer, support pan 12 supporting an inner suspension tray 14 and resting on a generally horizontal support surface 16 (FIG. 6). The support pan and suspension tray are preferably made of thin-walled aluminum or plastic designed for disposable, single use applications.

The wall thickness of these disposable pans and trays are so thin the walls bend easily, crack easily if made of plastic, and punctures easily. The thin-walled aluminum pans sold to roast Thanksgiving turkeys are made of such single-use aluminum material. Because these pans and trays must safely survive their first use, it may be possible to reuse such pans or trays a few times, but even careful hand cleaning them for reuse typically results in dents, bends and often perforations and tears that typically limit their (careful) reuse to a very few times beyond the typical and intended, single use application.

The support pan 12 advantageously has a generally rectangular shape with a continuous sidewall 18 extending around the generally rectangular periphery and joined at a bottom 20. As used herein, the "continuous" sidewall or other parts means the part is sufficiently continuous to block the passage of steam and is contrasted with an open mesh or perforated material allowing air and steam to pass through. The sidewall 18 is preferably stepped outward, having an outwardly extending ledge or flange 22 forming an internal shoulder which extends around an outer periphery of the outside of the outer support pan 12. The support pan 12 has an outwardly extending support pan lip 24 at the top of the support pan and advantageously encircling the top periphery the support pan. The sidewall 18 and bottom 20 advantageously form an enclosed structure open at the top encircled by the support pan lip 24. The lip 24 may have a rolled peripheral edge, especially if made of a thin metal or plastic that may form a sharp edge that could cut a user's fingers.

Shoulder 22 separates the sidewall 18 into upper and lower sidewalls 18a, 18b, respectively. Advantageously the upper or top sidewall 18a has a longer vertical length or height than the lower sidewall 18b. The shoulder 22 is advantageously located so there is a gap between the bottom of a food tray held in the chafing dish and the shoulder and the suspension tray 14 that rests on that shoulder during use, and between the food tray and the heating packet 40 held in the suspension tray. Each sidewall advantageously has two opposing sides and two opposing ends to form a rectangular shape. The sidewalls 18a, 18b are inclined outward to allow a generous draft angle so the thin-walled aluminum may be formed without tearing. An angle of about 5-10 degrees is believed suitable. A corner radius of about 0.5 inches is believed suitable.

The suspension tray 14 advantageously has an outer periphery conforming in shape to the shoulder 22 of the support pan. In the depicted embodiment the suspension tray is generally flat sheet, generally rectangular sheet of material with depending pockets and with rounded corners resting on the flange 22 (shoulder 22) during use and sized to fit easily within the outer boundary of that shoulder 22 so there is no binding between pan 12 and tray 14 if the suspension tray 14 expands as the temperature increases during use. The suspension tray 14 thus advantageously has a generally rectangular top plate 28 with rounded corners, and a length and width slightly smaller than the length and width of the flange 22 or shoulder 22 of the outer pan. The suspension tray 14 has one or a few pockets 30 depending downward so they extend toward the bottom 20 of the outer pan during use. There are advantageously two, pockets 30. The pockets 30 are preferably rectangular in shape. In the depicted embodiment, the long sides of the rectangular shape extend parallel to the long side of the support pan. As used herein, rectangular pockets may include square shaped pockets. Each pocket 30 has a continuous pocket sidewall 32 joined to a pocket bottom 34. A center divider 36 at the middle of the top plate 28 separates the pockets 30 along the length of the top plate. The pockets advantageously form waterproof containers with an open top, and water is placed into the pockets during use.

The pockets 30 are advantageously located inward from the adjacent end and two opposing sides of the lower sidewall 18b. This is achieved by having the top plate 28 extend outward from the top edge of the pockets 30 a distance of about "d." A spacing or distance d of about 1-3 inches around the periphery of the pocket 34 is believed suitable, with a shoulder 22 having a width of about 0.5 to 1 inch. The top plate 28 is preferably rectangular in shape with rounded corners conforming in curvature with the rounded corners of the support pan 12. The top plate 28 has a width and length about the same as the inner width and length of the flange 22 forming the shoulder 22, but slightly smaller. A difference of about 0.1 inch between the outer periphery of the top plate 28 and the bottom of the inner sidewall 18a is believed suitable. The outer periphery of the top plate 28 advantageously overlaps with and rests against the top surface of the ledge or shoulder 22 so the shoulder supports the suspension tray with the sidewalls 32 of each pocket about one inch from the adjacent sidewall 18b of the support pan. The sidewalls of the pocket on opposing sides of the center divider 36 are further apart, about 3.5 to 4 inches apart in the depicted embodiment.

A porous packet 40 (FIGS. 5, 6, 13) containing an exothermic compound may be placed in one of the pockets 30, with a separate packet 40 advantageously placed in each pocket during use. One or a few food trays 46 have an outwardly extending top flange 48 encircling the top outer periphery and extending a distance to contact and be supported by support pan lips 24 on at least opposing sides of the support pan 12, and advantageously supported by support pan lips 24 on three or four adjacent sides of the support pan. Each food tray 46 has a food tray sidewall 50 and a food tray bottom 52 to form an enclosed container with an open top encircled by foot tray flange 48. The food trays 46 are preferably of thin-walled, disposable, single use, aluminum construction, having generous rounded corners and inclined draw angles on the food tray sidewalls 50 to allow formation of the food trays without tearing the thin aluminum.

During use, a packet 40 containing an exothermic compound that is reactive with water and compatible with food and potential human consumption is placed each pocket 30. The exothermic compound is advantageously calcium oxide or another compound having an exothermic reaction with water sufficient to cause the water to form steam. Such food compatible, water-activated, exothermic compounds are known and are not described in detail herein. The compound is advantageously held in a thin walled, fabric bag, or a woven or perforated polymer bag such as polyethylene so water can pass through the bag and steam can leave the bag. Each packet 40 has an initial size and an expanded size as illustrated in part in FIG. 14. The expanded shape of the packet 40 varies with the configuration of the material enclosing the expanding exothermic compound, and is illustrated as a generally thin, rectangular package expanding into a generally cylindrical shape as the exothermic compound swells expands. Each pocket 30 is deep enough so that the expanded packet 40 may rest on the pocket bottom 34 and not hit the bottom of a standard rectangular food tray 46 with its outward extending food tray flange 48 resting on the support pan lip 24. Advantageously, the expanded packet 40 does not abut both sides 32 of the pocket 30 containing the water and expanding or expanded packet 40, so as to push outward against those two opposing sides. Each pocket 30 is sized to hold a predetermined amount, preferably the optimum amount needed for full absorption by and exothermal reaction with the exothermic compound—without tearing or splitting the material retaining the reactive compound 42.

The flanges 48 on the food trays 46 hold the food trays above the shoulder 22 and heat packets 40. Depending on the weight of the food in the food trays 46 and the strength of the flanges 48 and food trays 46, and the strength of the support pan lip 24 and the support pan 12, the location of the bottom of the food tray may vary. The support pan 12 and suspension tray 14 are advantageously configured so the bottom of the food tray 46 does not contact the hot chemical packet 40. A distance between the shoulder 22 and the top of the support pan lip 24 of about 3-5 inches and preferably about 4 inches, is believed suitable for standard food trays having a depth of about 2.7 inches (about 6-7 cm).

The sidewalls 18 of the support pans 12 are uniformly inclined so a plurality of support pans may be nested into each other to provide for a compact stack for shipping. The nesting or stacking for shipment also strengthens the thin sidewalls 18 and thin bottoms 20 and helps avoid irreparable damage during shipping, such as tearing or perforation of the sidewalls 18 and bottoms 20. Similarly, the sidewalls 32 of the suspension tray 14 are uniformly inclined so a plurality of suspension trays may be nested into each other to provide nested and stacked trays 14 forming a compact stack for shipping. The nesting or stacking for shipment also strengthens the thin sidewalls 32 and bottoms 34 and helps avoid irreparable damage during shipping, such as tearing or perforation of the sidewalls 32 and bottoms 34.

During use, a user places a predetermined amount of water in each pocket 32. A separate porous packet 40 of exothermic compound is then placed in each pocket 30 and into the water in each pocket. The order could be switched with water added second, but that is believed less desirable. As more water is absorbed by the packet 40, the exothermic reaction with the exothermic compound becomes more pronounced so that in about 30 seconds or so the water in the pocket is boiling and forms steam. During the time the packets 40 are added and before the steam forms, the user advantageously sets the food tray(s) 46 onto the top of the support pan 12 so as to cover the entire open top of the support pan 12. As the steam is formed by the reactive exothermic compound in the pocket 30, the steam fills the space between the bottom 52 and sidewalls 50 of the food trays 46 and the suspension tray 14 and its top plate 28 to heat the food in the tray(s) 46.

The steam from the exothermic reaction is believed to the efficiently pass through the roughly inch thick space around the sides 50 and bottom 52 of the food tray(s) 46 suspended on the lip 24 of the support tray, to efficiently and uniformly heat the food trays and the food in those food trays. The overlapping support tray lips 24 and food tray flange 48 support the food tray and provide a partial seal to escaping steam. The chemical packets 40 are sized to maintain two half trays (each roughly 8.5×6×2.5 inches) of food, or one full tray (roughly 12.5×8.5×2.5 inches deep) of food at serving temperature of about 120° F., holding about 6-7 pounds in each half tray and 12-14 pounds for each full tray. The trays vary in width from 8.5 to about 10 inches. As desired, lids may cover the top of the half-food trays or whole food trays, with the lid preferably, but optionally, being disposable—such as a sheet of aluminum with its edges folded over or crimped over the flanges 48 of the food tray, or even over the support pan lip 24.

The roughly one-inch space between the pockets 30 and the adjacent sides 18b and bottom 20 of the support tray 12 is believed to provide sufficient insulation to prevent the support tray's bottom wall 18b and bottom 20 from becoming hot enough to damage the support surface 16 on which the support pan rests during use. Advantageously, the pocket bottom 34 is spaced vertically apart from the support pan bottom 20 and support surface 16 by about 0.5 to 2 inches, and preferably spaced apart about 0.5 to 1 inches vertically. Advantageously, there is a similar lateral spacing between the pocket sidewalls 32 and the adjacent sidewalls 18, except the lateral spacing may be greater than 2 inches because the lateral spacing does not affect stability as much as the vertical spacing does.

The stepped shoulder or ledge 22 also provides a surface that allows the support pan to be placed on a frame, if the user wants to do so. The stepped shoulder or ledge 22 laterally offsets the upper sidewalls 18a of the support pan 12 from the hot pockets 30 containing the exothermic reactant in pouches 40, and the steam generated by that exothermic reaction with water. The lateral displacement helps avoid inadvertent contact with the hottest part of the assembly at the pockets 30, especially when food trays 46 cover the top of the support pan. During use there is no direct access to the heat source provided by the packs 40 of exothermic material and water-filled pockets 30. Locating the pockets 30 inside the chafing dish 10 and blocking access to the pockets 30 and the heat packs 40 by the support pan 12, suspension tray 14 and food trays 46, is believed to make it more difficult for users to grab a hot chafing dish and is believed to make it more difficult for users to burn themselves.

Making the support pan and suspension tray out of disposable, thin-walled, formed aluminum or plastic allows an inexpensive chafing dish which may be disposed of to avoid or reduce clean-up. The disposable support pan and suspension tray lend themselves to single-use events, such as the yearly holiday, and avoid the need to clean and store collapsible frames. Stacking nested support pans allows users to grip the support pan 12 (and food trays if needed) to move the assembled support pan, suspension tray and food trays. The spacing between the trays is also believed also provides air insulation Advantageously, the sidewalls 18a, 18b are cool enough not to burn users who bump against them or inadvertently touch them, and less preferably are cool enough so that contact of a second does not cause a user's skin to blister. The generated steam is believed to be much more efficient than using methanol fuel canisters to heat a pan enough to generate steam, and the resulting temperatures of the pan are believed to be much less as the methanol fuel burns at a high temperature to reduce the potential temperatures of the components.

Inserting the suspension tray 14 into the support pan 12 so the suspension tray rests on the ledge 22 is believed to laterally stiffen the support pan and to resist bending. The weight of the water in the pocket(s) 30 and the weight of the packet 40 are believed to further stabilize the assembly, especially as the weight is low and near the support surface 16 on which the support pan and chafing dish rest during use. The depending pocket(s) 30 provide a low center of gravity for the support pan 12 and suspension tray 14 and makes the resulting chafing dish more stable, especially against inadvertent lateral contact from users. The ability to remove the large open space below the food trays 46 needed for insertion, removal, lighting and flame adjustment of the methanol fuel canisters allows the food trays to be much lower and closer to the support surface than in the prior art. A distance of about two inches from the bottom 20 of the support pan and support surface 16 to the shoulder 22 of the support pan is believed suitable, with a distance of about five inches to from the bottom 20 and support surface, to the top lip 24 believed suitable. That places the bottom of a two-inch deep food tray 46 suspended on the lip 24 only about three inches from the bottom 20 of the support pan and the support surface 16. That lower height is believed to greatly increase stability, to lower the center of gravity of the chafing dish 10, especially without full food trays 46, and is believed to reduce the weight and material of the support pan 12 and suspension tray 14.

The support pan 12 and suspension tray 14 may be made of molded plastic rather than thin aluminum. As the pan 12 and tray 14 do not themselves contain food and come directly in contact with food, the food-compatibility requirements are not significant. Suitable plastics compatible with food heating and selected to maintain their strength under the steam generating environment are believed to include polypropylenes, polyethylenes, polyurethanes, polycarbonates, PMMA, UHMW and acrylic materials. Polystyrene and expanded polystyrene are also believed suitable. A recyclable polymer is preferred. Support pans and suspension trays having thicknesses of about 0.04-0.06 inches are believed suitable for single use, disposable applications. Wall thickness of about 0.1 to 0.13 inches are believed suitable for reusable pans 12 and reusable suspension trays 14, although thicker pans may be suitable.

Plastic support pans 12 and suspension trays 14 have the advantage of being less thermally conductive than aluminum, and that helps maintain the temperature between the pans 12 and trays 14 and the food trays 46 and maintain the temperature for a longer duration. Alternately described, using plastic allows the support pan 12 and suspension tray 14 to act as insulators and reduce heat loss compared to the use of metals such as steel and aluminum on the support pan and/or suspension tray. For example, aluminum has a thermal conductivity of 205 Watts/meter-° K. at a room temperature of about 77° F. and that heat conductivity increases with temperature. In contrast, high density polyethylene has a thermal conductivity of about 0.5 W/(m K), polypropylene has a thermal conductivity of about 0.2 W/(m K), polycarbonate has a thermal conductivity of about 0.2 W/(m K), polymethylmethacrylate (PMMA) has a thermal conductivity of about 0.25 W/(m K), and polyurethane foam and expanded styrofoam or polystyrene have a thermal conductivity of about 0.03 W/(m K). There are thus a variety of plastic materials suitable for use in molding the support pan 12 and/or the suspension tray 14 which can be made inexpensively, which may be disposable or non-disposable depending on the wall thickness of the pan, and which are compatible with the food-preparation aspects of a chafing dish. Suitable plastic materials with a thermal conductivity under 1 W/(m K) are believed desirable, with thermal conductivities under 0.5 W/(m K).

Figure 20:
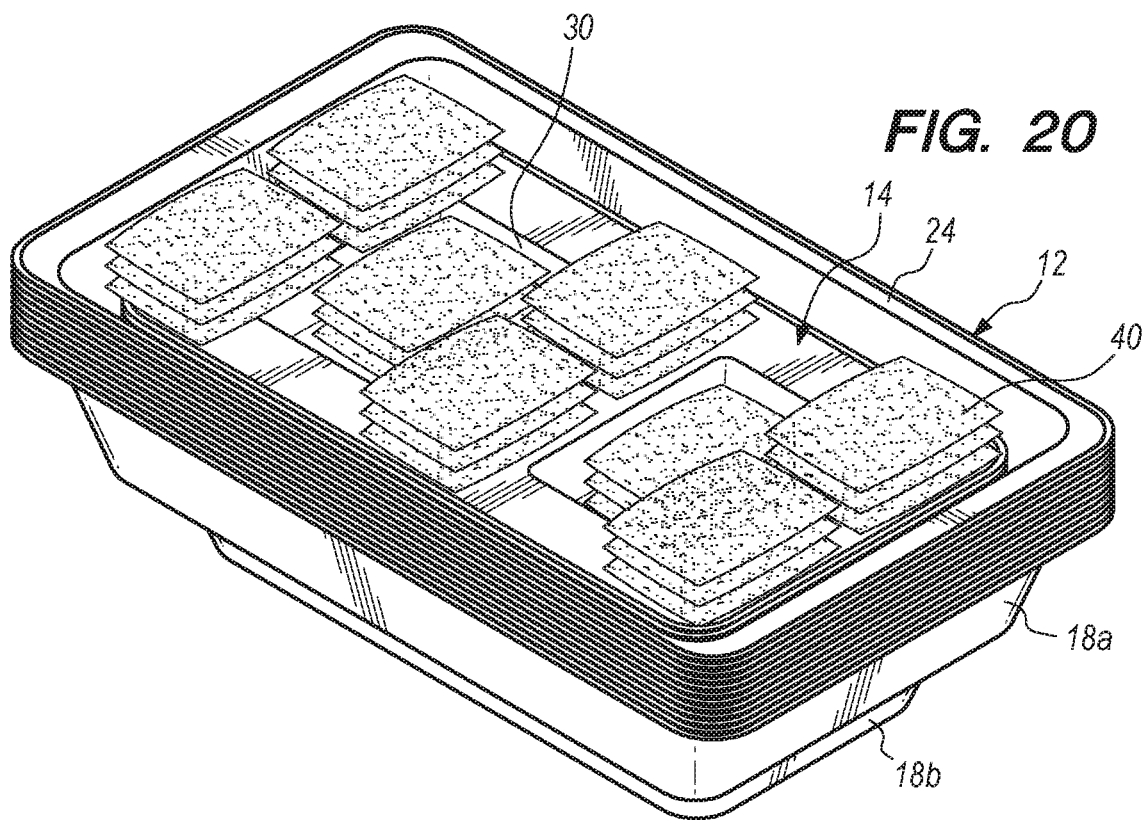
FIG. 20 is a perspective view of a plurality of nested and stacked support pans with a plurality of X nested and stacked suspension trays on the inside of the top one of the nested and stacked support pans, and with water permeable packets of exothermic material in that top support pan and on a the top one of the nested and stacked suspension trays.

Referring to FIGS. 20-23, the support pans 12, suspension trays 14 and packets 40 may be stacked for shipment, with several arrangements believed to offer shipping advantages. As seen in FIG. 20, a first shipping unit 56 having a support pan 12 and a suspension tray 14 resting on the shoulder 22 of the pan and having at least one and preferably two pockets 30. Advantageously, the shipping assembly includes a plurality of stacked units 56 and may comprise a plurality of X support pans 12 stacked in a nested manner, with a plurality of X suspension trays 14 stacked in a nested manner and placed inside the top support pan in the stack of X support pans. A plurality of 2X packets 40 of exothermic material are placed inside the top one of the stacked suspension trays when each pan 12 has two pockets 30. The packets 40 are advantageously stacked inside the top suspension tray 14 so the packets 40 do not extend above the plane containing the lip 24 of the top support pan 12 in the stack of X support pans. It is believed that a stack of twelve support pans 12 containing a stack of twelve suspension trays 14, with twenty-four packets 40 inside the top suspension tray 14 in the stack forms a desirable shipping assembly, especially when wrapped in thin, transparent plastic shipping material, such as cellophane or shrink-wrap. If the number of pockets 30 changes from the depicted two pockets, then the number of packets 40 will also change and increase or decrease as a multiple of the number of pockets in each suspension tray 14. The number of stacked units 56 may vary from twelve stacked pans 12 and trays 14, depending on the depth of the top sidewall 18a and the vertical thickness of any rolled outer peripheral edge on the lip 24. The number of stacked units 56 is advantageously selected to keep the trays 14 and packets 40 at or slightly below the plane of the lip 24, advantageously within 0.5 inch or less.

Alternatively, a stack of three units 56 may be provided, with three times the number of pockets 30 of the packets 40 placed inside the top suspension tray 14. The number of three units 56 is selected as a suitable number of units for an individual to acquire for use at one event.

Figure 21:
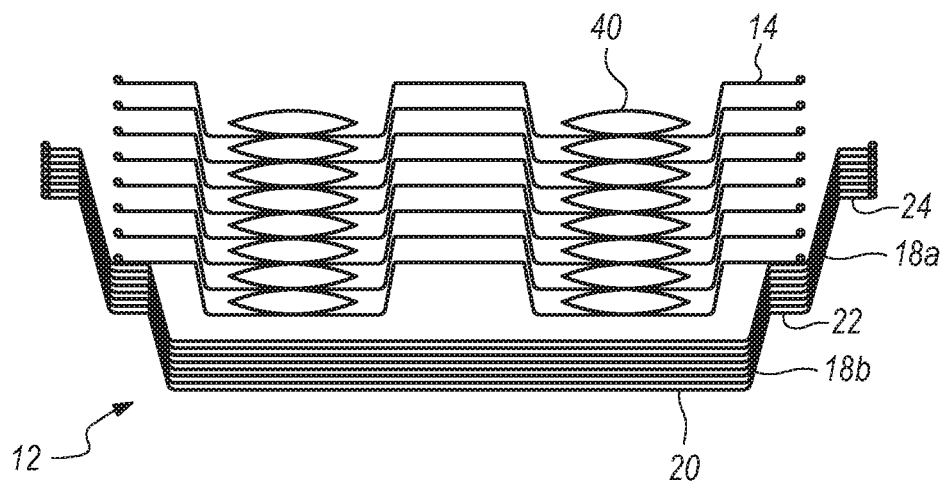
FIG. 21 is a section view of a plurality of nested and stacked units each including a support pan, a suspension tray with two pockets and a water permeable packet of exothermic material in each pocket.

Referring to FIG. 21, a second shipping assembly includes a unit 58 comprising a plurality of X support pans 12 stacked together in a nested arrangement, with a plurality of X suspension trays each having a separate packet 40 in each pocket 30 of the suspension tray, stacked together in a nested arrangement and placed inside the top support pan 12 in the stack of X support pans. Thus, if there are X support pans 12 stacked together, there are X suspension trays 14 and 2X pockets 40 (if each tray has 2 pockets), with the suspension trays stacked separately and each suspension tray having a packet 40 in each pocket 30 of the suspension tray. Because the packets 40 partially fill each pocket 30, the stacked and nested suspension trays 12 and packets create a greater vertical stack than if the packets 40 were omitted. But the nested and stacked trays are still believed to form a stronger shipping arrangement than shipping a single pan 12 with tray 14 resting on the shoulder 22 of the tray and with a packet 40 in each pocket 30 of the tray. It is believed a stack of eight units 58 is suitable, each unit having a support pan 12 with a suspension tray 14 resting on shoulder 22 of the pan, and with a packet 40 in each pocket 30 of the pan. While a nested stack of eight units 58 is believed desirable, different numbers of units 58 may be included in these nested and stacked arrangements. It is believed the stack of eight support pans 12 will have a height of about 7-8 inches, preferably about 7.5 inches, with each pan 12 having a height of about 5-6 inches, and preferably a height of about 5 to 5.3 inches.

Figure 22:
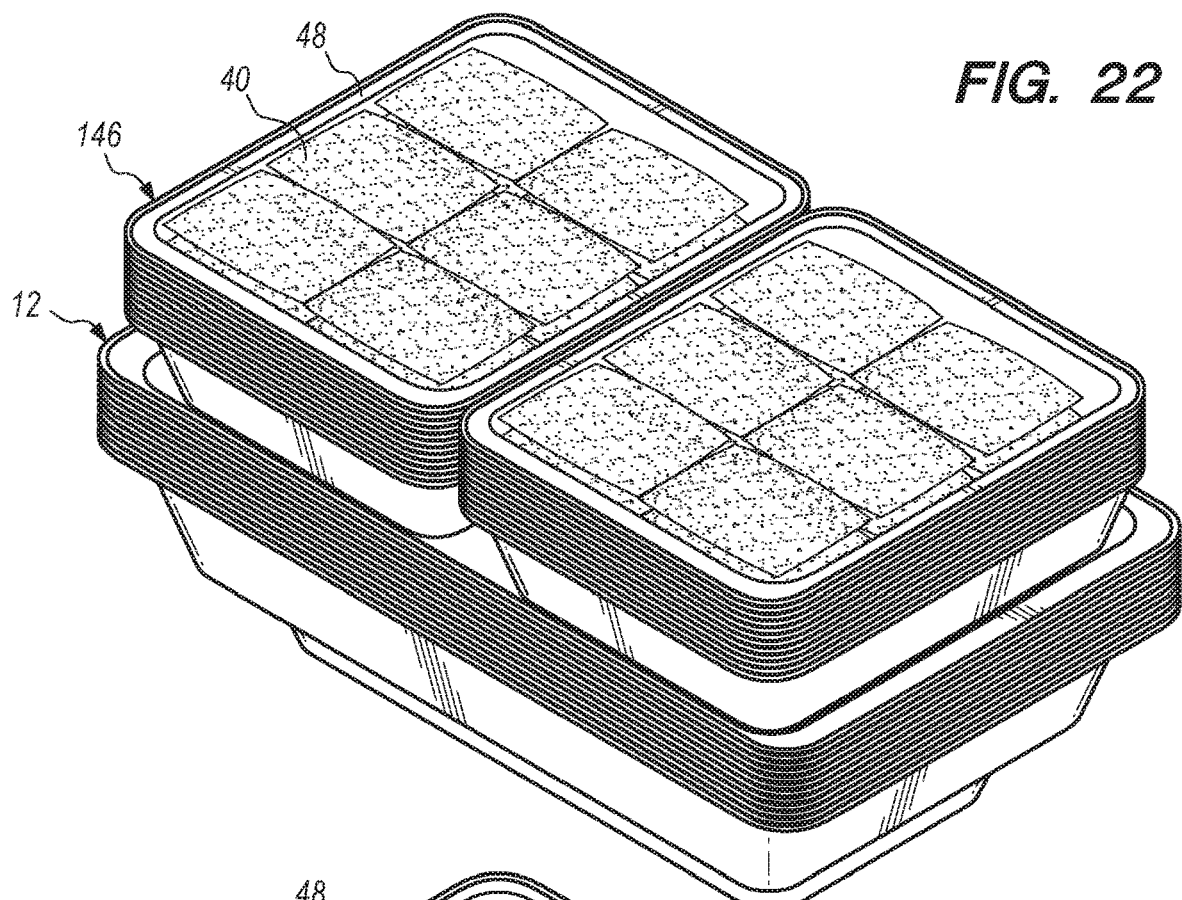
FIG. 22 is a perspective view of a plurality of nested and stacked units each including a support pan, a suspension tray with two pockets and a water permeable packet of exothermic material in each pocket, and with a plurality of half trays nested and stacked together and placed in the top one of the nested and stacked units.
Figure 23:
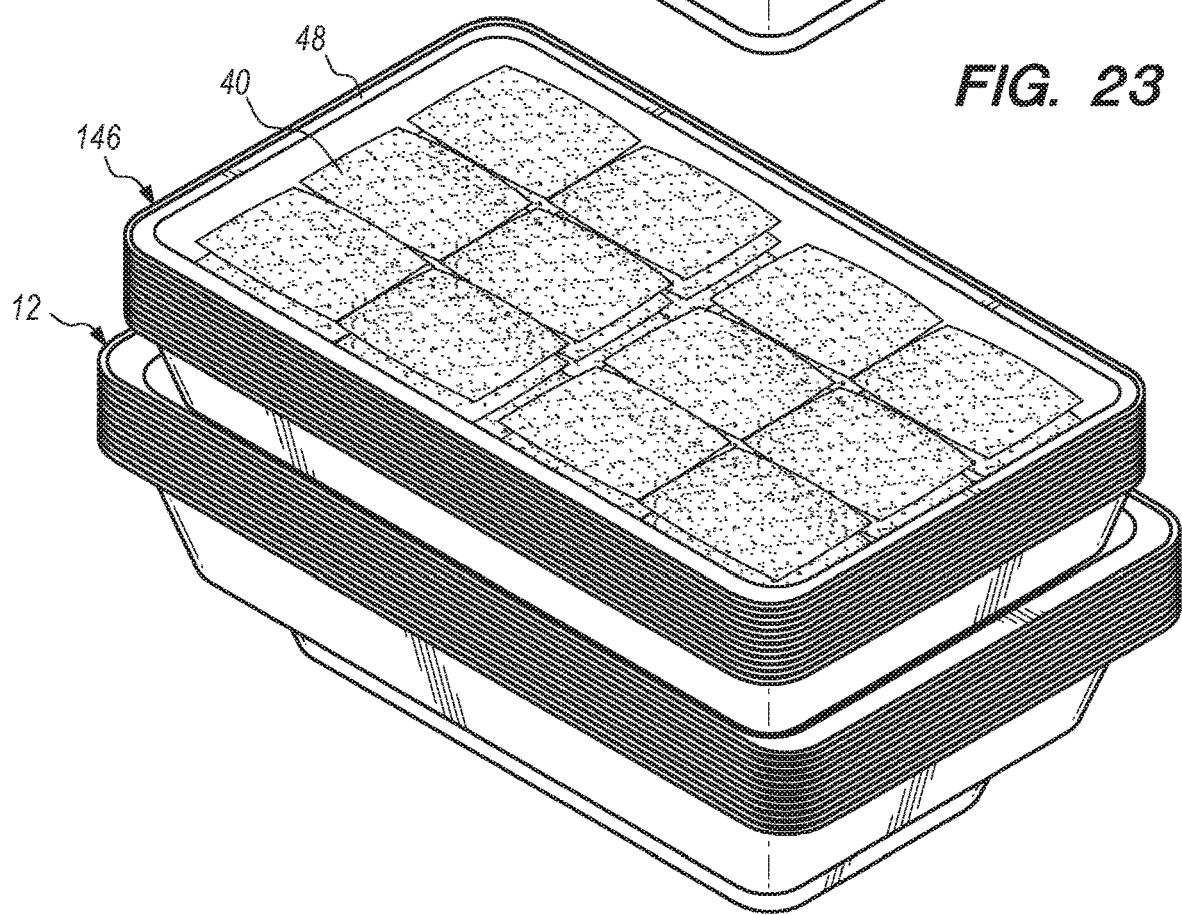
FIG. 23 is a perspective view of a plurality of nested and stacked units each including a support pan, a suspension tray with two pockets and a water permeable packet of exothermic material in each pocket, and with a plurality of full trays nested and stacked together and placed in the top one of the nested and stacked units.

Referring to FIGS. 22-23, a third shipping assembly is shown having three units 56 each containing a support pan 12 and a suspension tray 14 containing at least one pocket 30 and preferably containing two pockets 30. Advantageously, three units 56 are stacked and nested into a single-stack arrangement of three units 56. An appropriate number of food trays 46 are provided to cover the open top of the support pan 12, with FIG. 22 showing six half trays 46 (two for each pan 12), and with FIG. 23 showing three full trays 46 (one for each pan 12). The food trays 46 are placed in the top one of the stacked support pans 12, preferably, but optionally, with the pan's lips 24 contacting the food tray flange 48 on the bottom of the stacked and nested food trays to supporting the stack of food trays inside the top support pan. Six packets 40 of exothermic material are placed inside the top one of the stacked and nested food trays 46 when there are two pockets 30 in each support pan 12. As with the first and second shipping assemblies, the third shipping assembly may be wrapped in cellophane, shrink wrap, or other (preferably transparent) material to hold the pans 12, trays 14, food trays 46 and packets 40 together for shipping and to present a single unit for sales. Different numbers of units 56, packets 40 and food trays 46 may be provided, but three is believed suitable for use by an individual for a single event.

Figure 29:
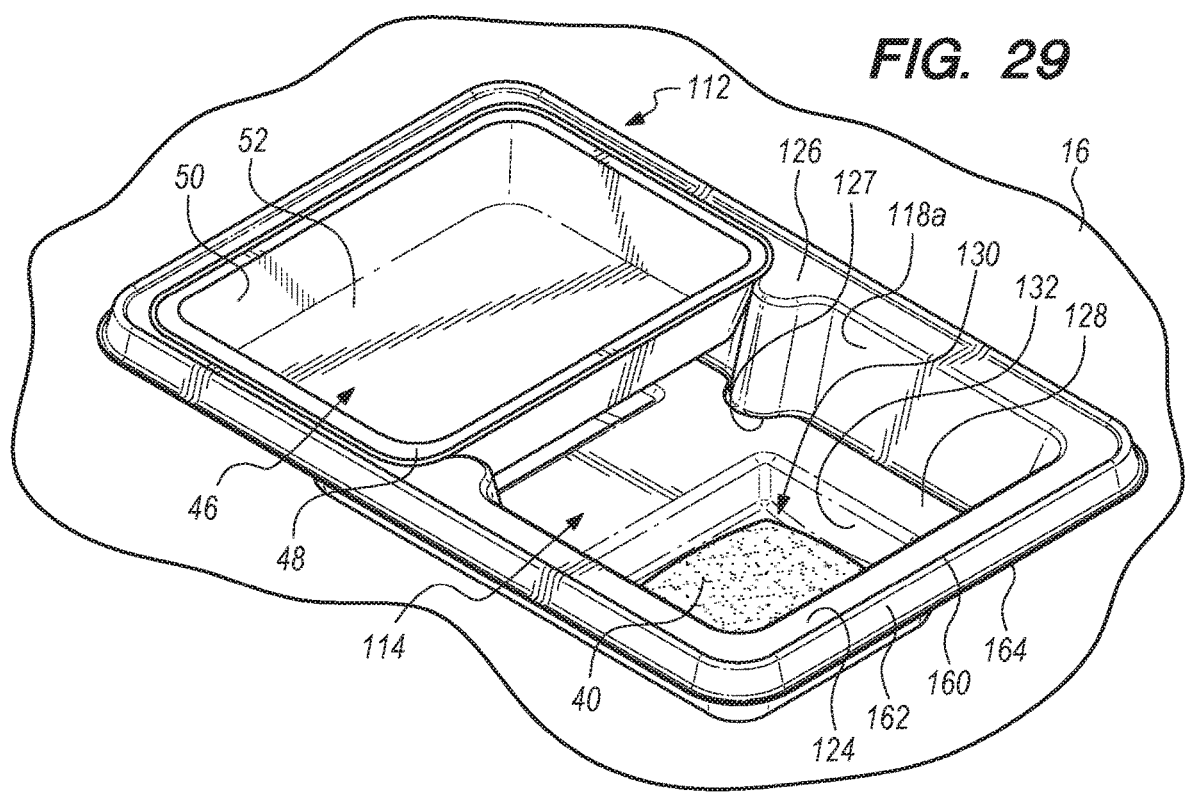
FIG. 29 is a top perspective view of the support pan of FIG. 28 with a half food tray on a first end of the support pan.

Referring to FIGS. 24 to 44, a second embodiment of the chafing dish 10 is provided, with unchanged parts having the same numbers as in the first embodiment and other part that are altered having numbers incremented by 100. The second embodiment chafing dish 100 has an outer, support pan 112 supporting an inner suspension tray 114 and resting on a generally horizontal support surface 16 (FIGS. 6, 29). The support pan 112 and suspension tray 114 are preferably made of thin-walled aluminum or plastic designed for disposable, single use applications, as described for the first embodiment of the chafing dish 10, which description is not repeated.

The support pan 112 advantageously has a generally rectangular shape with a continuous sidewall 118 extending around the generally rectangular periphery and joined at a bottom 120. The bottom 120 advantageously has a raised central portion 121 that is offset vertically away from support surface 16 a slight distance so the bottom 120 forms a narrow strip around the raised center portion 121. The raised bottom 121 advantageously conforms in shape with the shape of the juncture of the sidewall 118 and the bottom 120. The bottom 120, viewed from the top (FIG. 25, 31, 34-35), resembles a rectangular strip with rounded corners. The offset center portion 121 may be used to strengthen the otherwise flat bottom of the support pan 112 and may be used to provide an insulating air cavity between the support pan 112 and the support surface 16 on which the pan rests during use.

The sidewall 118 is preferably stepped outward, having an outwardly extending ledge or flange 122 forming an internal shoulder which extends around an outer periphery of the outside of the outer support pan 112. The support pan 112 has an outwardly extending support pan lip 124 at the top of the support pan and advantageously encircling the top periphery the support pan. The sidewall 118 and bottom 120 advantageously form an enclosed structure open at the top encircled by the support pan's top lip 124

Shoulder 122 separates the sidewall 118 into upper and lower sidewalls 118a, 118b, respectively. Each sidewall advantageously has two opposing sides and two opposing ends to form a rectangular shape. The sidewalls 118a, 118b are inclined outward to allow a generous draft angle so the thin-walled aluminum may be formed without tearing. An angle of about 5-10 degrees is believed suitable. A corner radius of about 0.5 inches is believed suitable.

The second embodiment of the chafing dish 110 has the center portion of the upper sidewall 118a extending inward toward the opposing sidewall 118a to form an inward extending tray support 126. The tray support 126 resembles a half column that extends from the shoulder 122 to the top lip 124 of the support pan and is inclined at the same angle as the sidewall 118a from which the tray support extends. The cross-section of the tray support forms a curved hat section the shape of which is best seen on the lip 124 which is of generally uniform width except at the juncture with the tray support 126. The cross-section shape of the tray support 126 advantageously has a curved periphery formed of three, one-quarter curves, each curve of about 90°. Two concave side curves 125a face in opposing directions along the sidewall 118a from which the curves extend as they face the corner curve in the generally rectangular support pan 112. The center, convex curve 125b is between and joins the convex side curves 125a and has an apex facing the side wall 118a on the opposing side of the support pan 112. The curves advantageously blend smoothly to form a curved periphery extending inward toward the center of the space encircled by the generally rectangular sidewall 18. The apex of the center curve 125b is advantageously tangential with the lower sidewall 118b.

Figure 26:
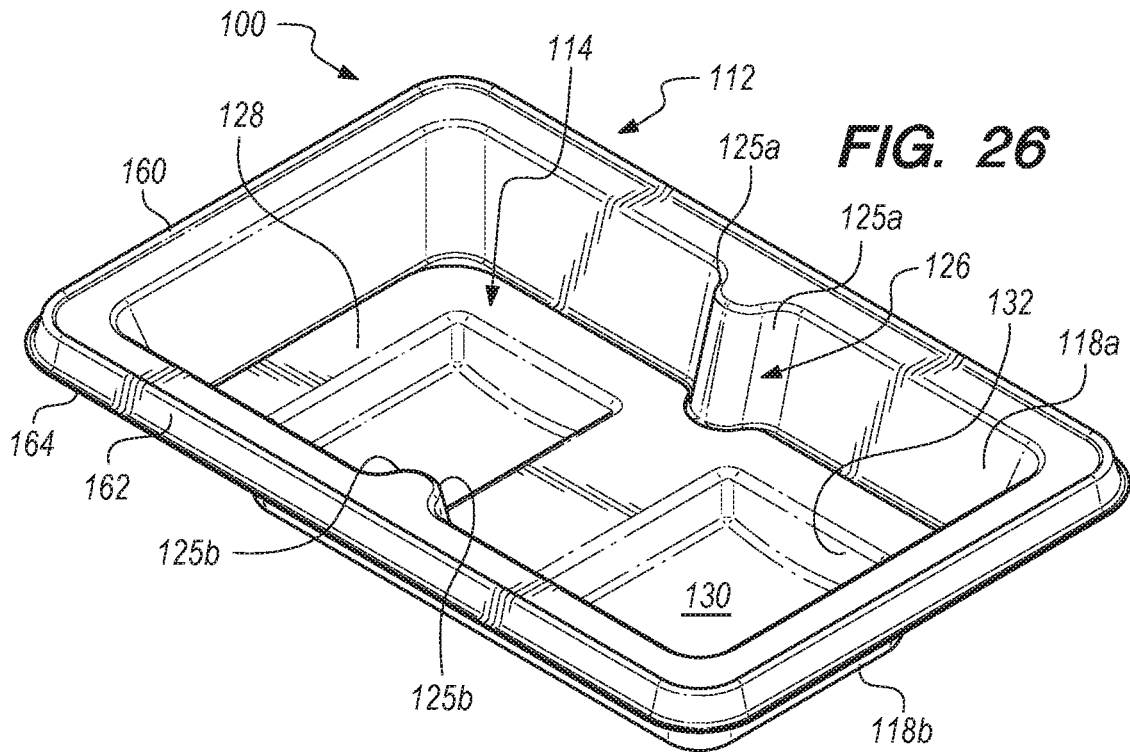
FIG. 26 is a top perspective view of the second embodiment of the suspension tray of FIG. 24 in the second embodiment of the support pan of FIG. 25.
Figure 27:
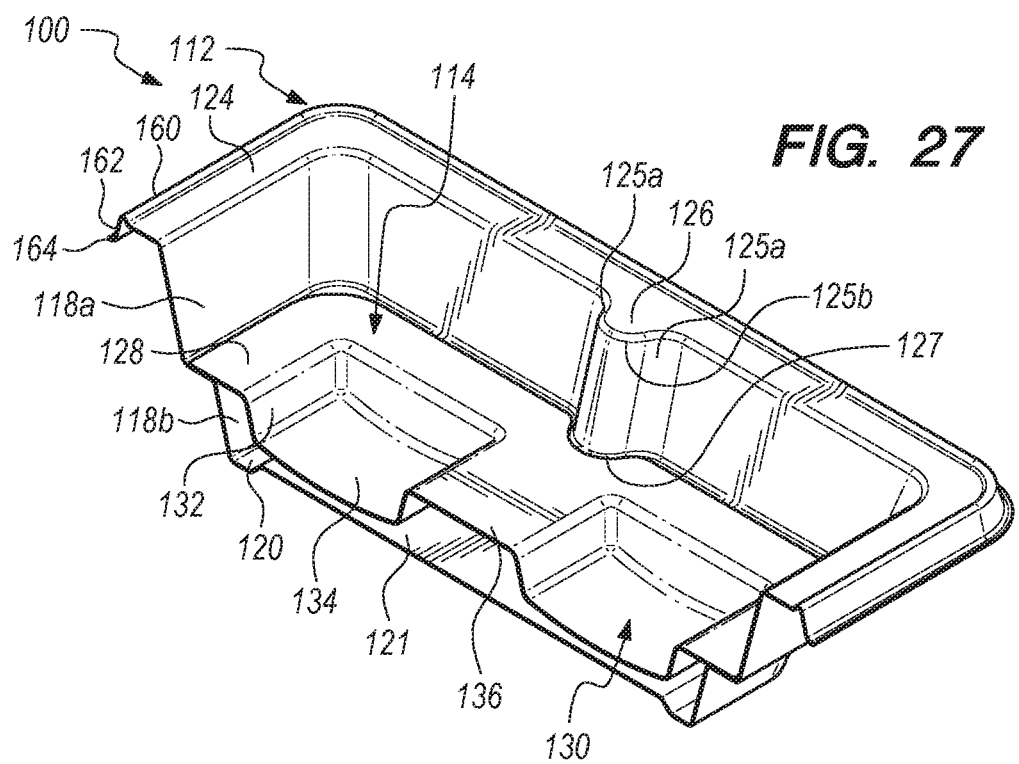
FIG. 27 is a sectional view along the longitudinal axis of FIG. 26.
Figure 28:
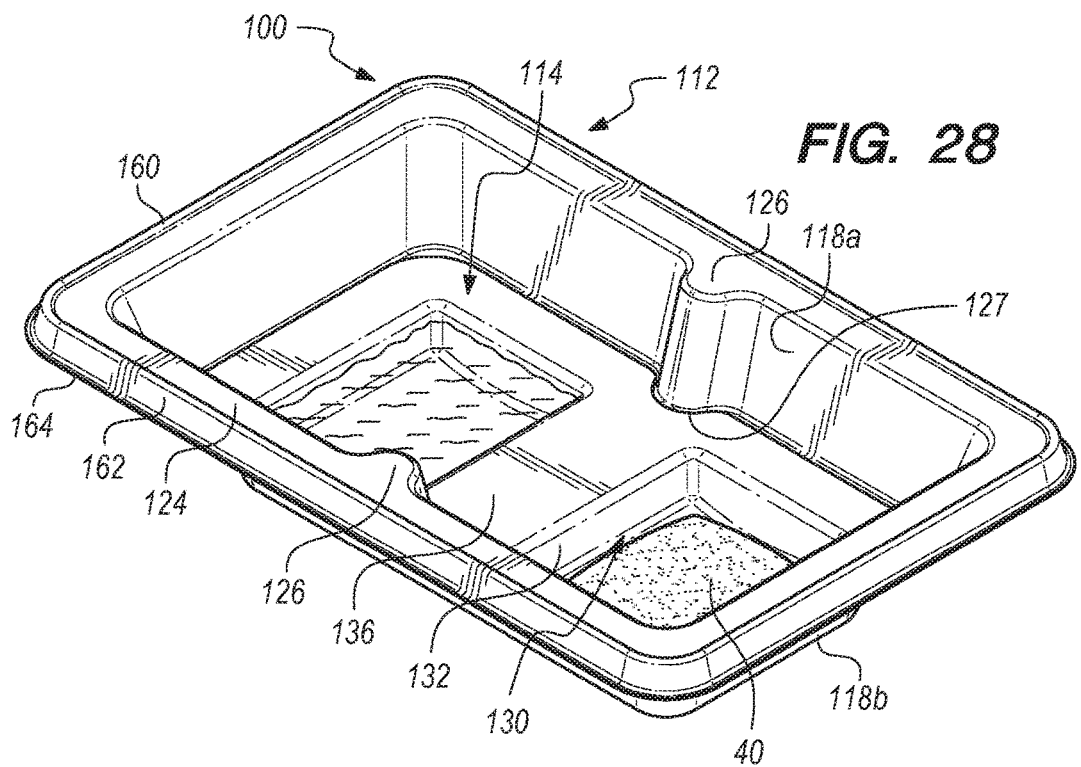
FIG. 28 is a top perspective view of the suspension tray and support pan of FIG. 26 containing water and a chemical pack.
Figure 30:
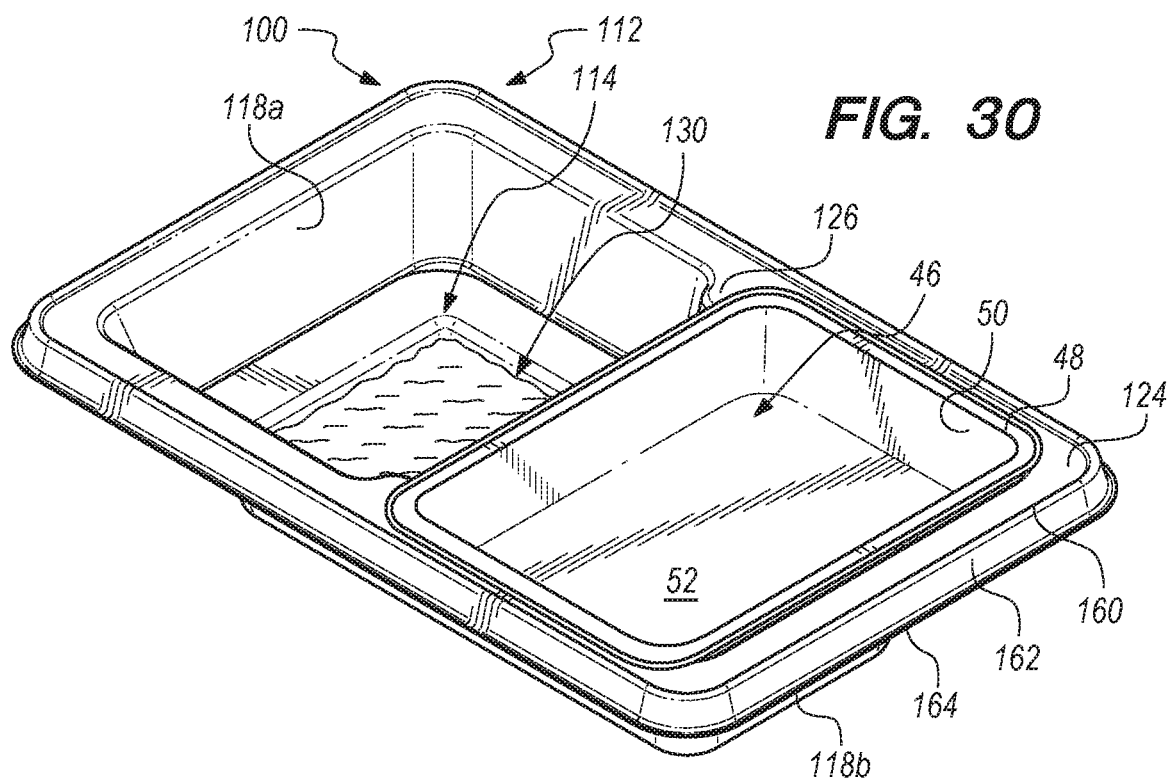
FIG. 30 is a top perspective view of the support pan of FIG. 28 with a half food tray on a second end of the support pan.
Figure 31:
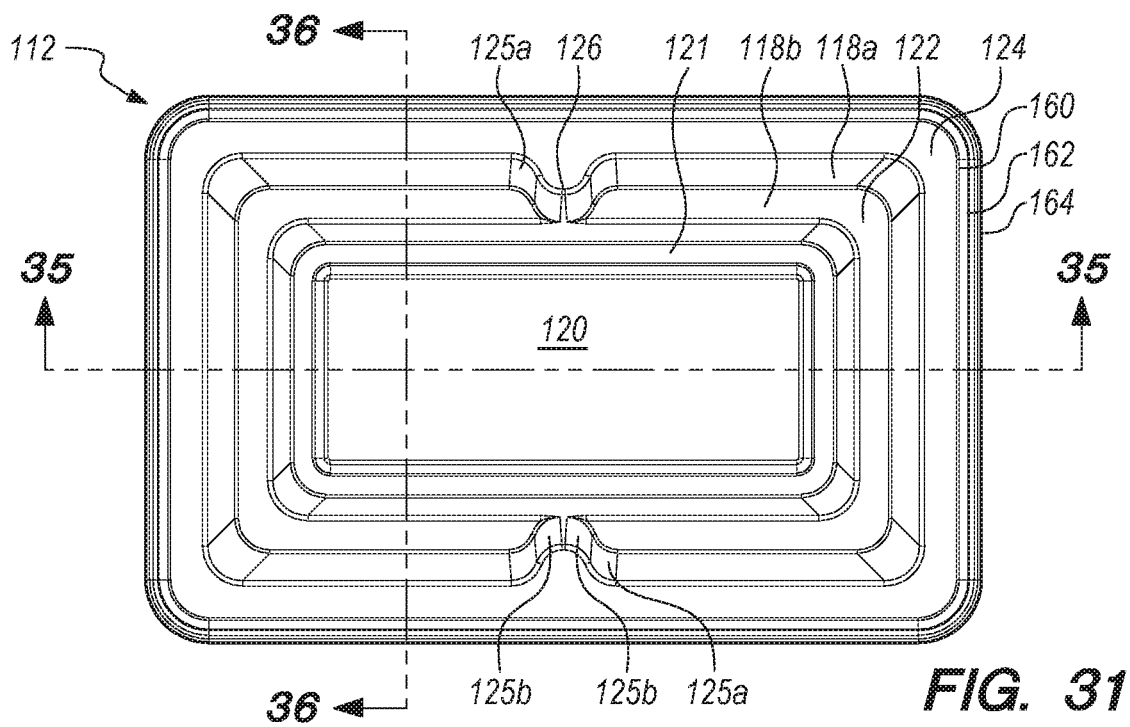
FIG. 31 is a top view of the support pan of FIG. 25.
Figure 32:
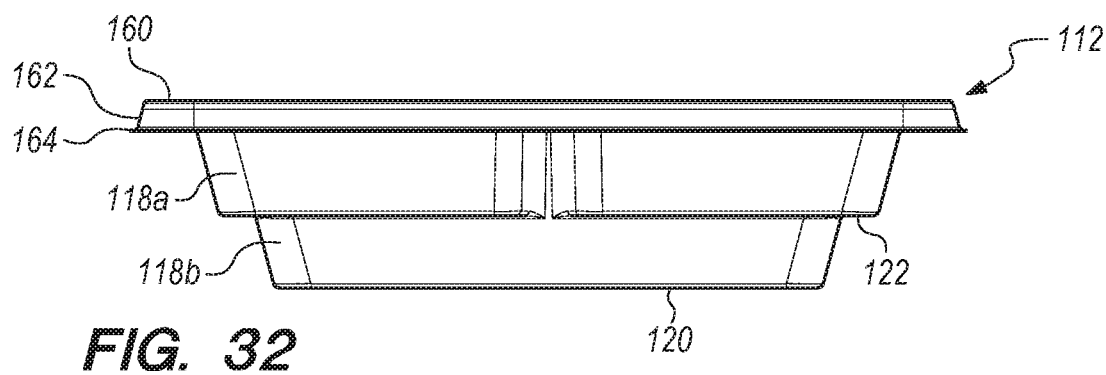
FIG. 32 is a side view of the support pan of FIG. 31, with the opposing side view being a mirror image thereof.
Figure 33:
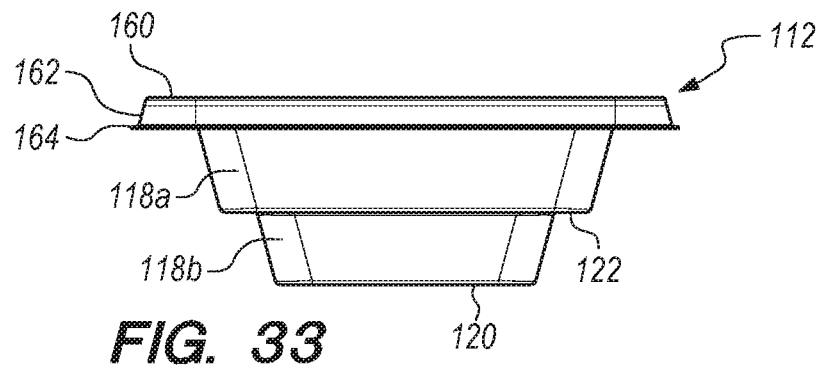
FIG. 33 is an end view of the support pan of FIG. 31, with the opposing side view being a mirror image thereof.
Figure 34:
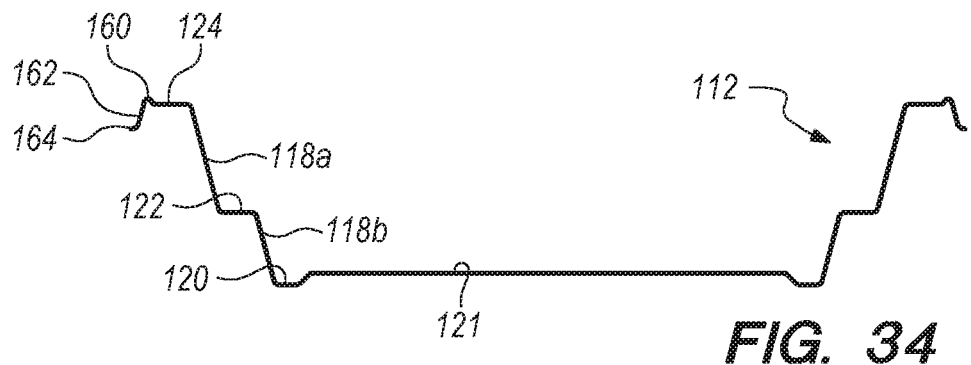
FIG. 34 is a sectional view of the support pan of FIG. 25 taken along the longitudinal axis of the support pan and section 35-35 of FIG. 31.
Figure 35:
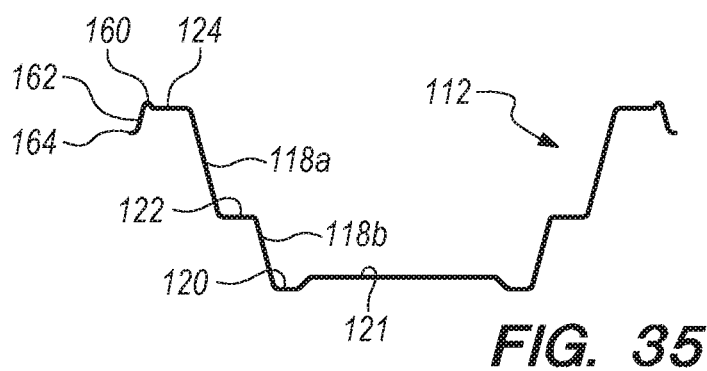
FIG. 35 is a sectional view of the support pan of FIG. 25 taken along section 36-36 of FIG. 31; thereof.
Figure 36:
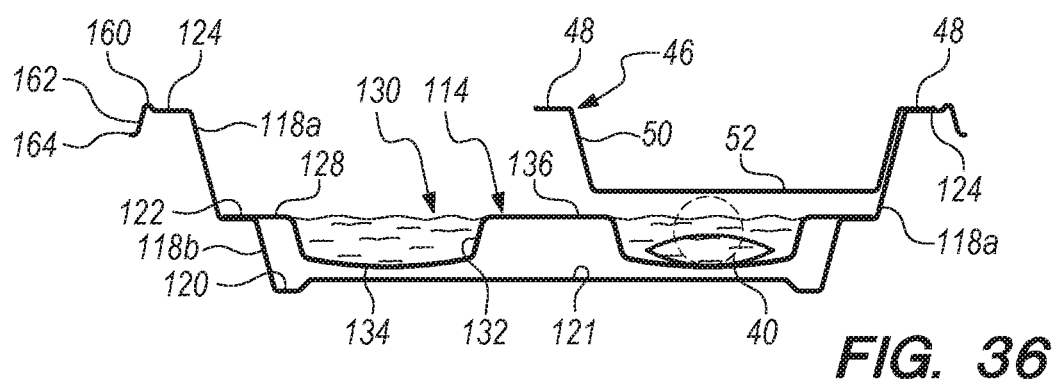
FIG. 36 is a sectional view of the support pan and support tray and food tray of FIG. 30, taken along the longitudinal axis of the support pan.
Figure 37:
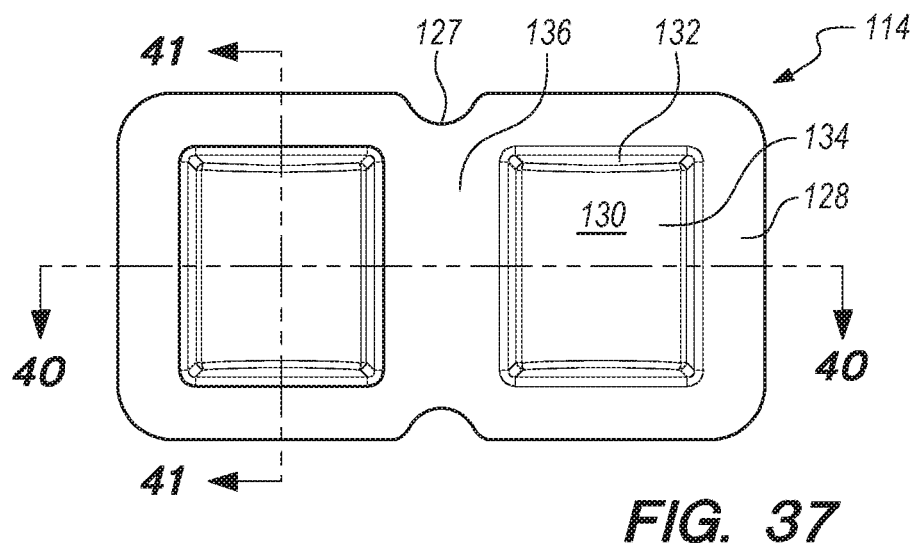
FIG. 37 is a top view of the support tray of FIG. 24.
Figure 38:
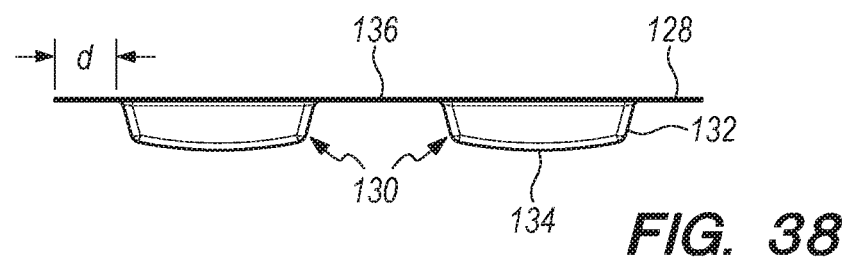
FIG. 38 is a side view of the support tray of FIG. 37, with the opposing side view being a mirror image thereof.
Figure 39:
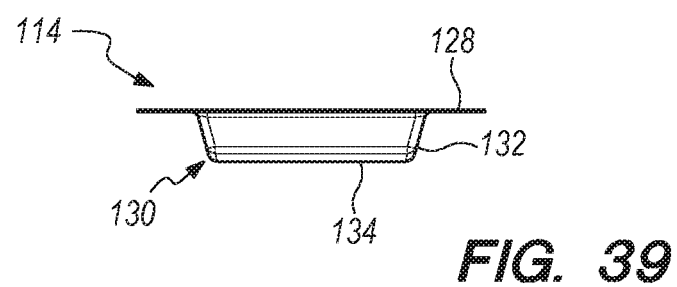
FIG. 39 is an end view of the support tray of FIG. 37, with the opposing end view being a mirror image thereof.
Figure 40:
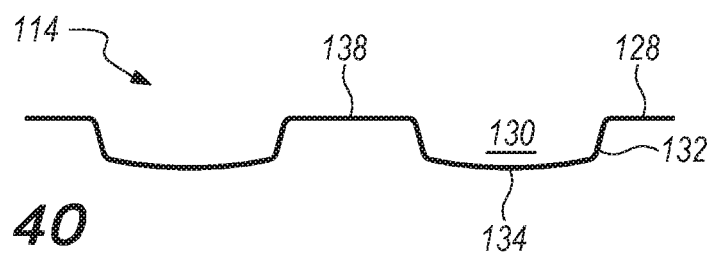
FIG. 40 is a sectional view of the support tray of FIG. 37, taken along section 40-40 of FIG. 37.
Figure 41:
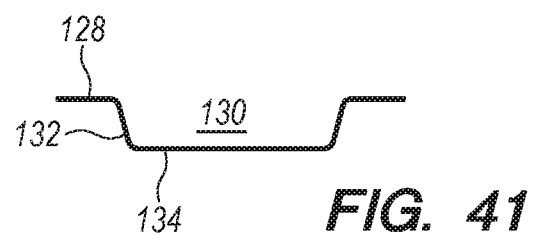
FIG. 41 is a sectional view of the support tray of FIG. 37, taken along section 41-41 of FIG. 37.

As best seen in FIGS. 26 and 29-30, the tray support 126 fits beneath the rounded corner flange 48 of a half food tray with side curves 125a having a slightly larger radius of curvature than the corners of the half food tray so as to receive the corners of a half food tray in each side curve 125a. As the sidewall 118a is of thin material, when the sidewall extends inward to form the tray support 126 extending inward, the outside of the sidewall will form a similar shaped recess as shown in FIG. 32. The recess has two convex corner curves corresponding to curves 125a, joining a concave central curve corresponding to curve 125b.

The generally flat lip 124 on the support pan 112 extends laterally outward to a raised bead 160 that surrounds the periphery of the lip 124 and advantageously conforms in shape to the generally rectangular shape of the sidewall 118a. The outer and lower portion of bead 160 extends at an angle outward and downward to form an inclined, downward depending flange 162. The bead 160 is advantageously hollow with a generally square cross-sectional shape and an open bottom-facing side, or a generally circular cross-sectional shape with a slightly open bottom side. Advantageously, the top surface 124 is wide enough that the bead 160 is located just outside the periphery of the food tray flanges 48 when two food trays 46 rest on the top surface 124. A short spacing of about 0.05 mm to about 5 mm between the bead 160 and the outer periphery of the food tray flanges 48 is believed suitable.

The distal end of the depending flange 162 may be rolled to form a distal bead 164. Advantageously, if the bead 164 is rolled it rolls upward and extends outward from the distal end of the depending flange 162. The bead 164 may alternatively form a very short, outwardly extending flange, especially if the pan is molded of plastic. The inclination angles of the sidewalls 118a, 118b, and depending flange 162 are selected to allow a plurality of support pans 112 to nest together, with the depending flange 162 of a lower support pan 112 nesting inside the depending flange 162 of an upper support pan.

The suspension tray 114 advantageously has an outer periphery conforming in shape to the shoulder 122 of the support pan and that includes fitting around the tray support 126. In the depicted embodiment the suspension tray 114 is generally flat sheet, generally rectangular sheet of material with depending pockets and with rounded corners resting on the flange 122 (shoulder 122) during use and sized to fit easily within the outer boundary of that shoulder 122 so there is no binding between pan 112 and tray 114 if the suspension tray 114 expands as the temperature increases during use. The suspension tray 114 thus advantageously has a generally rectangular top plate 130 with rounded corners, and a length and width slightly smaller than the length and width of the flange 122 or shoulder 122 of the outer pan. The long sides of the generally rectangular suspension tray 114 have curved recesses 127 to fit around the tray support 126.

Figure 24:
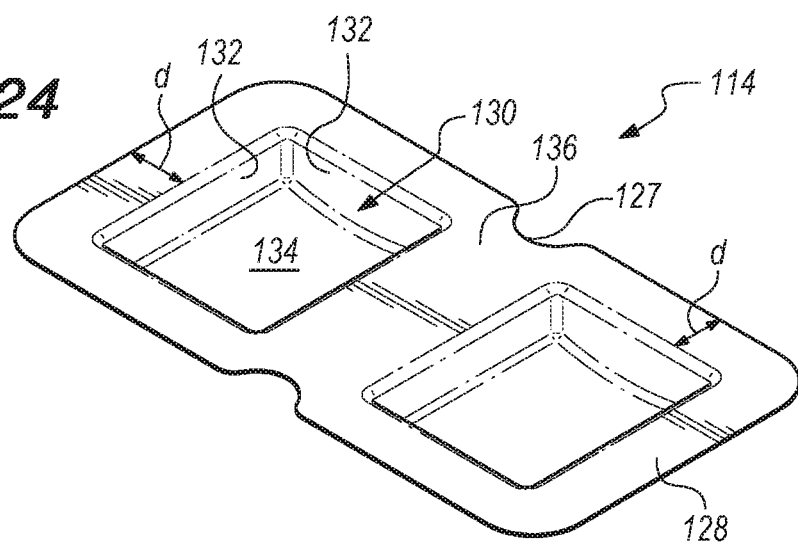
FIG. 24 is a top perspective view of a second embodiment of a suspension tray.
Figure 25:
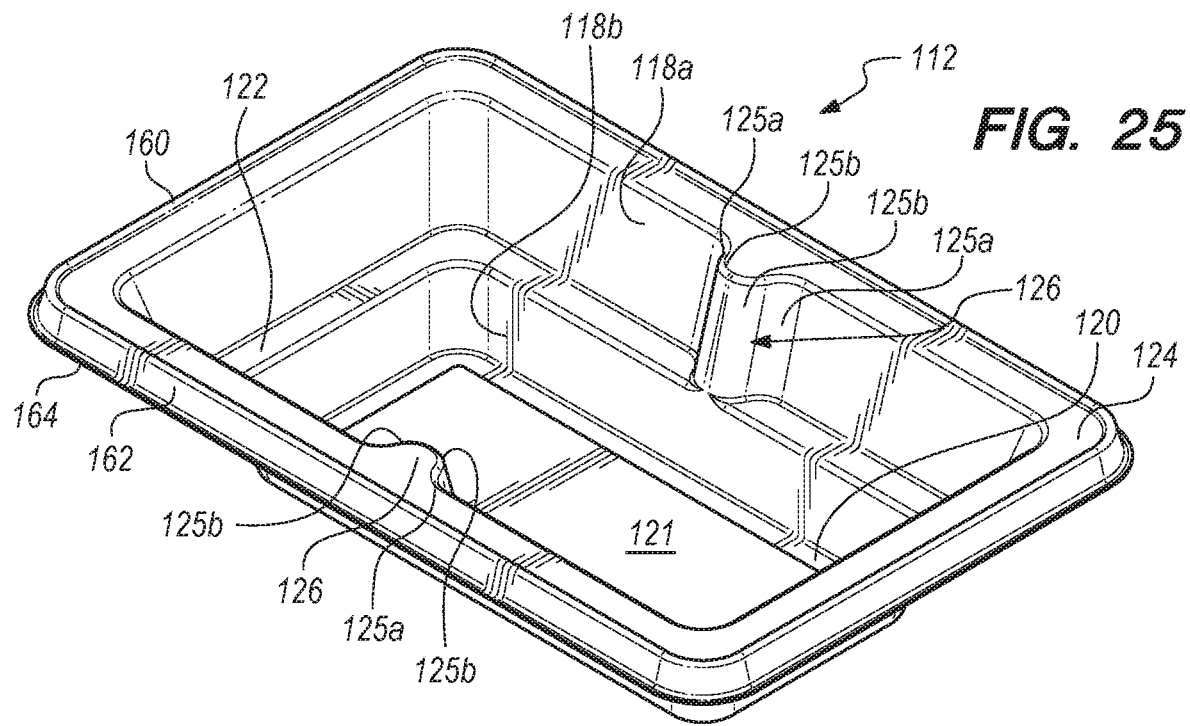
FIG. 25 is a top perspective view of a second embodiment of a support pan.

The suspension tray 114 has one or a few pockets 130 depending downward so they extend toward the bottom 120 of the outer pan during use. There are advantageously two, pockets 130. The pockets 130 are preferably rectangular in shape and have curved corners. As used herein, rectangular pockets may include square shaped pockets. Each pocket 130 has a continuous pocket sidewall 132 joined to a pocket bottom 134. The pocket bottom 134 is advantageously curved about at least one of the length or width of the rectangular pocket. The depicted pocket bottom 134 is curved about one axis like a trough. The curved bottom helps funnel water to the center of the bottom 134 to better ensure all water contacts the packet 40 during use. As seen in FIG. 24, a bottom 134 curved about one axis forms rectangular sides walls 132 on opposing sides of the bottom 134, with the other two opposing side walls 132 having a curved bottom edge adjoining the curved bottom 134. A bottom 134 curved about two axes to form a slight dome shape also directs the water in the pocket to a location beneath the heater packet 40 to help ensure all the water is available to react with the chemicals in the packet 40.

A center divider 136 at the middle of the top plate 128 separates the pockets 130 along the length of the top plate. The curved recess 127 advantageously extends into each opposing end of the center divider 136, with the recess having rounded corners at the juncture of the otherwise straight side that extend along the shoulder 122. The pockets form waterproof containers with an open top, and water is placed into the pockets during use.

The pockets 130 are advantageously located inward from the adjacent end and two opposing sides of the lower sidewall 118b. This is achieved by having the top plate 128 extend outward from the top edge of the pockets 130 a distance of about "d." The top plate 128 is preferably rectangular in shape with rounded corners conforming in curvature with the rounded corners of the support pan 112. The top plate 128 has a width and length about the same as the inner width and length of the flange 122 forming the shoulder 122, but slightly smaller. A difference of about 0.1 inch between the outer periphery of the top plate 128 and the bottom of the inner sidewall 118a is believed suitable. The outer periphery of the top plate 128 advantageously overlaps with and rests against the top surface of the ledge or shoulder 122 so the shoulder supports the suspension tray with the sidewalls 132 of each pocket about one inch from the adjacent sidewall 118b of the support pan. The sidewalls of the pocket on opposing sides of the center divider 136 are further apart, about 3.5 to 4 inches apart in the depicted embodiment.

The use of the support pan 112 and the water tray or suspension tray 114 with the heating packets 40 and water to heat food in food trays 46, is generally as previously described and that description is not repeated. The support pan 112 and suspension tray 114 may be made as previously described of the materials previously described and that description is not repeated.

The support pan 112 is configured for use with two half food trays 46. The tray support 126 fits between the curved corners of the two, adjacent half-food trays 46 and supports the corners of the food trays as the food tray flanges 48 rest on the top surface of the tray support 126. The shape of the curves 125a, 125b advantageously conform sufficiently to the shape of the curved corners of the food tray so the food tray flanges 48 may overlap with the top surface of the tray support 126. Further, the food tray flanges 48 advantageously overlap the top of the tray support 126 to reduce and advantageously prevent the escape of heat and steam from the interior of the support pan 112. Still further, the adjacent straight sides of the food trays 46 are close enough together that the respective flanges 48 of the adjacent food trays abut each other or overlap to reduce or prevent heat and steam from escaping along the length of the abutting or overlapping food tray flanges. The inclined walls of the support 136 are preferably inclined so they do not contact the sidewalls 50 of the food trays 46 when the food tray flanges rest on the top pan lip 124 and tray support 126.

Figure 42:
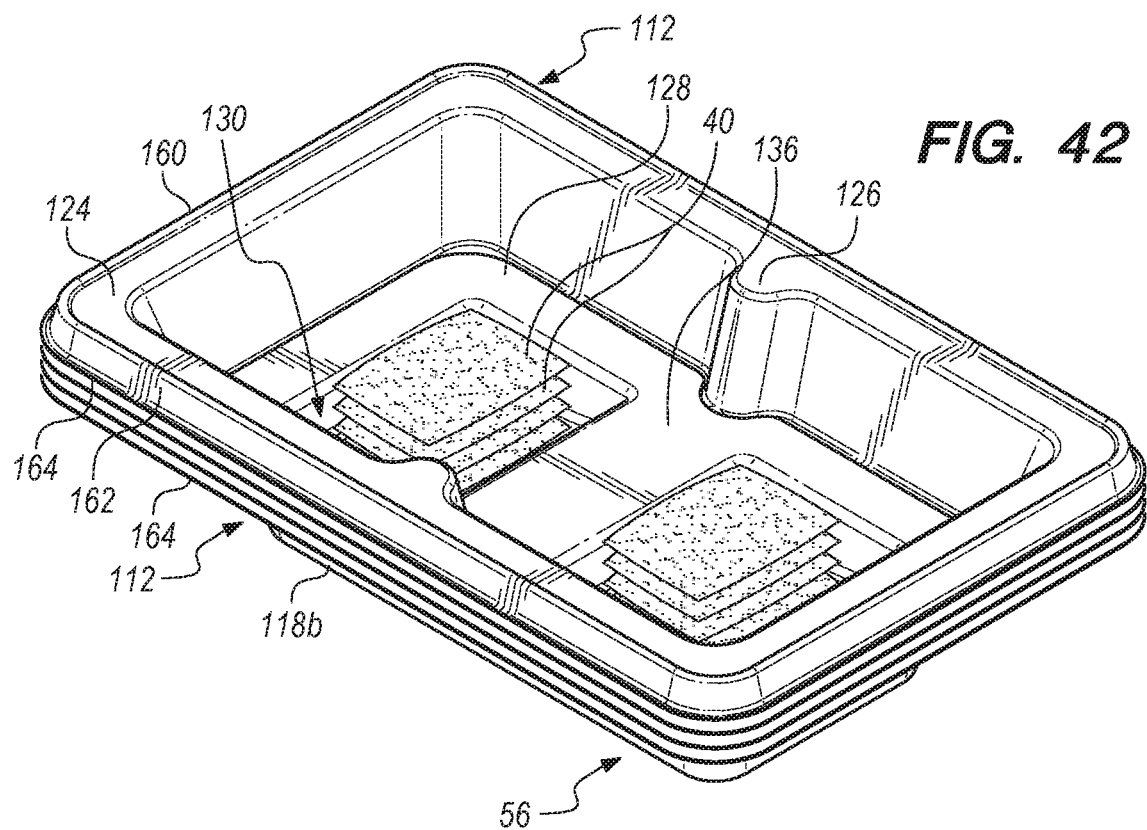
FIG. 42 is a top perspective view of a four of the support pan and support tray of FIG. 26 stacked, with eight chemical packets in the support tray.
Figure 43:
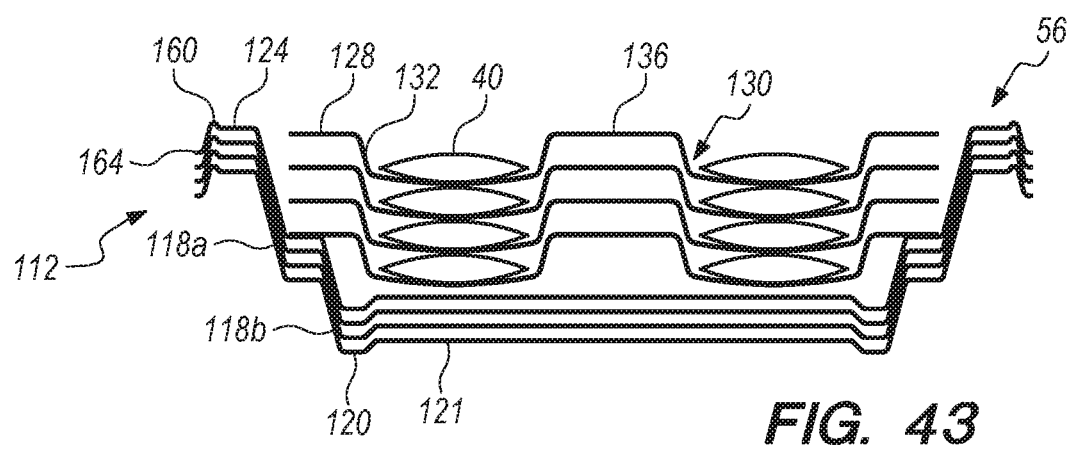
FIG. 43 is a sectional view along the longitudinal axis of the support pan showing four support pans stacked in a nested configuration with the top support pan containing four stacked assemblies that each include one support tray with a chemical packet in each pocket of the support tray.
Figure 44:
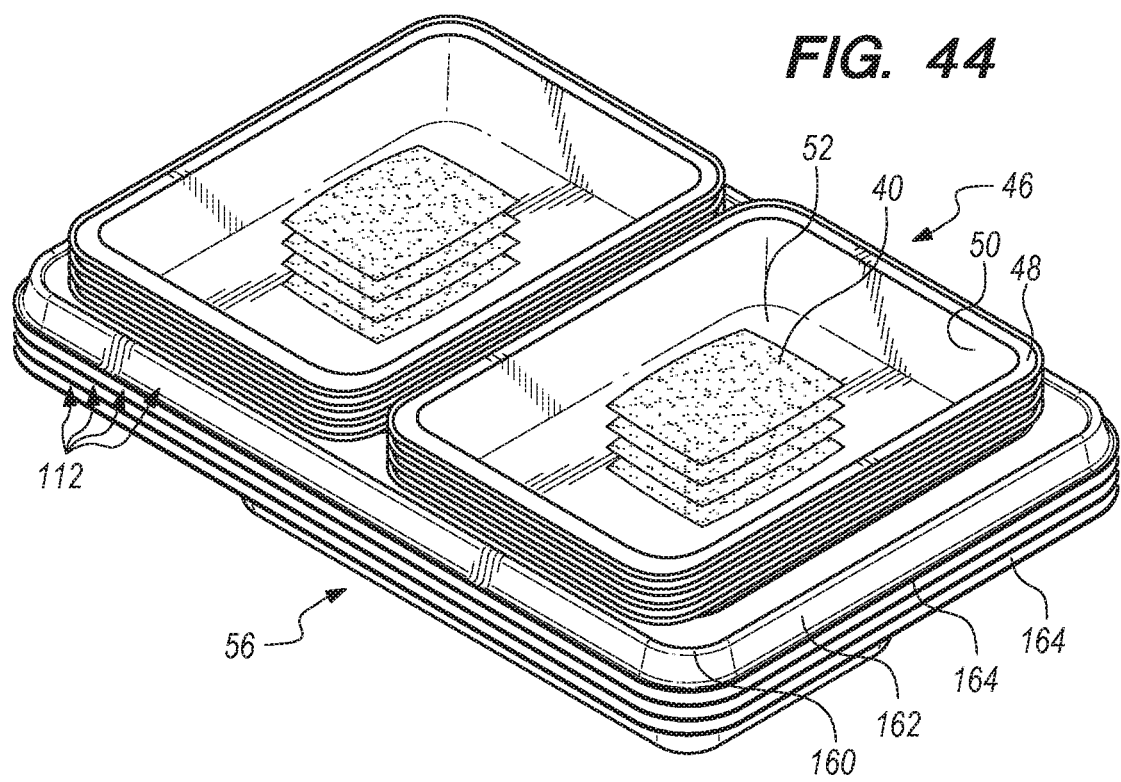
FIG. 44 is a top perspective view of four support pans of FIG. 25 stacked in a nested configuration; with four stacked, half-food trays in each end of the top support pan, with four chemical packs in each half-food tray.
Figure 45:
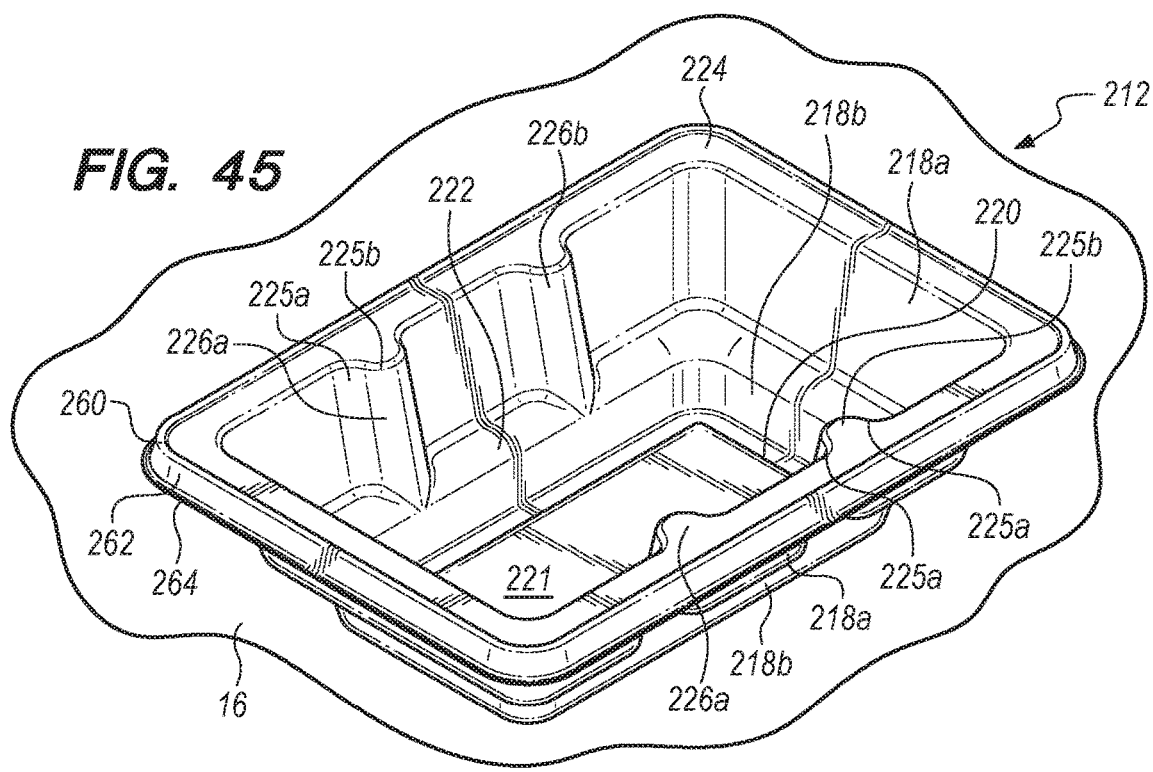
FIG. 45 is a top perspective view of a support pan for three food trays.
Figure 46:
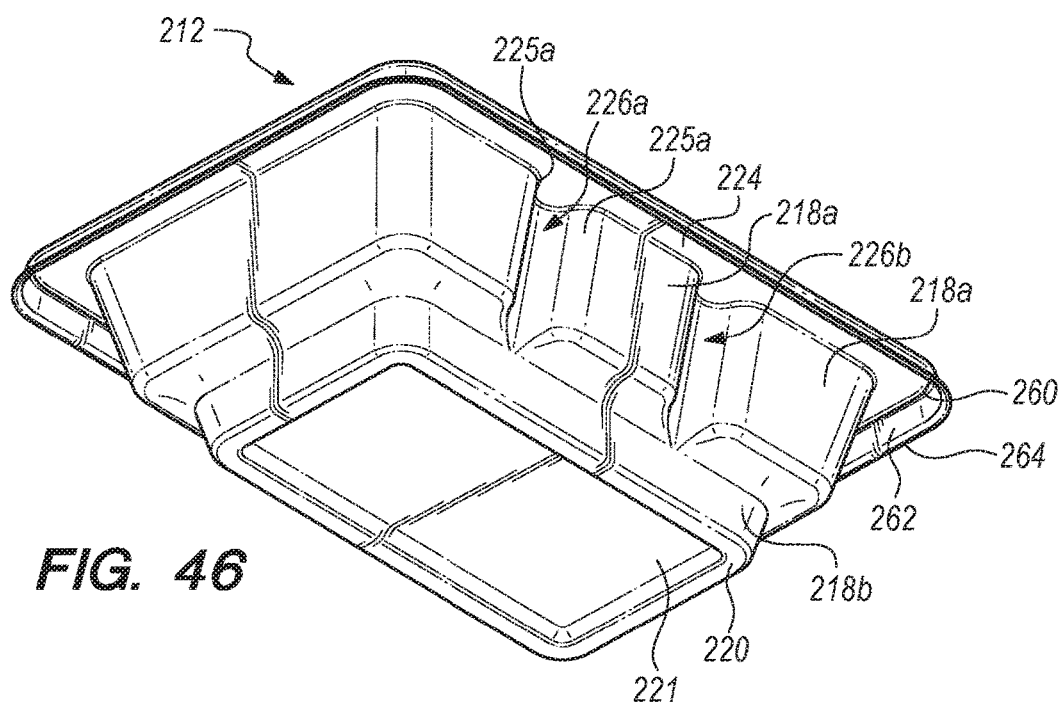
FIG. 46 is a bottom perspective view of the support pan of FIG. 45.
Figure 47:
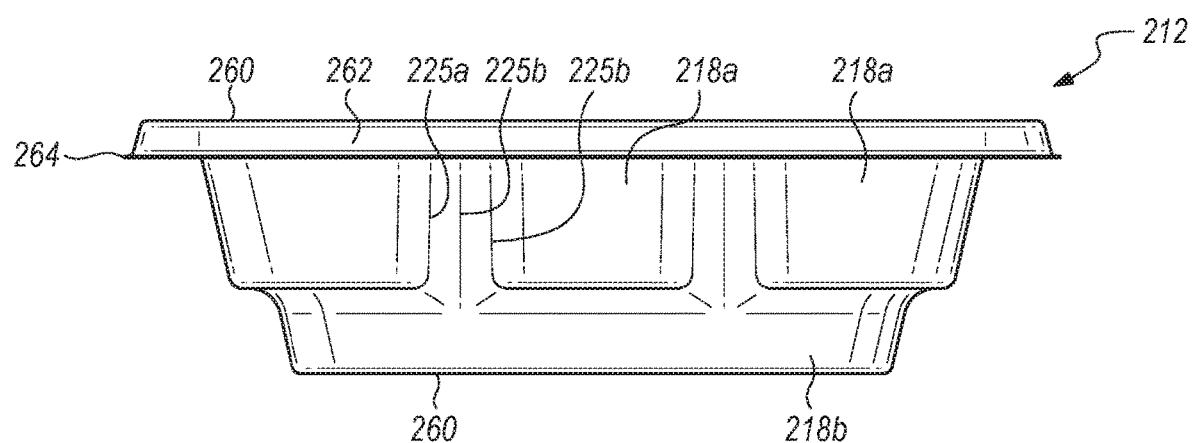
FIG. 47 is a front view of the support pan of FIG. 45 with the back view being a mirror image thereof.
Figure 48:
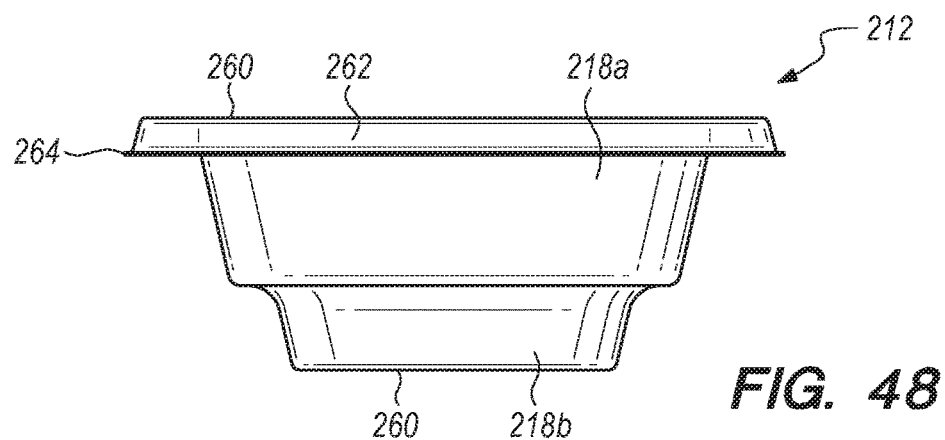
FIG. 48 is a right-side view of the support pan of FIG. 45 with the left side view being a mirror image thereof.
Figure 49:
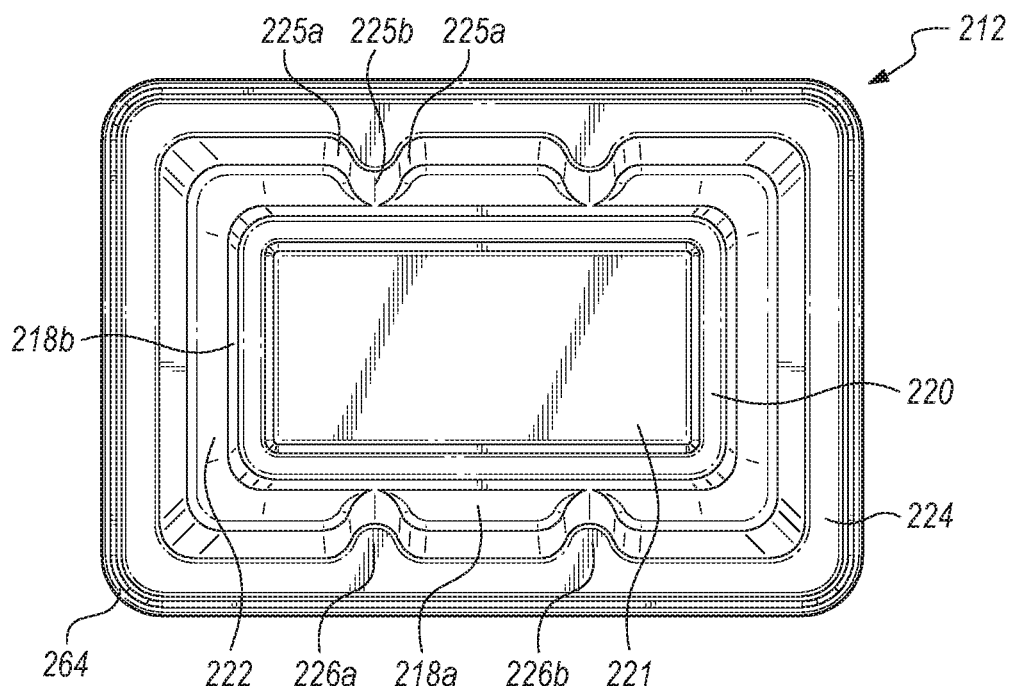
FIG. 49 is a bottom view of the support pan of FIG. 45.
Figure 50:
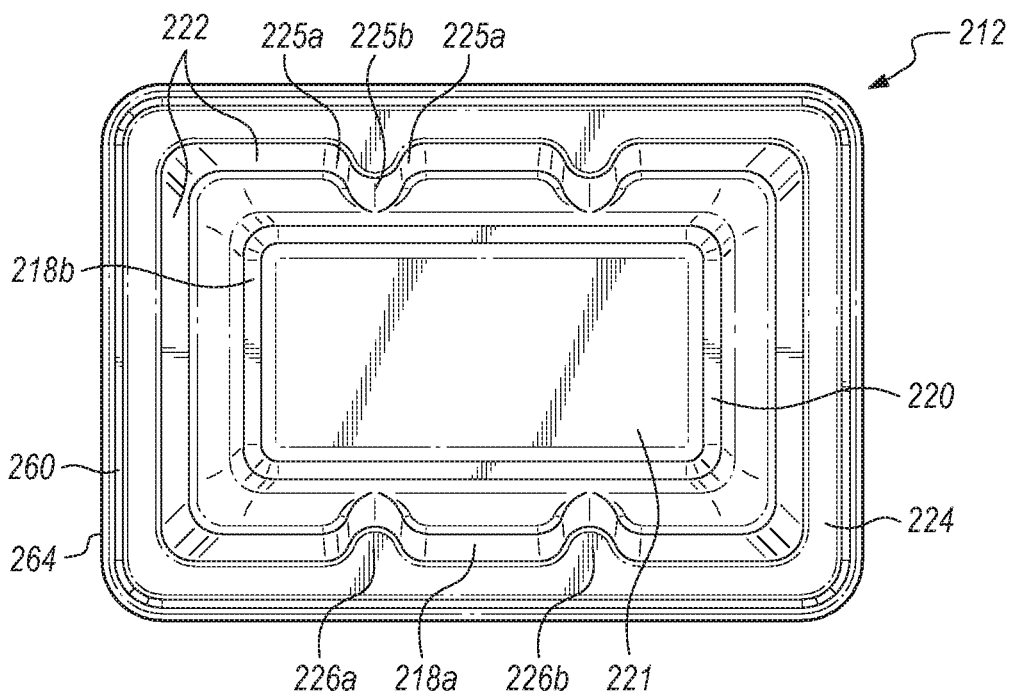
FIG. 50 is a top view of the support pan of FIG. 45.

Advantageously, the recess 127 in the support tray 114 fits close enough to the outer periphery of the tray support 126 extending inward into the support pan 112, that the top plate 128 of the water pan or suspension tray 114 rests against the shoulder 122 and reduces or prevents heat and steam inside the sidewall 118a from escaping downward below the tray 114. The sidewalls 118 of the support pans 112 are uniformly inclined so a plurality of support pans may be nested into each other to provide for a compact stack for shipping, providing the advantages previously described for the first embodiment of support pans 12 and trays 14 and food trays 46. Nested pans 112, trays 114, and packets 40 are illustrated in FIGS. 42-44. As the support pans 112 and suspension trays 114 are substantially as previously described, the detailed description of the stacked and nested pans 12 and trays and heating packets 40 also apply to the pans 112 and trays 114 and are not repeated.

The support pan 112 and suspension tray 114 do offer further advantages over the first embodiment of FIGS. 1-23 in that the support 136 is believed to retain heat better and to provide a sturdier support around more of the periphery of each food tray 46 than the first embodiment of FIGS. 1-23. Also, the recess 127 is believed to provide additional interlocking between the suspension tray 14 and the support pan and more resistance to twisting or skewing of the chafing dish 110 in the lateral plane. While a curved recess 127 is shown, the recess may be other shapes, but advantageously is configured to conform to or mate with the shape of the tray support 126.

Referring to FIGS. 42-44, the support pans 112, suspension trays 114 and packets 40 may be stacked for shipment, with several arrangements believed to offer shipping advantages as described above. The same advantages and stacking arrangements are available with the support pans 112, suspension trays 114 and packets 40, and those advantages and arrangements are not described in detail again. For the depicted embodiment, it is believed to have stacks of four support pans 112 and suspension trays 114 in various arrangements, with a chemical pack for each pocket 30, 130, and enough food trays to fully cover the top of the support pans.

Referring to FIGS. 45-59, a third embodiment of the chafing dish 10 is provided and designated as chafing dish 210. The unchanged parts have the same numbers as in the first embodiment and other parts that are altered have numbers incremented by 200 over the corresponding part numbers of the first embodiment. The third embodiment chafing dish 210 has an outer, support pan 212 supporting an inner suspension tray 214 and resting on a generally horizontal support surface 16. The support pan 212 and suspension tray 214 are preferably made of thin-walled aluminum or plastic designed for disposable, single use applications, as described for the first embodiment of the chafing dish 10, which description is not repeated.

The support pan 212 advantageously has a generally rectangular shape with a continuous sidewall 218 extending around the generally rectangular periphery and joined at a bottom 220. The sidewall 218 includes upper sidewall 218a and lower sidewall 218b. The bottom 220 advantageously has a raised central portion 221 that is offset vertically away from support surface 16 a slight distance so the bottom 220 forms a narrow strip around the raised center portion 221. The raised bottom 221 advantageously conforms in shape with the shape of the juncture of the sidewall 218 and the bottom 220. The bottom 220, viewed from the top (FIG. 25, 31, 34-35, 49), resembles a rectangular strip with rounded corners. The offset center portion 221 may be used to strengthen the otherwise flat bottom of the support pan 212 and may be used to provide an insulating air cavity between the support pan 212 and the support surface 16 on which the pan rests during use.

The sidewall 218 is preferably stepped outward, having an outwardly extending ledge or flange 222 forming an internal shoulder which extends around an outer periphery of the outside of the outer support pan 212. The support pan 212 has an outwardly extending support pan lip 224 at the top of the support pan and advantageously encircling the top periphery the support pan. The sidewall 218 and bottom 220 advantageously form an enclosed structure open at the top encircled by the support pan's top lip 224

Shoulder 222 separates the sidewall 218 into upper and lower sidewalls 218a, 218b, respectively. Each sidewall advantageously has two opposing sides and two opposing ends to form a rectangular shape. The sidewalls 218a, 218b are inclined outward to allow a generous draft angle so the thin-walled aluminum may be formed without tearing. An angle of about 5-10 degrees is believed suitable. A corner radius of about 0.5 inches is believed suitable.

The third embodiment of the chafing dish 210 has the center portion of the upper sidewall 218a extending inward toward the opposing sidewall 218a to form an inward extending tray support 226—at two spaced apart locations 226a, 226b. The tray support 226 resembles a half column extending between the top support lip 228 to the shoulder 222. The tray supports 226a, 226b are spaced equally along their respective sides of the pan, dividing the pan into three equal segments as three food trays will be held in the pan, one food tray in each segment, as described later. The tray supports 226a, 226b on each upper sidewall 218a are directly opposite each other. Each of the tray supports 226a, 226b extends from the shoulder 222 to the top lip 224 of the support pan and is inclined at the same angle as the sidewall 218a from which the tray support extends. The cross-section of the tray support 226a, 226b forms a curved hat section the shape of which is best seen on the lip 224 which is of generally uniform width except at the juncture with the tray support 226. The cross-section shape of the tray support 226 advantageously has a curved periphery formed of three, one-quarter curves, each curve of about 90°. Two concave side curves 225a face in opposing directions along the sidewall 218a from which the curves extend as they face the corner curve in the generally rectangular support pan 212. The center, convex curve 225b is between and joins the convex side curves 225a and has an apex facing the side wall 218a on the opposing side of the support pan 212. The curves advantageously blend smoothly to form a curved periphery extending inward toward the center of the space encircled by the generally rectangular sidewall 18. The apex of the center curve 225b is advantageously tangential with the lower sidewall 218b.

The tray support 226 fits beneath the rounded corner flange 248 of a one-third (⅓) food tray 246 with side curves 225a having a slightly larger radius of curvature than the corners of the one-third food tray so as to receive the corners of a one-third food tray in each side curve 225a. This is shown in FIG. 30, and the support for the ⅓ tray is the same as for the half tray of FIG. 30. Advantageously, the one-third trays are deep trays having a depth of ⅗ inches. As the sidewall 218a is of thin material, when the sidewall extends inward to form the tray support 226 extending inward, the outside of the sidewall will form a similar shaped recess as shown in FIG. 32. The recess has two convex corner curves corresponding to curves 225a, joining a concave central curve corresponding to curve 225b.

The one-third food tray 246 is like the half tray except the width and length proportions are different so that three trays 246 cover the open top of the support pan 212. The food trays 246 have food tray sidewalls 250 extending across the width of the pan 210, but the ends of the food tray 246 are shorter so three, one-third food trays 246 cover the top of the support pan 212. The food tray bottom 256 is a longer and narrower rectangle than that of the food tray bottom of a half-tray.

The generally flat lip 224 on the support pan 212 extends laterally outward to a raised bead 260 that surrounds the periphery of the lip 224 and advantageously conforms in shape to the generally rectangular shape of the sidewall 218a. The outer and lower portion of bead 260 extends at an angle outward and downward to form an inclined, downward depending flange 262. The bead 260 is advantageously hollow with a generally square cross-sectional shape and an open bottom-facing side, or a generally circular cross-sectional shape with a slightly open bottom side. Advantageously, the top surface 224 is wide enough that the bead 260 is located just outside the periphery of the food tray flanges 248 when two food trays 46 rest on the top surface 224. A short spacing of about 0.05 mm to about 5 mm between the bead 260 and the outer periphery of the food tray flanges 248 is believed suitable.

The distal end of the depending flange 262 may be rolled to form a distal bead 264. Advantageously, if the bead 264 is rolled it rolls upward and extends outward from the distal end of the depending flange 262. The bead 264 may alternatively form a very short, outwardly extending flange—especially if the pan is molded of plastic. The inclination angles of the sidewalls 218a, 218b, and depending flange 262 are selected to allow a plurality of support pans 212 to nest together, with the depending flange 262 of a lower support pan 212 nesting inside the depending flange 262 of an upper support pan.

The suspension tray 214 advantageously has an outer periphery conforming in shape to the shoulder 222 of the support pan and that includes fitting around the tray support 226. In the depicted embodiment the suspension tray 214 is generally flat sheet, generally rectangular sheet of material with depending pockets and with rounded corners resting on the flange 222 (shoulder 222) during use and sized to fit easily within the outer boundary of that shoulder 222 so there is no binding between pan 212 and suspension tray 214 if the suspension tray 214 expands as the temperature increases during use. The suspension tray 214 thus advantageously has a generally rectangular top plate 230 with rounded corners, and a length and width slightly smaller than the length and width of the flange 222 or shoulder 222 of the outer pan. The long sides of the generally rectangular suspension tray 214 have two curved recesses 227a, 227b configured to fit around and conform to the shape tray support 226 just like the curved recesses 127.

Figure 51:
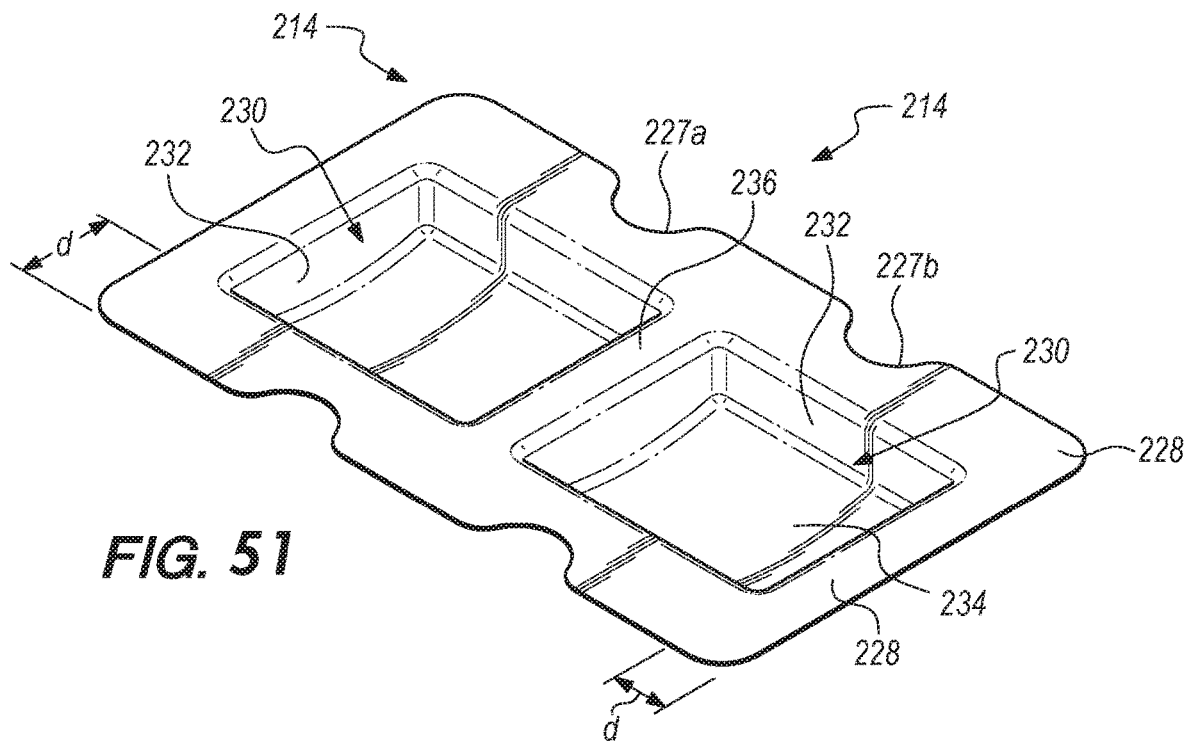
FIG. 51 is a top perspective view of a suspension tray for use with the support pan of FIG. 45.
Figure 52:
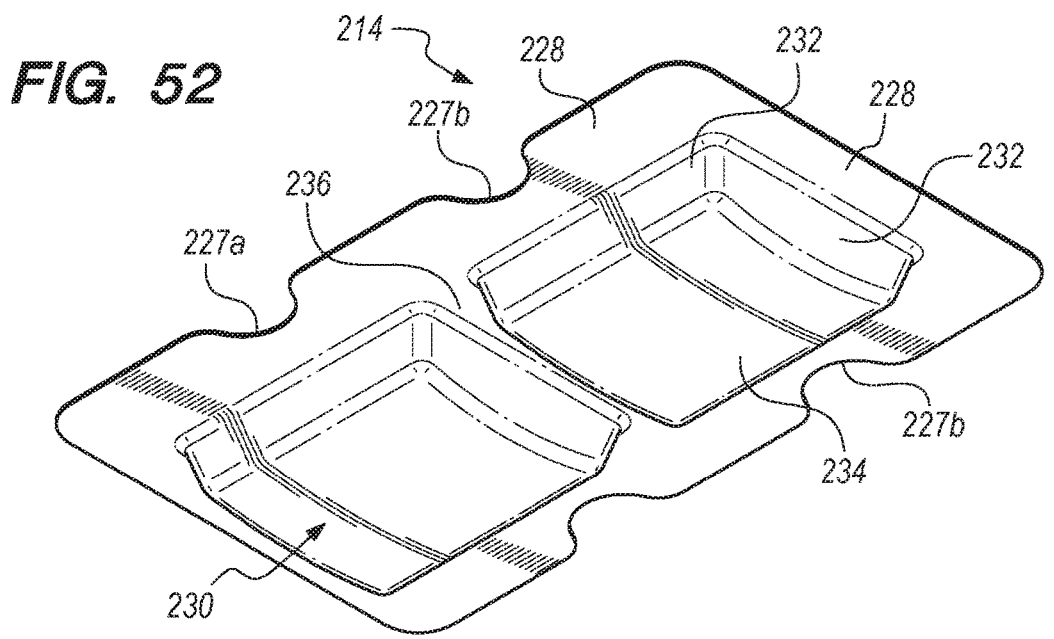
FIG. 52 is a bottom perspective view of the suspension tray for use with the support pan of FIGS. 45 and 51.
Figure 53:
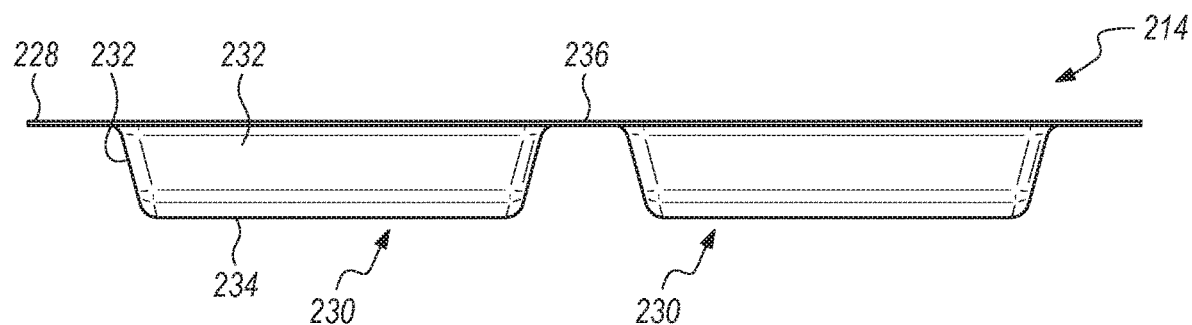
FIG. 53 is a front view of the suspension tray of FIG. 51, with the back view being a mirror image thereon.
Figure 54:
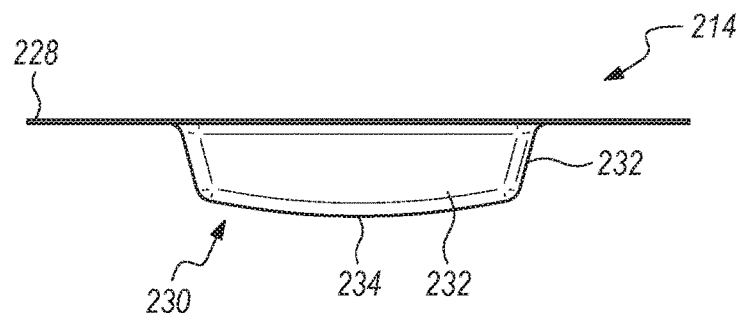
FIG. 54 is a right-side view of the suspension tray of FIG. 51, with the left side view being a mirror image thereof.
Figure 55A:
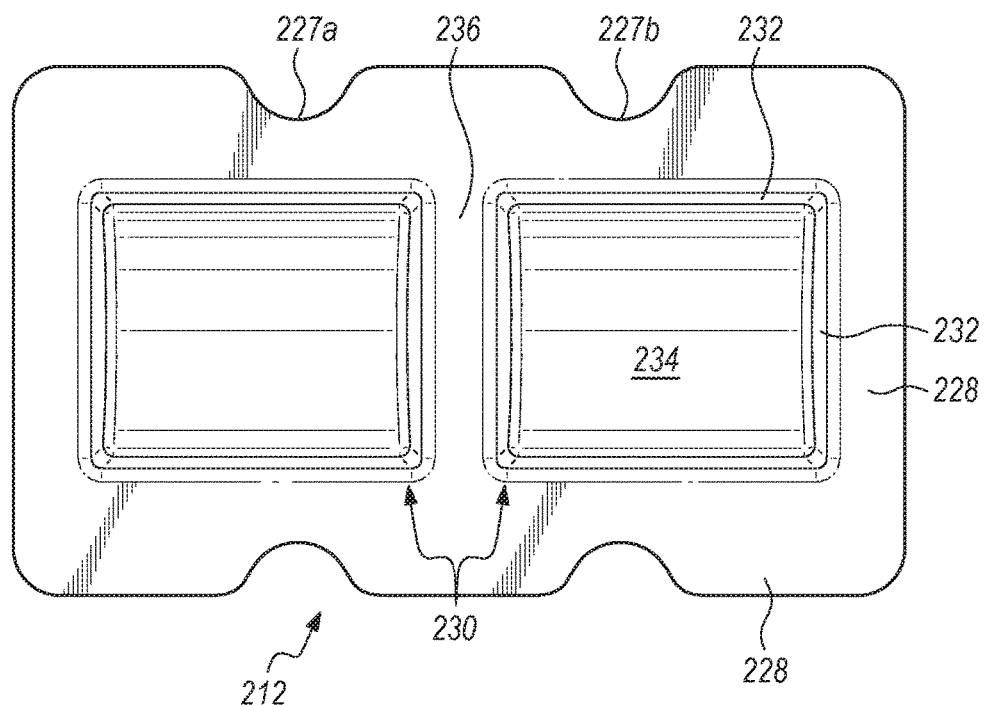
FIGS. 55A and 55B are top and bottom views, respectively, of the suspension tray of FIG. 51.
Figure 55B:
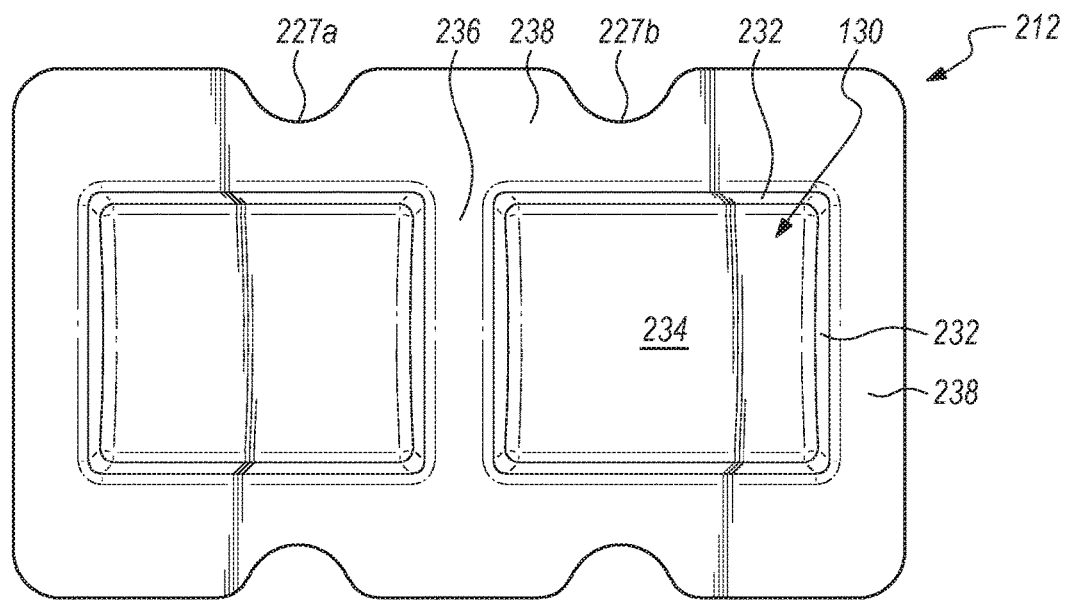
Figure 57A:
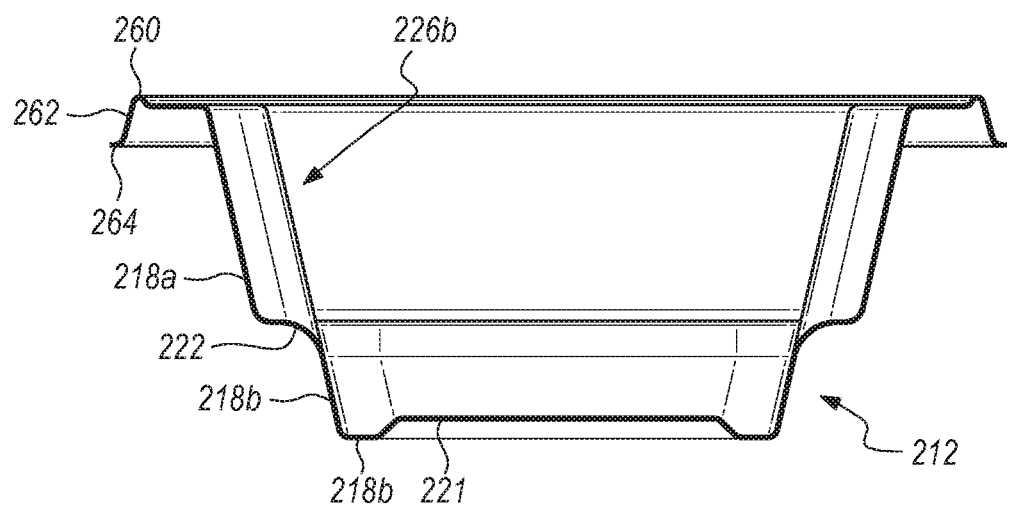
FIG. 57A is a sectional view of the support pan alone, taken along section 57B-57B of FIG. 56.
Figure 57B:
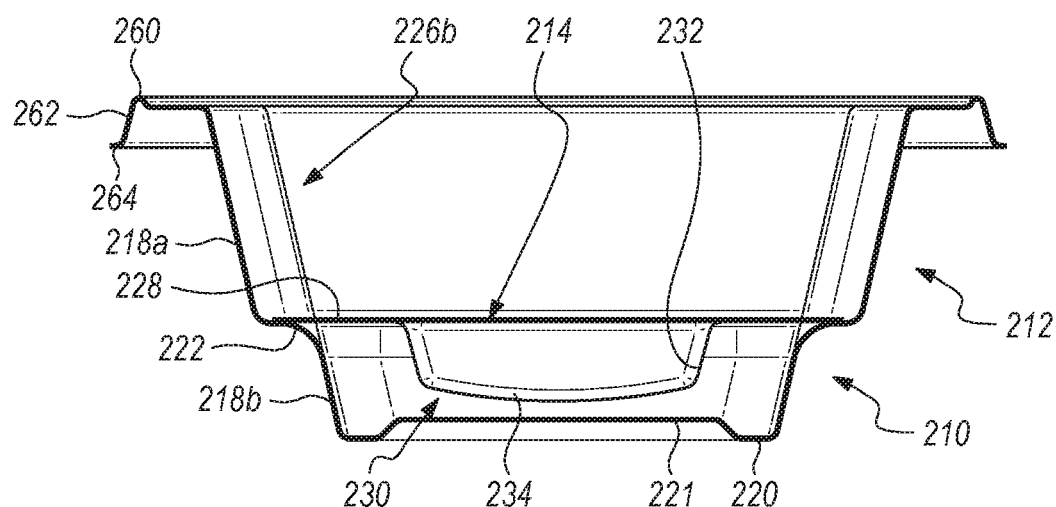
FIG. 57B is a sectional view of the assembly of FIG. 56, taken along section 57B-57B of FIG. 56.
Figure 58A:
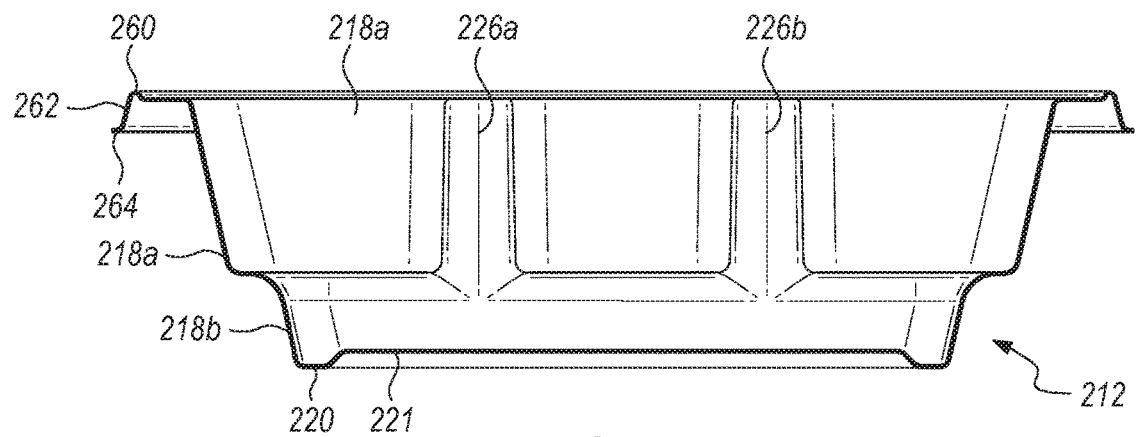
FIG. 58A is a sectional view of the support pan alone, taken along section 58B-58B of FIG. 56.
Figure 58B:
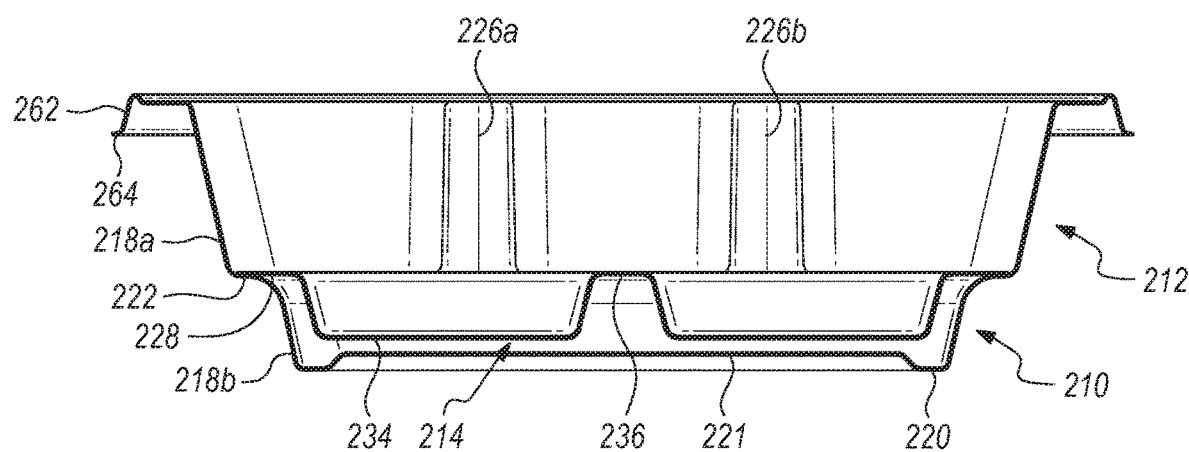
FIG. 58B is a sectional view of the assembly of FIG. 56, taken along section 58B-58B of FIG. 56.

The suspension tray 214 has one or a few pockets 230 depending downward so they extend toward the bottom 220 of the outer pan during use. There are advantageously two, pockets 230. The pockets 230 are preferably rectangular in shape and have curved corners. As used herein, rectangular pockets may include square shaped pockets. Each pocket 230 has a continuous pocket sidewall 232 joined to a pocket bottom 234. The pocket bottom 234 is advantageously curved about at least one of the length or width of the rectangular pocket. The depicted pocket bottom 234 is curved about one axis like a trough, and preferably curved about the longitudinal axis of the tray 214, as is the curved bottom 134 of the prior embodiment. The curved bottom helps funnel water to the center of the bottom 234 to better ensure all water contacts the packet 40 during use. As seen in FIG. 51, a bottom 234 curved about one axis forms rectangular sides walls 232 on opposing sides of the bottom 234, with the other two opposing side walls 232 having a curved bottom edge adjoining the curved bottom 234. A bottom 234 curved about two axes to form a slight dome shape also directs the water in the pocket to a location beneath the heater packet 40 to help ensure all the water is available to react with the chemicals in the packet 40.

A center divider 236 at the middle of the top plate 228 separates the pockets 230 along the length of the top plate. The curved recess 227a, 227b are offset from the center divider 236 to correspond to the location of and the curved shape of the tray supports 226a, 226b, with the recess 227 having rounded corners at the juncture of the otherwise straight side that extend along the shoulder 222. The pockets 230 form waterproof containers with an open top, and water is placed into the pockets during use when the suspension tray 214 rests on the shoulder 222.

The pockets 230 are advantageously located inward from the adjacent end and two opposing sides of the lower sidewall 218b. This is achieved by having the top plate 228 extend outward from the top edge of the pockets 230 a distance of about "d." the distance "d" need not be the same on each side of the top plate 228. The top plate 228 is preferably rectangular in shape with rounded corners conforming in curvature with the rounded corners of the support pan 212. The top plate 228 has a width and length about the same as the inner width and length of the flange 222 forming the shoulder 222, but slightly smaller. A difference of about 0.1 inch between the outer periphery of the top plate 228 and the bottom of the inner sidewall 218a is believed suitable. The outer periphery of the top plate 228 advantageously overlaps with and rests against the top surface of the ledge or shoulder 222 so the shoulder supports the suspension tray with the sidewalls 232 of each pocket about one inch from the adjacent sidewall 218b of the support pan. The sidewalls of the pocket on opposing sides of the center divider 236 are further apart, about 3.5 to 4 inches apart in the depicted embodiment.

The use of the support pan 212 and the water tray or suspension tray 214 with the heating packets 40 and water to heat food in food trays 246, is generally as previously described and that description is not repeated. The main difference is that there are three equally sized food trays 214 instead of a single tray or two equally sized, half-trays 146. The support pan 212 and suspension tray 214 may be made as previously described of the materials previously described and that description is not repeated.

The support pan 212 is configured for use with two one-third food trays 46. The tray supports 226a, 226b fit between the curved corners of the two, adjacent one-third-food trays 46 and supports the corners of the food trays as the food tray flanges 248 rest on the top surface of the tray support 226. The shape of the curves 225a, 225b advantageously conform sufficiently to the shape of the curved corners of the food tray so the food tray flanges 248 may overlap with the top surface of the tray supports 226 (226a, 226b). Further, the food tray flanges 248 advantageously overlap the top of the tray supports 226a, 226b to reduce and advantageously prevent the escape of heat and steam from the interior of the support pan 212. Still further, the adjacent straight sides of the food trays 46 are close enough together that the respective flanges 248 of the adjacent food trays abut each other or overlap to reduce or prevent heat and steam from escaping along the length of the abutting or overlapping food tray flanges. The inclined walls of the tray support 226 are preferably inclined so they do not contact the sidewalls 50 of the food trays 46 when the food tray flanges rest on the top pan lip 224 and tray support 226.

For the two end trays 246, two rounded corners of each food tray flange 248 rest on and are supported by different ones of the tray supports 226a, 226b, while the other two rounded corners have the food tray flange resting on different corners of the support pan lip. Three sides of the food tray flange 248 of each end food tray 246 rest on and are supported by the support pan lip 224. The fourth side of the end food tray 246 are alongside the flanges 248 of the middle food tray. The middle food tray 246 has each of its four curved corners resting on and supported by a different tray support 246a, 246b, with food tray flange 48 on the narrow end of the food tray resting on and supported by the support pan lip 224 at the middle of the support pan 212, between tray supports 226a, 226b.

Figure 59A:
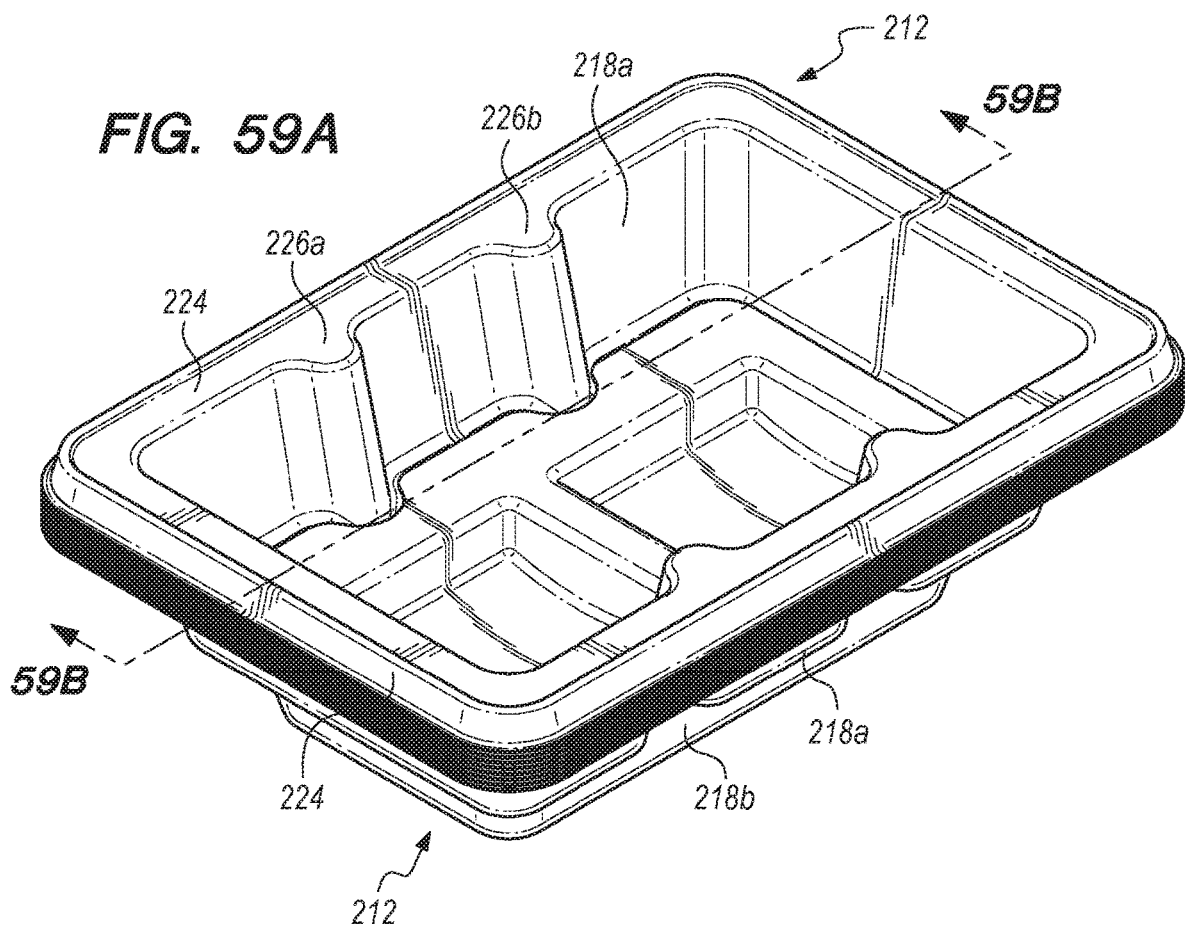
FIG. 59A is a top perspective view of a stack of support pans as shown in FIG. 45, with the top support pan containing a stack of suspension trays as shown in FIG. 51.
Figure 59B:
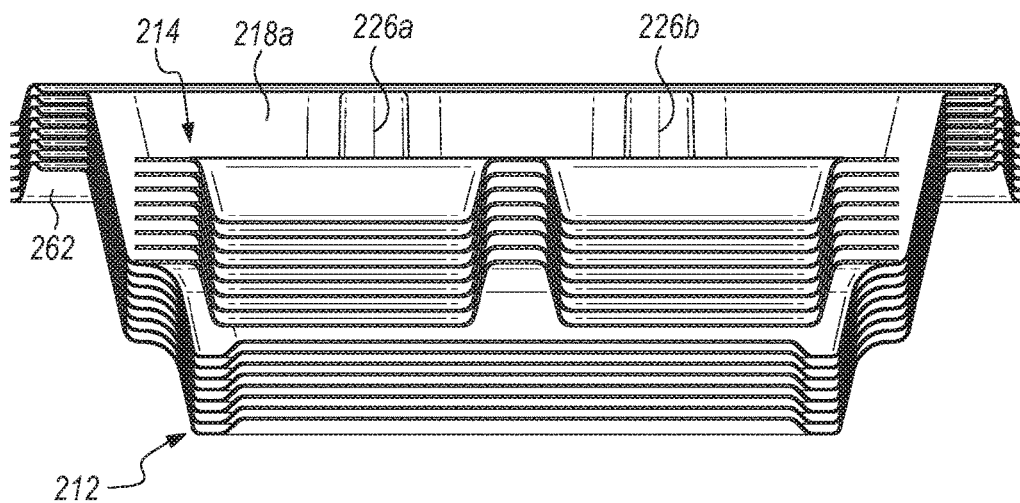
FIG. 59B is a sectional view taken along section 59B-59B of FIG. 59A.
Figure 60A:
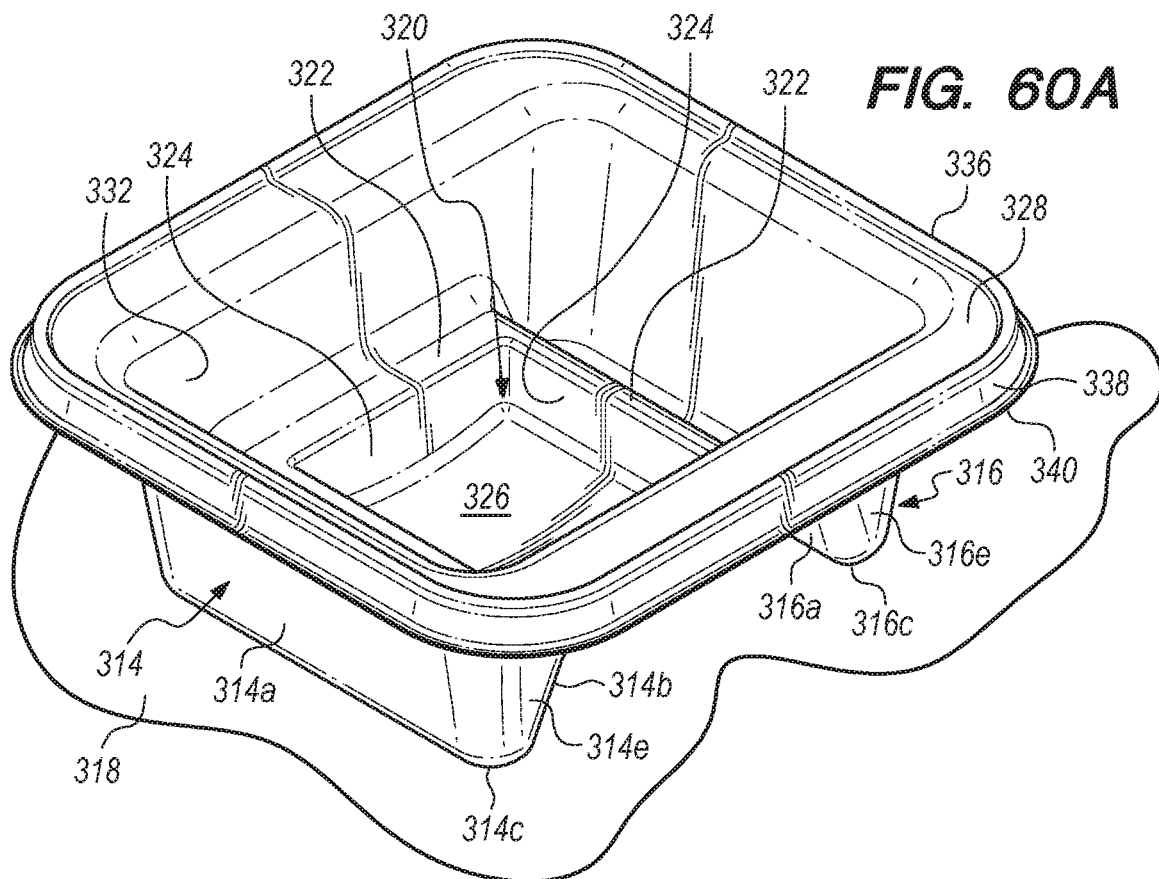
FIG. 60A is a top perspective view of a support pan having a single pocket and no suspension tray.
Figure 60B:
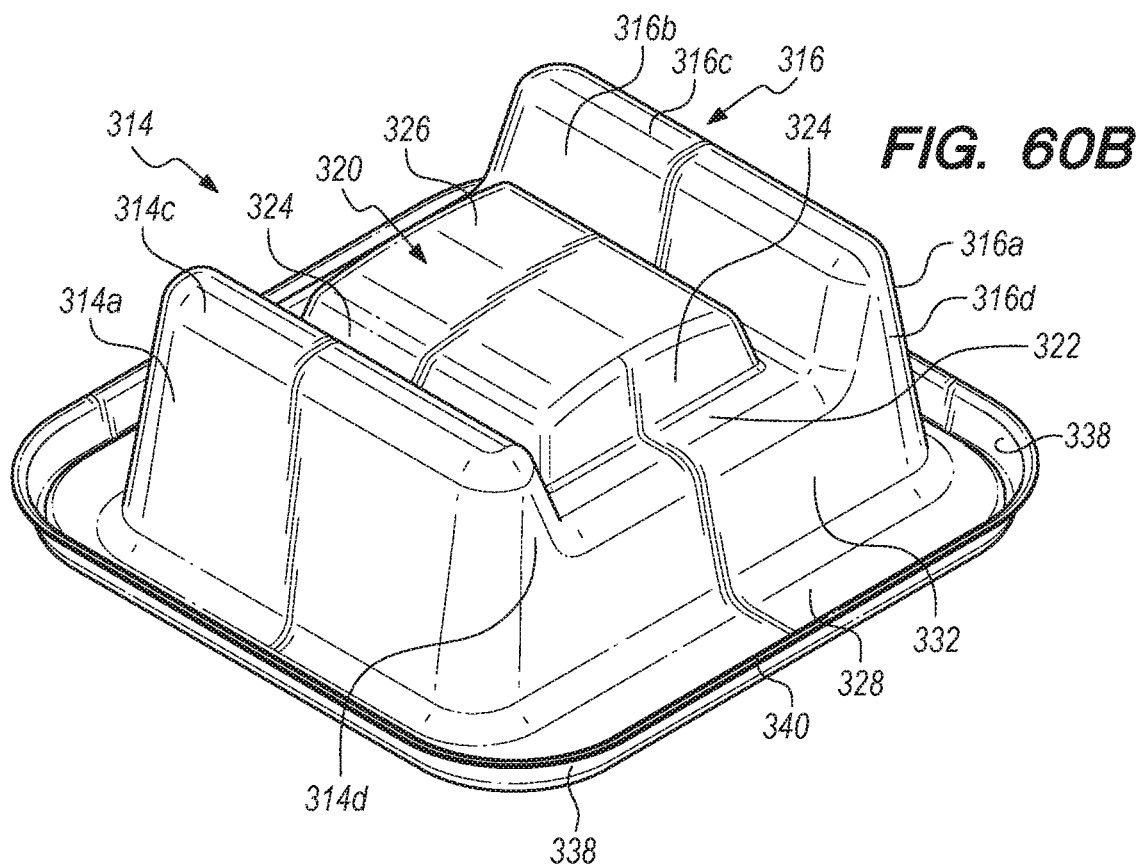
FIG. 60B is a bottom perspective view of the support pan of FIG. 60A.
Figure 61:
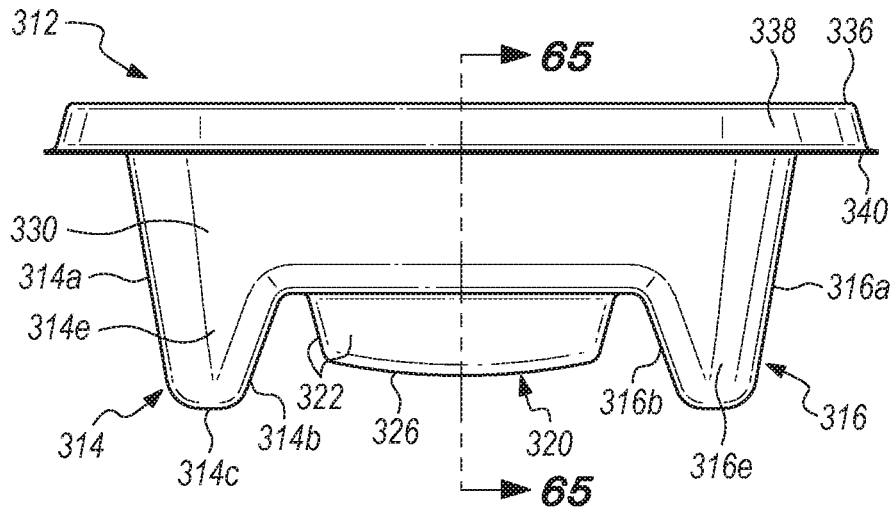
FIG. 61 is a right-side view of the support pan of FIG. 60A; with the opposing left side view being a mirror image thereof.
Figure 62:
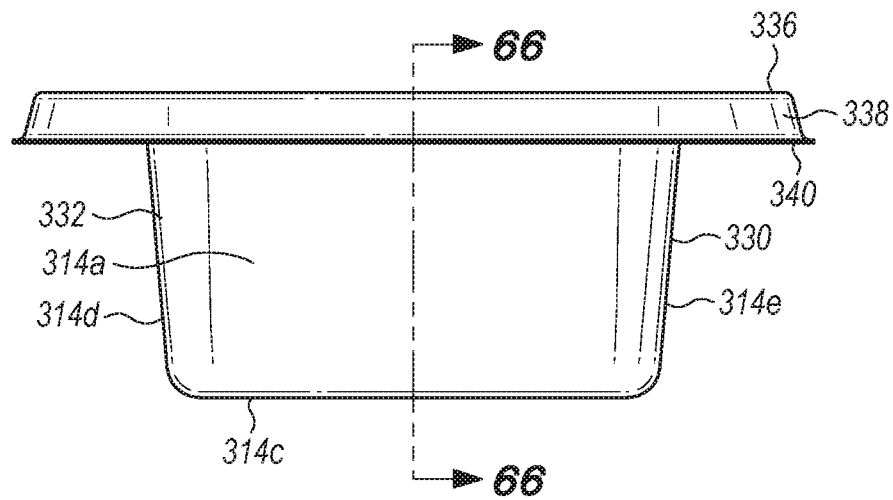
FIG. 62 is a front view of the support pan of FIG. 60A, with the opposing back view being a mirror image thereof.
Figure 63:
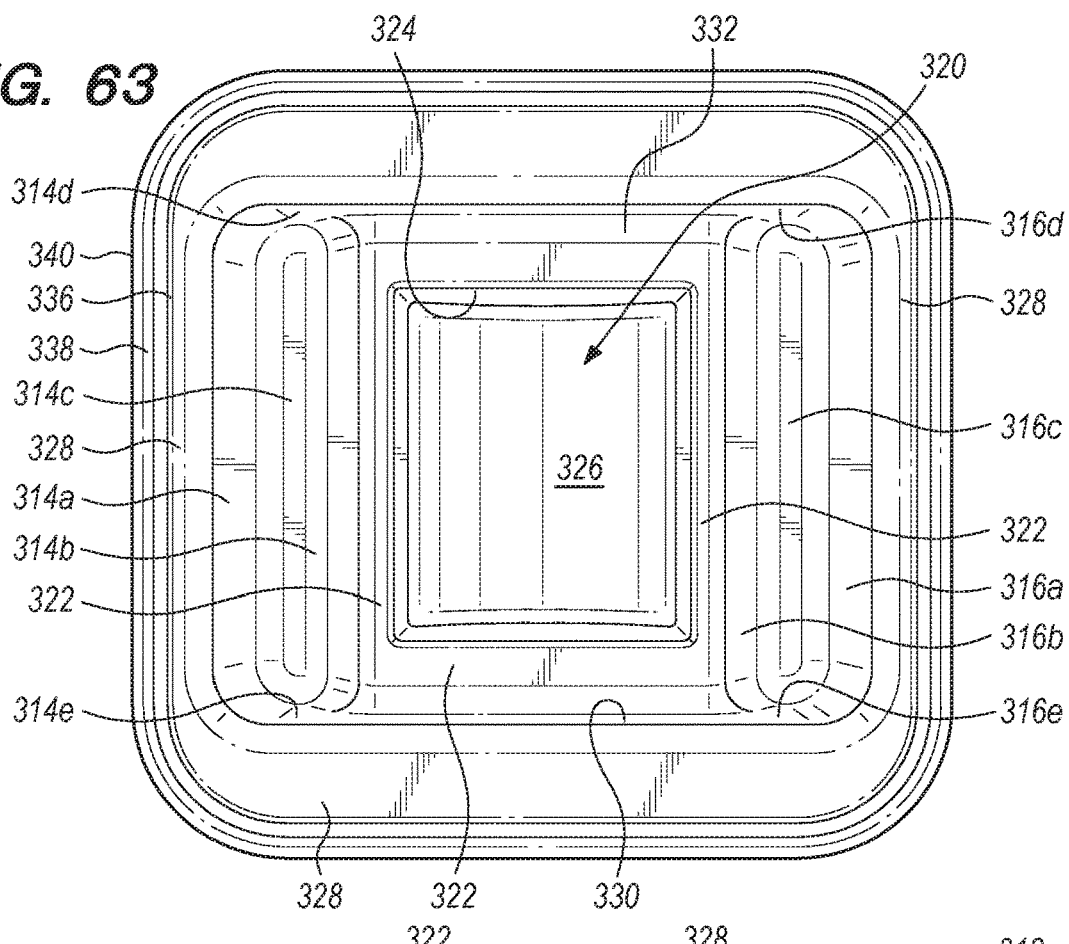
FIG. 63 is a top view of the support pan of FIG. 60A.
Figure 64:
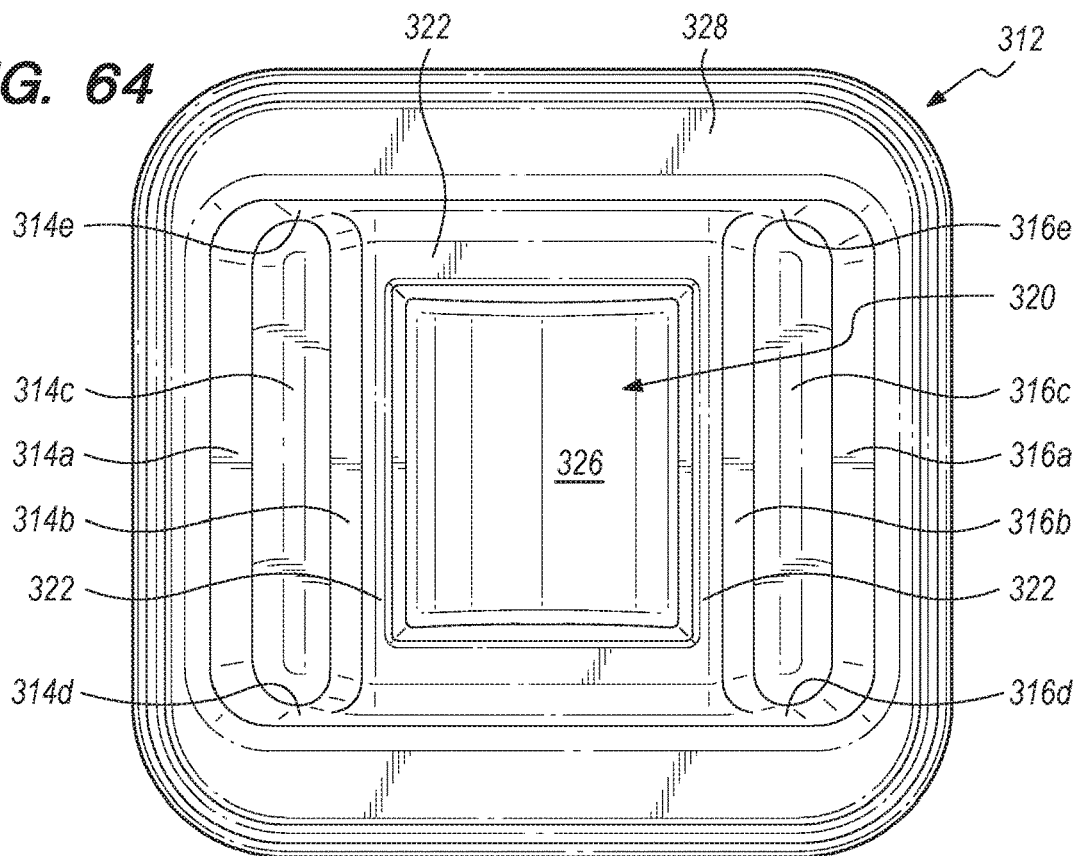
FIG. 64 is a bottom view of the support pan of FIG. 60A.
Figure 65:
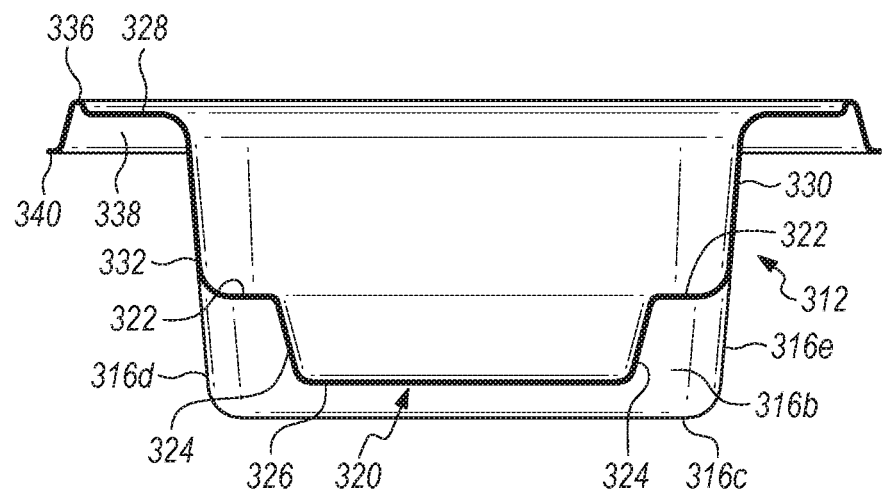
FIG. 65 is a sectional view of the support pan of FIG. 60A, taken along section 65-65 of FIG. 61.
Figure 66:
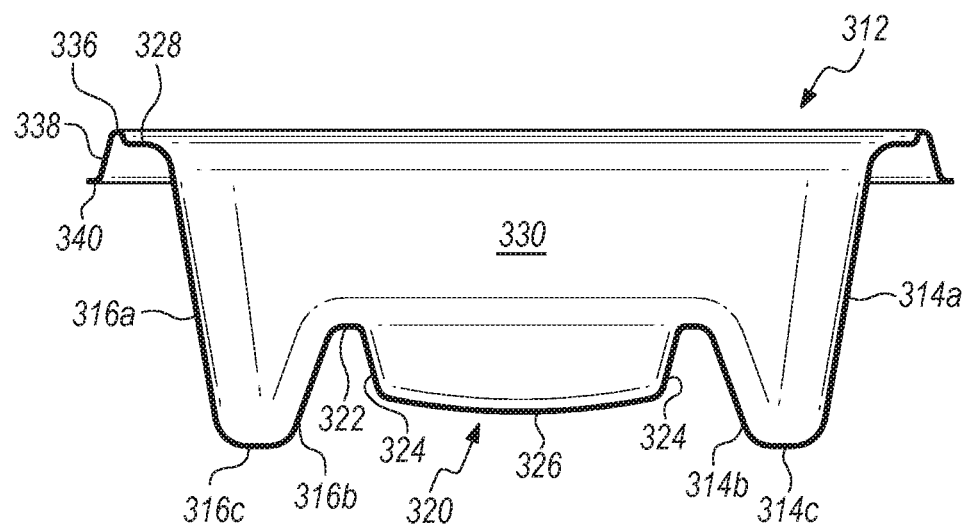
FIG. 66 is a sectional view of the support pan of FIG. 60A, taken along section 66-66 of FIG. 62.

Advantageously, the recesses 227 (227a, 227b) in the support tray 114 fits close enough to the outer periphery of the tray supports 226a, 226b extending inward into the support pan 212, that the top plate 228 of the water pan or suspension tray 214 rests against the shoulder 222 and reduces or prevents heat and steam inside the sidewall 218a from escaping downward below the tray 214. The sidewalls 218 of the support pans 212 are uniformly inclined so a plurality of support pans may be nested into each other to provide for a compact stack for shipping, providing the advantages previously described for the first embodiment of support pans 212 and trays 214 and food trays 246. Nested pans 212, trays 214, and packets 40 are illustrated in FIGS. 59A-59B. As the support pans 212 and suspension trays 214 are substantially as previously described, the detailed description of the stacked and nested pans 212 and trays and heating packets 40 also apply to the pans 212 and trays 214 and are not repeated.

The support pan 212 and suspension tray 214 do offer further advantages over the first embodiment of FIGS. 1-23 in that the support 236 is believed to retain heat better and to provide a sturdier support around more of the periphery of each food tray 246 than the first embodiment of FIGS. 1-23. Also, the recess 227a, 227b are believed to provide additional interlocking between the suspension tray 214 and the support pan 212 and more resistance to twisting or skewing of the chafing dish 200 in the lateral plane. While a curved recess 227 is shown, the recess may be other shapes, but advantageously are configured to conform to or mate with the shape of the tray supports 226.

Referring to FIGS. 60-67, a further embodiment is shown in which the chaffing dish 310 comprises a single support pan 312 having a thin wall construction with a generally rectangular shape tapered for nested stacking of the support pans. The support pan 312 has enclosed sides and an open top for receiving and supporting a food tray during use, as discussed later. The support pan 312 has two hollow legs 314, 316 extending along opposing sides the support pan 312 and parallel to a first longitudinal axis. Each hollow leg 314, 316 has an outward facing side 314a, 316a that face away from each other, and an opposing inward facing side 314b, 316b which inward facing sides face toward each other. The sides are joined at the bottom and ends to form an enclosure open at the top. Thus, the bottom of each side 314a and 314b is joined by bottom 314c advantageously extending along the length of each side at the bottom. The bottom of each side 316a and 316b is joined by bottom 316c extending along the length of each side 316a, 316b at the bottom. The bottoms 314c, 316c are preferably slightly curved or flat and in the same plane. The bottoms 314c, 316c rest on support surface 318 during use of the support pan 312. The legs 314, 316 have a generally U-shaped or V-shaped cross-section with the sidewalls inclined away from each other and allowing a nested stacking arrangement (FIG. 68).

Each side has opposing first and second ends to form an enclosure. Thus, a first end 314d joins sides 314a, 314b and joins bottom 314c at the first end of the support pan 312. A second end 314e joins sides 314a, 314b and bottom 314c at the second end of the support pan 312 to form a generally rectangular enclosure with an open top. Likewise, a first end 316d joins sides 316a, 316b and joins bottom 316c at the first end of the support pan 312. A second end 316e joins sides 316a, 316b and bottom 316c at the second end of the support pan 312 to form a generally rectangular enclosure with an open top. The sides and ends of the legs 312, 314 are each inclined slightly outward to provide a tapered angle so the legs can be easily formed or molded during manufacture, and can be easily nested with the legs support pans 312 of the same configuration for shipping and/or storage.

A generally horizontal support shoulder 322 encircles the periphery of a generally rectangular pocket 320 and has an outer periphery of the shoulder 322 connected to the top of the inward facing sides 312b, 316b of the legs 312, 316. The shoulder 322 forms a built-in support shelf for the pocket 320. The depicted shoulder 322 has a generally flat, horizontal shape along the portion extending between the legs 314, 316, and has a flat or rounded shape along the portion joining the inward facing sides 314b, 316b. The pocket 320 is preferably orientated so the short side of the rectangular pocket is parallel to the long sides of the support pan 312. That orientation is believed to provide improved heat distribution to the three food trays.

The single pocket 320 has an open top with pocket sidewalls 324 connected at the top to shoulder 322 and connect at the bottom of the sidewalls 324 to a pocket bottom 326 that is preferably curved about a first longitudinal axis of the support pan 312 parallel to the bottoms 314c, 316c. The pocket bottom 326 may be curved about an axis perpendicular to the first longitudinal axis, or domed so it is curved about both the longitudinal axis and a perpendicular, transverse axis. The shape helps direct water to the bottom to better contact the exothermic material as described in the other embodiments. The shoulder 322 offsets the pocket 320 inward from the sides and ends of the support pan 312.

The outer facing side walls 314a, 316a extend upward to a support pan lip 328 which encircles the generally rectangular periphery of the support pan 312 so the side walls support two opposing sides of the support pan lip. First and second end walls 330, 332 extend from the outer ends of the shoulder 322 extending between the legs 314, 316, upward to the support pan lip 328. The sidewalls 314a, 316a and end walls 330, 332 join to form a continuous enclosure around the opening encircled by support pan lip 328, and as needed join various parts of legs 314, 316 to form an air tight enclosure with an open top encircled by top support flange lip 328. Advantageously the corners where the sidewalls 314a, 316a join the end walls 330, 332, are curved and preferably at the support flange lip 328 that curvature matches the curvature of the corners and support flanges of food trays supported on the support flange lip during use and as described herein. The support pan lip 328 corresponds to support pan lip 128 described herein, and is preferably generally horizontal during use, and parallel to shoulder 322. The support lip 328 extends laterally, generally parallel to the shoulder 322. The support lip 328 advantageously extends a greater distance laterally along two opposing sides than it does on the remaining two opposing sides of the support lip. The longer extending support lip 328 provides a larger length and area for a user to grab and hold with their fingers on opposing sides of the support pan 312, while the shorter length support lip provides a stronger and stiffer set of lips to grab if the food tray is heavy.

The support pan lip 328 advantageously has a bead 336 around its outer periphery corresponding in construction and use to bead 160 described herein. A depending flange 338 extends downward and outward at an angle and ends in lip 340. If the support pan 312 is molded plastic then there is a flat lip 340, typically formed by the molding joints and if the support pan is pressed or stamped of thin metal such as aluminum then there is a rolled or folded lip 340. The lip 340 corresponds to the lip 164 described herein, and the depending flange 338 corresponds to the flange 162 described herein. The inclination angles of the walls forming and pockets etc. forming the support pan 312 are selected to allow a plurality of support pans 312 to nest together, with the depending flange 338 of a lower support pan 312 nesting inside the depending flange 338 of an upper support pan.

In use, the support pan 312 is placed on a support surface 16, with the bottoms 314c, 316c resting on the surface 16, which is generally horizontal. Water is placed in the pocket 320, preferably a predetermined amount or volume of water. The packet 40 of reactive compound is placed in the pocket so the reactive compound in the packet reacts with the water to generate heat and steam. The support pan 312 and its support pan lip 328 are preferably configured for a half food tray 46 so the food tray flange 48 rests against and is supported by the support pan lip 328 around the entire perimeter of the support pan lip so as to contain the steam inside the pan 312 and below the food tray 46. The support pan lip 328 is thus preferably parallel to the food tray flange 48. Advantageously, the food tray flange 48 fits inside the bead 336 on the outer periphery of the support pan lip 328. The packet 40 and its exothermic material is configured to maintain the food in food tray 46 hot for 1-2 hours, preferably about 1.5 hours.

The support pan 312 is configured relative to the food tray 46, so the food tray sidewall 50 is advantageously located inward of sidewalls 314a, 316a and end walls 330, 332 and so the food tray bottom 52 is above the shoulder 322, leaving a gap between the food tray and the support pan into which the steam may enter to heat the food tray. The support pan 312 advantageously positions the food tray bottom 52 sufficiently above the shoulder 322 so that when the packet 40 expands during use, the packet does not contact the bottom of the food tray as that could cause a hot spot and burn food in the food tray.

The shoulder 322 separates the pocket 320 inward from each of the legs 314, 316, and inward from the end walls 330, 332 so as to reduce the likelihood of a person touching the pocket 320. The pocket 320 is located between the legs 314, 316 so the legs block contact with the pocket from two lateral sides, along the lateral axis of the support pan. The pocket 320 has a depth less than a height of the inward facing sides 314b, 316b. The legs 314, 316 are longer than the pocket 320 so the legs hold the pocket 320 away from the surface 16 a distance sufficient to prevent burning or scorching of the surface. A distance of 0.5 inches to one inch is believed sufficient.

The support pan 312 is configured to have sufficient strength to support the food in food tray 46, typically by varying the wall thickness of the support pan 312, although the legs 314, 316, the beads 336 and 340 and the depending flange 338 also stiffen the support pan.

Figure 67:
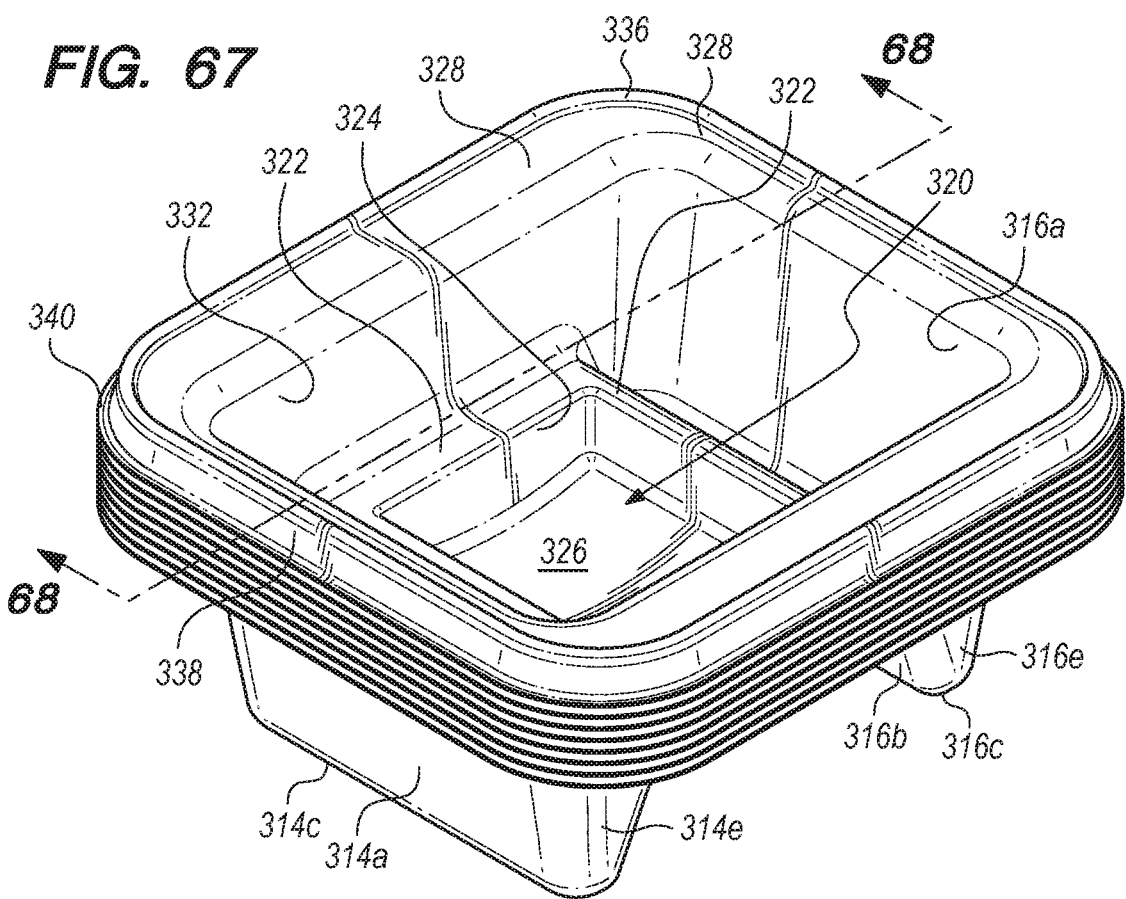
FIG. 67 is a top perspective view of a stack of support pans of FIG. 60A.
Figure 68:
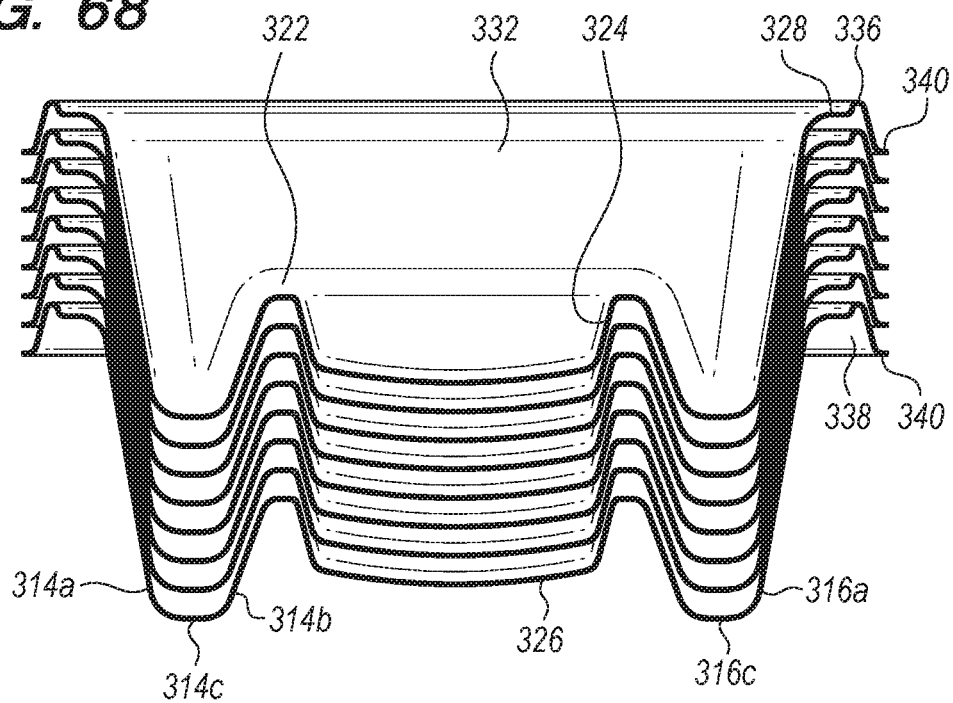
FIG. 68 is a sectional view taken along 68-68 in FIG. 67.

As seen in FIGS. 67-68, a plurality of the support pans 312 may be stacked or nested together for shipment, with the various sidewalls, end walls etc. being inclined outward from a center of the support pan to facilitate stacking. As reflected by earlier embodiments, the packets 40 of an exothermic material may be placed inside the top support pan 312. Advantageously, one packet 40 of exothermic material are included for each of the stacked support pans 312, and advantageously the packets 40 do not extend above the top surface of the support pan in the general plane of the support pan lip 328. The number of packets 40 that may fit inside the top support pan 312 thus limits the number of support pans that are stacked for shipment—but only when a fuel packet 40 is provided for each support pan. Stacks of 5-10 support pans 312 and exothermic packets 40 are believed suitable, with eight support pans and packets 40 believed preferable, but the number may vary. It is believed the stack of eight support pans 312 will have a height of about 7-8 inches, preferably about 7.5 inches, with each pan 312 having a height of about 5-6 inches, and preferably a height of about 5 to 5.3 inches. If the support pans 312 and packets 40 of exothermic material are shipped separately, the number of stacked support pans may increase.

Advantageously, the support pan is configured so the height of the shoulder 322 from the support surface 16 is less than half the height of the top support lip 328 from the support surface. This is seen in the drawings, with FIGS. 9-19, 31-35, 37-39, 47-50, 53-55, 57-58, and 63-66 being to scale. The food trays 46 typically hold between 12 to 14 pounds of food for a full tray, about 6-7 pounds for a half tray, and about 3 to 3.5 pounds for a ⅓ tray, which food trays are maintained at a temperature of 120° F. for an hour, provided the food starts at a temperature of at least 120° F. and is in a still room at an ambient temperature of 70° F.

Advantageously, while the food trays 46 are supported by the food tray flanges 48 resting on the top support flanges of the support pan, there is a gap of space of about ⅜ inch to 1 inch (possibly larger), preferably ⅜ to ½ inch, between the sides and bottom of the food tray and the adjacent sidewalls and suspension tray or support pan so steam can circulate during use. The support pans 12, 112, 212, 312 may be configured for standard food trays 46 which have a depth of about 2.5 inches, or they may be configured for deep food trays which may have a depth of about 3.5 inches. Advantageously, for deep food trays the location of the flange forming the shoulder 22, 122, 222, 322 is raised to maintain the preferred gap between the suspension tray and the bottom of the food tray.

Differing amounts of exothermic material and water may be used to generate differing amounts of steam and heat for differing periods of time. A packet 40 advantageously about 3×5×⅜ inches in dimensions is believed suitable to contain 80 g of exothermic material reactive with water to generate steam. The exothermic material will continue to absorb available water and expand. The pockets 30, etc. advantageously hold about 10-12 ounces of water which is believed to be absorbed by the 80 grams of exothermic material in about 30 minutes, while generating heat for about 45 minutes sufficient to maintain the temperature of the food in the food trays for 30 to 45 minutes, and depending on the weight of food and type of food and the presence of absence of a lid, may maintain the temperature for 1.5 hours. Additional water will be absorbed and may cause the packet to expand and may cause the encasing material to tear or rupture, so the encasing material it no longer confines the exothermic material. The pockets are advantageously sized to limit the amount of water to the above described volumes and may include a water-level marker to indicate the desired water level or may have the total volume indicate the desired water level with some slight overflowing of the pocket when the packet 40 is placed in the water in which case the sagging of the suspension tray during use may direct water expelled from the pocket back toward the pocket.

As used herein, disposable means a support pan or suspension tray which is permanently deformed during normal use using the described amount of water with the described exothermic material for one heating cycle, when the food trays hold the weight of food for which they are advertised. For the described support pans and suspension trays, normal use varies from 0.5 to 1 hour during which time exothermic material and water placed in the pocket 30, 130, 230, 320 of the suspension tray 14, 114, 214 or support pan 312, generates steam which is trapped above the suspension tray and below the food trays 46 blocking the open top of the support pan 12, 112, 212, 312. For purposes of determining if the parts are disposable, the chaffing dishes are used for one serving so the longer, one hour time for maintaining the food temperature is used and if that is not known, the use time ends when the inside of the support pan adjacent the food trays start to cool down. The packets 40 advantageously contain 80 grams of calcium carbonate in a pocket configured to hold 10 to 12 ounces of water, which is believed sufficient to maintain food in the food trays at a temperature of about 120° F. for the 1 hour duration, provided the food starts at a temperature above 120° F. and typically below 160° F. and for determining disposability a starting food temperature of 120° F. may be used. During use, food is removed from the food trays so the weight causing deformation reduces. For determining disposability, assume the weight of the full trays of food is not reduced. This definition of disposable applies to the support pan and the suspension tray.

The steam and heat cause permanent deformation of the suspension trays which sag inward and downward and/or become wavy, mostly because the heat softens the suspension tray and weight of the packets 40 and water in the pocket(s) deform the weaker, heated suspension tray. The steam and heat also deform the suspension tray as the weight of the food trays push the top sidewalls down, causing the flange forming the shoulder 22, 122, 222 and 322 to sag downward at the juncture with the long sides of the sidewall. The suspension tray and support pan maintain their structural integrity during their normal use, but the deformation is visually apparent to the naked eye. The suspension tray and support pans may be suitable for reuse perhaps one more time without causing visible leakage of steam around the outer periphery of the food trays, but advantageously not more than that, and preferably no more than a total of three uses.

The disposable support pans may be formed by thermoforming, or injection molding, or drawing, or combinations of drawing and thermoforming. Thermoforming is believed to form more variable thickness in the walls, with thinner sidewalls and thicker bottoms and top support flanges, with thicknesses varying from 0.05 to 0.06 inches believed suitable for disposable support pans and suspension trays. Male-female drawing is believed to form thicker walls and corners and thinner bottoms. Injection molding may selectively vary the thickness but is more expensive, with thicknesses of 0.025 bottoms and 0.06 sidewalls, shoulders and top support flanges believed suitable.

In the above embodiments, the support pans 12, 112, 212 and 312 are made of plastic and either designed to be disposable after one use, or designed of thicker polymer material and more durable polymer materials and designed for repeated, long-lasting use. But the support pans 12, 112, 212 and 312 may be of thicker metal and designed for repeated reuse. Stainless steel pans 12, 112, 212 and 312 are preferred for such reusable applications. The metal for these reusable support pans has a thickness sufficient so the support pan does not deform during repeated use of at least 10 times in maintaining foods hot for at least an hour each time, followed by washing, drying and reuse.

As seen in FIG. 69, metal covers or lids 170 may be provided with the covers or lids each having a bottom lip 172 shaped to rest on and seal against the support pan lip 24, 124, 224 or 324 are preferred for such reusable applications. The lid 170 for the support pans 12, 112 and 212 are thus preferably rectangular in shape while the lid 170 for the support pan 312 more resembles a square shape. But the lid 170 will vary in shape to conform to the shape of the support pan. The height of the cover or lid 170 may vary, with a height of one to four inches believed suitable. The lids 170 advantageously have a handle 174 on the top of the cover or lid, or may have two handles on opposing sides or opposing ends of the cover or lid.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, the tray supports 126, 226 are shown with a convex center surface joining a concave surface on each side of the convex center but other shapes may be used, including flat surfaces or flexible but deformable flanges extending over any gaps between the flanges of the food trays in order to provide suitable resistance to loss of heat or steam around the periphery of the food trays 46. Thus, other cross-sectional shapes of supports 126, 226 (and mating recesses 127, 227) may be provided.

The above description is given by way of example, and not limitation. Given the above disclosure, one skilled in the art could devise variations that are within the scope and spirit of the invention, including various ways of configuring the pockets 30, 130, 230 and packets 40. It is believed preferable to have corresponding shapes so that if the pocket is circular then the packet is circular. Generally flat bottoms on the pockets are preferred or bottoms slightly dished to direct water toward the middle and ensure contact with the packet 40. The thin aluminum and thin plastic material used for the pockets 30, 130, 230 suspension tray 14, 114, 214 or the pocket 320 in support pan 312, is believed to deform or bend under the weight of the packet 40 enough that the water drains toward the packet 40 during use and curving the bottom of the pocket about at least one orthogonal axis of the pocket further directs water toward the packet 40. Further, the various features of this invention can be used alone, or in varying combinations with each other and are not intended to be limited to the specific combination described herein. Thus, the invention is not to be limited by the illustrated embodiments.

What is claimed is:

1. A chafing dish for supporting a food tray on a top periphery of the chafing dish when the chafing dish rests on a support surface, the chafing dish configured for use with water and a water reactive, exothermic material to heat the food tray, comprising:
   a support pan having an open top, two hollow legs with closed bottoms for resting on the support surface during use, each of the legs opening toward the open top and extending along opposing sides of the open top with an outward facing side of each leg inclined outward and extending upward to form an opposing side of the open top, each leg having an inward facing side extending inward and upward to connect to an opposing side of a pocket configured to hold the water and exothermic material during use, the pocket having a depth less than a height of the inward facing sides of the legs so a bottom of the pocket is spaced apart from the support surface during use, the support pan having a top support lip extending outward around the top periphery and connected to the outward facing sides and further connected to end walls which in turn connect to the legs and pocket, the end walls and the outward facing side of the legs cooperating to enclose the chafing dish below the top support lip so the entire support pan is formed of a continuous sheet of material.

2. The chaffing dish of claim 1, wherein the support pan is rectangular in shape with the legs extending along a majority of a length of two opposing sides of the open top, and wherein the inward and outward facing sides of each leg form a cross-section having a V-shape.

3. The chafing dish of claim 1, wherein the support pan is made of thin plastic or aluminum having a thickness between 0.04 and 0.06 inches.

4. The chafing dish of claim 1, wherein the support pan is made of stainless steel and has a lid.

5. A chafing dish for supporting a food tray when the chaffing dish rests on a support surface, the chafing dish configured for use with a water reactive, exothermic material to heat the food tray, the chafing dish comprising:
   a support pan having;
      a top periphery for supporting the food tray;
      an open top;
      opposing pan sides extending from the top periphery;
      two hollow legs opening toward the open top and extending along the opposing pan sides of the open top, each leg having:
         a closed bottom for resting on the support surface during use;
         an outward facing side extending upward to form a respective one of the opposing pan sides; and
         an inward facing side;
      a pocket configured to hold the water and exothermic material during use, the pocket having opposing pocket sidewalls, each inward facing side extending upward to connect to a respective one of the opposing pocket sidewalls, the pocket having a depth less than a height of the inward facing sides of the legs so the pocket bottom is spaced apart from the support surface during use; and
      a top support lip extending outward around the top periphery and connected to the outward facing sidewalls which in turn connect to the pocket, the outward facing sides cooperating to enclose the chafing dish below the top support lip so an entirety of the support pan is formed of a continuous sheet of material.

6. The chafing dish of claim 5 wherein the support pan further has opposing pan end walls, the pan end walls are disposed between the opposing pan sides, the top support lip are connected to the pan end walls, the pan end walls and the outward facing sides cooperating to enclose the chafing dish below the top support lip.

7. The chafing dish of claim 6 wherein each leg is formed by a respective one of the opposing pan sides and a respective one of the opposing pan end walls.

8. The chafing dish of claim 5 wherein the support pan is made of plastic.

9. The chafing dish of claim 5 wherein each outward facing side extending outward and upward to form a respective one of the opposing pan sides.

10. The chafing dish of claim 5 wherein each inward facing side extending inward and upward to connect to a respective one of the opposing pocket sidewalls.

11. The chafing dish of claim 5 wherein the inward and outward facing sides of each leg form a cross-section having a V-shape.

\* \* \* \* \*